United States Patent
Sakura et al.

(10) Patent No.: US 8,199,144 B2
(45) Date of Patent: Jun. 12, 2012

(54) INFORMATION PROCESSING APPARATUS AND RELATED METHOD, IMAGE FORMING APPARATUS AND RELATED CONTROL METHOD, PROGRAM, AND RECORDING MEDIUM

(75) Inventors: Masayuki Sakura, Kawasaki (JP); Masamichi Akashi, Funabashi (JP); Masanori Matsuzaki, Yokohama (JP); Makoto Anno, Minato-ku (JP); Osamu Hosoda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 11/404,727

(22) Filed: Apr. 14, 2006

(65) Prior Publication Data

US 2006/0238786 A1  Oct. 26, 2006

(30) Foreign Application Priority Data

Apr. 26, 2005  (JP) ................................. 2005-128617
Apr. 26, 2005  (JP) ................................. 2005-128620

(51) Int. Cl.
*G06F 17/00* (2006.01)
(52) U.S. Cl. ......... 345/418; 358/1.1; 358/1.9; 358/1.13; 358/1.15; 399/81; 399/82; 270/58.08
(58) Field of Classification Search .................... 399/81; 358/1.13; 715/274; 379/88.18
See application file for complete search history.

(56) References Cited

U.S. PATENT DOCUMENTS

| | | | |
|---|---|---|---|
| 4,801,133 A * | 1/1989 | Ishiguro et al. ............ | 270/58.15 |
| 6,827,514 B1 * | 12/2004 | Shima ........................ | 400/582 |
| 6,975,415 B2 | 12/2005 | Yamade | |
| 7,245,870 B2 | 7/2007 | Ozaki | |
| 7,336,282 B2 | 2/2008 | Kato | |
| 7,408,662 B2 | 8/2008 | Sakura | |
| 7,430,714 B1 * | 9/2008 | Savitzky et al. ............ | 715/255 |
| 7,443,539 B2 * | 10/2008 | Komiya et al. ............. | 358/1.9 |
| 7,486,410 B2 * | 2/2009 | Hisamura ................... | 358/1.12 |
| 2001/0030755 A1 | 10/2001 | Yamade | |
| 2002/0154345 A1 | 10/2002 | Ozaki | |
| 2002/0156740 A1 * | 10/2002 | Kasahara et al. ........... | 705/52 |
| 2003/0081253 A1 * | 5/2003 | Sekiguchi et al. .......... | 358/1.16 |
| 2003/0090694 A1 * | 5/2003 | Kennedy et al. ........... | 358/1.13 |
| 2003/0115199 A1 * | 6/2003 | Ochiai et al. ............... | 707/10 |

(Continued)

FOREIGN PATENT DOCUMENTS

CN  1381812 A  11/2002

(Continued)

*Primary Examiner* — Xiao M. Wu
*Assistant Examiner* — Phi Hoang
(74) *Attorney, Agent, or Firm* — Canon USA, Inc. IP Division

(57) ABSTRACT

An information processing apparatus displays a screen for enabling an operator to select settings for controlling a print output from an image forming apparatus and post-processing applied to a printed product by an independent post-processing apparatus. The post-processing apparatus includes an obtaining unit configured to obtain post-processing information from the post-processing apparatus and a display control unit configured to change contents of the setting screen based on obtained function information and display a changed setting screen. The image forming apparatus includes a determining unit configured to determine based on obtained function information whether the image forming apparatus can execute a print output accompanied by post-processing using the post-processing apparatus, and control a display unit to display a setting screen for controlling the post-processing function when the image forming apparatus can execute the print output accompanied by post-processing.

17 Claims, 68 Drawing Sheets

U.S. PATENT DOCUMENTS

| | | |
|---|---|---|
| 2003/0142351 A1 | 7/2003 | Sakura |
| 2003/0215256 A1* | 11/2003 | Osada ............................ 399/81 |
| 2003/0222396 A1* | 12/2003 | Kurahashi et al. ............ 271/207 |
| 2003/0231320 A1* | 12/2003 | Tsunekawa .................... 358/1.2 |
| 2004/0130742 A1* | 7/2004 | Horst ........................... 358/1.13 |
| 2004/0169881 A1* | 9/2004 | Sato ............................. 358/1.15 |
| 2004/0184069 A1* | 9/2004 | Mifune ........................ 358/1.15 |
| 2004/0190042 A1* | 9/2004 | Ferlitsch et al. ............. 358/1.15 |
| 2004/0240640 A1* | 12/2004 | Warner et al. ............. 379/88.18 |
| 2004/0264993 A1* | 12/2004 | Konuma et al. ................ 399/81 |
| 2005/0068547 A1* | 3/2005 | Negishi et al. ................. 358/1.1 |
| 2005/0149863 A1* | 7/2005 | Kato et al. .................... 715/274 |
| 2005/0152711 A1* | 7/2005 | Yokobori et al. ............... 399/82 |
| 2005/0183141 A1* | 8/2005 | Sawada ........................... 726/16 |
| 2005/0185979 A1* | 8/2005 | Inoue et al. ..................... 399/82 |
| 2005/0231746 A1* | 10/2005 | Parry et al. .................. 358/1.13 |
| 2005/0275870 A1* | 12/2005 | Elarde et al. ................. 358/1.15 |
| 2005/0275879 A1* | 12/2005 | Ogasawara .................. 358/1.15 |
| 2006/0067724 A1* | 3/2006 | Sato ................................ 399/82 |
| 2006/0238786 A1* | 10/2006 | Sakura et al. ................. 358/1.9 |
| 2007/0222141 A1 | 9/2007 | Ozaki |
| 2009/0009805 A1 | 1/2009 | Yamade |

FOREIGN PATENT DOCUMENTS

| | | |
|---|---|---|
| CN | 1438568 A | 8/2003 |
| EP | 1251008 A2 | 10/2002 |
| JP | 2001-260492 A | 9/2001 |
| JP | 2003-029482 A | 1/2003 |
| JP | 2003-212427 A | 7/2003 |
| JP | 2004-043159 A | 2/2004 |
| JP | 2004-078449 A | 3/2004 |
| JP | 2005-031320 A | 2/2005 |
| JP | 2005-104129 A | 4/2005 |
| JP | 2005-106887 A | 4/2005 |

* cited by examiner

FIG.13

```
<!--BOOKBINDING MACHINE ABILITY INFORMATION-->
<FINISHING>
<FINISHING.FinishingType  FinishingType="Bookbinding"/>   —1301
<FINISHING.Manufacturer Manufacturer="ABC"/>   —1302
<FINISHING.ProductName ProductName="11ABC"/>   —1303
1304— <Booklet>
         <Booklet.BookletTypes  Booklet.NumType="6"/>
            1305—<Booklet.BookletType  Booklet.BookletTypeName="MIDDLE STITCH FOLDING"/>
            1306—<Booklet.BookletType  Booklet.BookletTypeName="SIDE STITCH"/>
            1307—<Booklet.BookletType  Booklet.BookletTypeName="CORNER STITCH"/>
            1308—<Booklet.BookletType  Booklet.BookletTypeName="DOUBLE FOLDING"/>
            1309—<Booklet.BookletType  Booklet.BookletTypeName="SIDE STITCH FOLDING"/>
            1310—<Booklet.BookletType  Booklet.BookletTypeName="CORNER STITCH FOLDING"/>   }—1311
         </Booklet.BookletTypes>
</Booklet>
<Restrictions>
<Medium>
   <Medium.Type  NumMediumType="2">
      <Medium.Type  MediumTypeName="Plain"/>
      <Medium.Type  MediumTypeName="Fine"/>
   <Medium.Type>
   <Medium.Weight  MediumWeightCriterion="4-6Size">
      <Medium.Weight  MediumWeightMin="60kg"  >
      <Medium.Weight  MediumWeightMax="120kg"  >
   </Medium.Weight>
</Medium>
</Restrictions>
<StapleSpaceInterval>
   <StapleSpaceInterval.Adjust  Adjustable="FALSE"/>
   <StapleSpaceInterval.Interval  Interval="100mm"/>
</StapleSpaceInterval>
</FINISHING>
```

FIG.14

```
<!--CUTTING MACHINE ABILITY INFORMATION-->
<FINISHING>
<FINISHING.FinishingType FinishingType="Cutting"/>          ~1401
<FINISHING.Manufacturer Manufacturer="XYZ"/>                ~1402
<FINISHING.ProductName ProductName="10XYZ"/>                ~1403
<Restrictions>
    1404~~<Cutting>
                        <MaxInputDimensions>                     1405
                            <MaxInputDimensions.X X="360mm"/>
                            <MaxInputDimensions.Y Y="360mm"/>
                        </MaxInputDimensions>                    1406
                        <MaxOutputDimensions>
                            <MaxOutputDimensions.X X="310mm"/>
                            <MaxOutputDimensions.Y Y="310mm"/>
                        </MaxOutputDimensions>
                        <MinOutputDimensions>
                            <MinOutputDimensions.X X="80mm"/>
                            <MinOutputDimensions.Y Y="150mm"/>
                        </MinOutputDimensions>
                        <MaxThickness Thickness="70mm"/>    ~1407
            </Cutting>
</Restrictions>
</FINISHING>
```

FIG.15

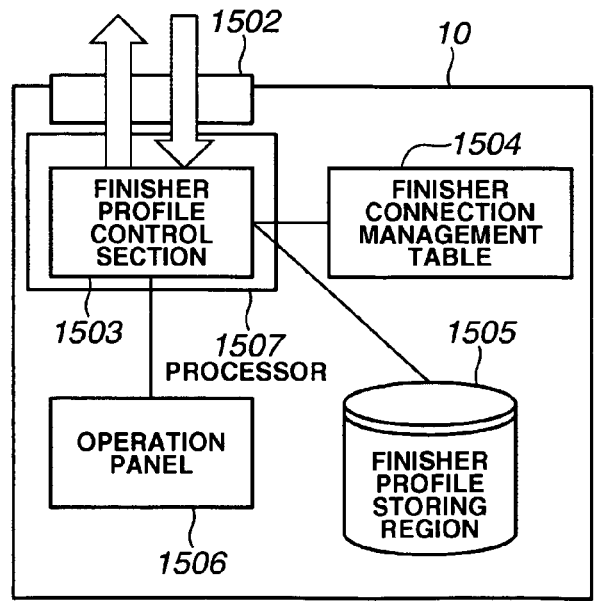

FIG.16

| #MANAGEMENT NUMBER (Unsigned short) | FINISHER NAME (String) | MAKER NAME (String) | PROFILE NAME (String) | CONNECTION STATE (Boolean) |
|---|---|---|---|---|
| 1 | Finisher-A | ABC | finisher-a-of-abc.xml | false |
| 2 | Finisher-B | ABC | finisher-b-of-abc.xml | false |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | false |
| 7 | Finisher-Z | XYZ | finisher-z-of-xyz.xml | false |
| .. | .. | .. | .. | .. |

FIG.26

| #MANAGEMENT NUMBER (Unsigned short) | FINISHER NAME (String) | MAKER NAME (String) | PROFILE NAME (String) | CONNECTION STATE (Boolean) |
|---|---|---|---|---|
| 1 | Finisher-A | ABC | finisher-a-of-abc.xml | false |
| 2 | Finisher-B | ABC | finisher-b-of-abc.xml | false |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | true |
| 7 | Finisher-Z | XYZ | finisher-z-of-xyz.xml | false |
| .. | .. | .. | .. | .. |

FIG.28

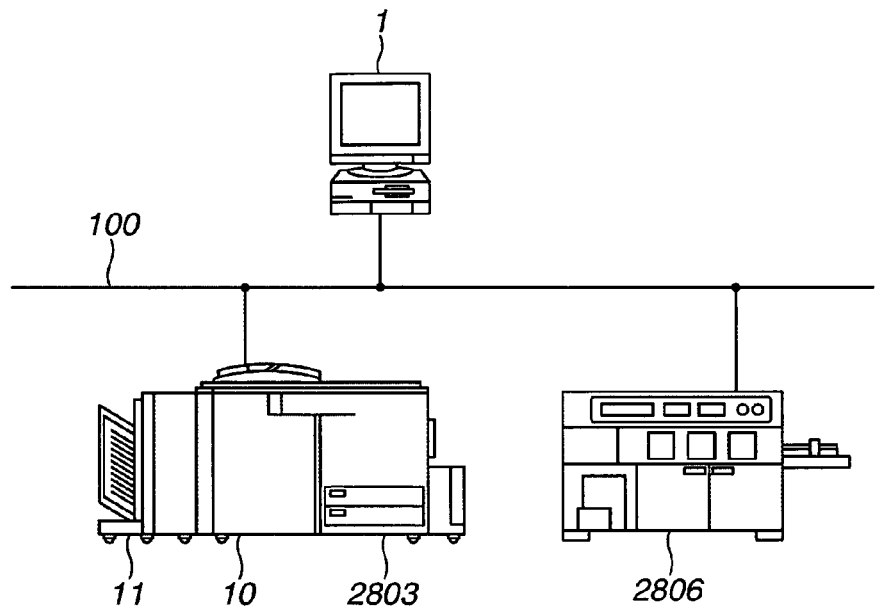

FIG.29

```
<FINISHING>
<FINISHING.FinishingType FinishingType="Non-Stitch Booklet"/>    —2901
<FINISHING.Manufacturer Manufacturer="ABC"/>    —2902
<FINISHING.ProductName ProductName="NSB100"/>    —2903
            <BookletDimensions>
                <MaxBookletDimensions>
                    <MaxBookletDimensions.X X="320mm"/>
                    <MaxBookletDimensions.Y Y="320mm"/>
                </MaxBookletDimensions>
                <MinBookletDimensions>                                    }—2904
                    <MinBookletDimensions.X X="110mm"/>
                    <MinBookletDimensions.Y Y="145mm"/>
                </MinBookletDimensions>
            </BookletDimensions>
2907—<Restrictions>
            <BookletThickness>
                <BookletThickness. Max Max="55mm"/>  }—2905
                <BookletThickness. Min Min="1mm"/>
            </BookletThickness>
            <BookletUnreadableWidth>
                <BookletUnreadableWidth. Length Length="7mm"/>  }—2906
            </BookletUnreadableWidth>
2908—</Restrictions>
</FINISHING>
```

FIG. 34

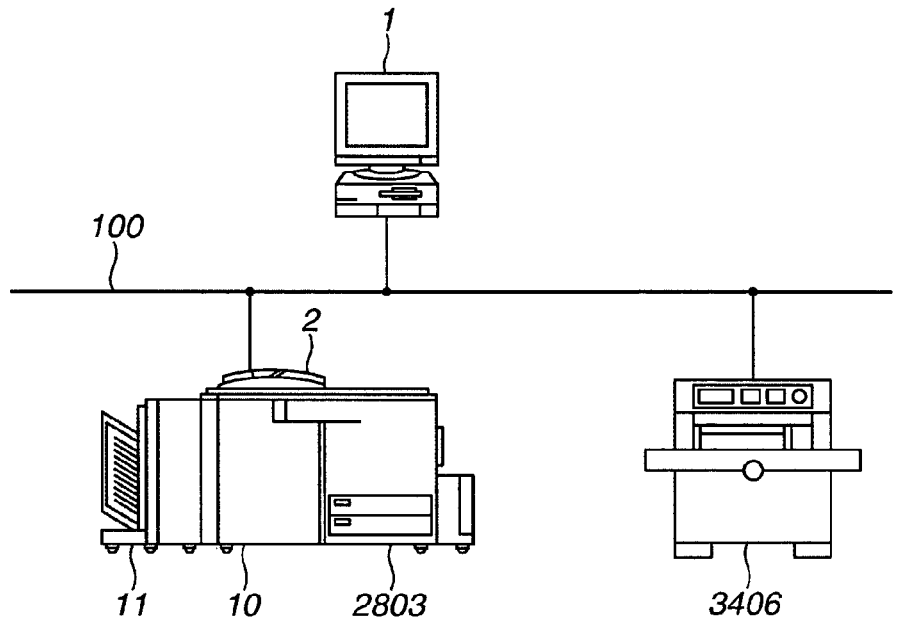

FIG. 35

```
<FINISHING>
<FINISHING.FinishingType FinishingType="3-side Cutter"/>  ——3501
<FINISHING.Manufacturer Manufacturer="ABC"/>  ——3502
<FINISHING.ProductName ProductName="ABC CUT 10"/>  ——3503
        <MaxInputDimensions>
                <MaxInputDimensions.X X="330mm"/>
                <MaxInputDimensions.Y Y="330mm"/>
        </MaxInputDimensions>
        <MinOutputDimensions>                                  } 3504
                <MaxOutputDimensions.X X="100mm"/>
                <MaxOutputDimensions.Y Y="142mm"/>
        </MinOutputDimensions>
        <Restrictions>
                <MaxThickness Thickness="50mm"/>  ——3505
                <MinimumCuttingLength>
                        <MinimumCuttingLength.X X="3mm"/>
                        <MinimumCuttingLength.Y Y="3mm"/>  } 3506
                </MinimumCuttingLength>                              } 3508
                <MaximumCuttingLength>
                        <MaximumCuttingLength.X X="230mm"/>
                        <MaximumCuttingLength.Y Y="94mm"/>  } 3507
                </MaximumCuttingLength>
        </Restrictions>
</FINISHING>
```

FIG.49

```
<FINISHING>
<FinishingType FinishingType="Saddle-Stitch Booklet Staple JobShift"/>    ~4901
<Manufacturer Manufacturer="Horizon"/>    ~4902
<ProductName ProductName="HG-550"/>    ~4903
<Specification>
        <BookletDimensions>
                <MaxBookletDimensions>
                        <MaxBookletDimensions.X X="320mm"/>
                        <MaxBookletDimensions.Y Y="320mm"/>
                </MaxBookletDimensions>
                <MinBookletDimensions>
                        <MinBookletDimensions.X X="110mm"/>
                        <MinBookletDimensions.Y Y="145mm"/>
                </MinBookletDimensions>
        </BookletDimensions>
        <Saddle-Stitch Stitck="ON OFF"/>
        <Staple-Position Position1="left" Position2="center" Position3="right"/>      }4904
        <CoverMedium>
                <CoverMedium.Weight CoverMediumWeightCriterion="4-6Size">
                        <CoverMedium.Weight MediumWeightMin="90kg"/>
                        <CoverMedium.Weight MediumWeightMax="260kg"/>
                </CoverMedium.Weight>
        </CoverMedium>
        <BookletThickness>
                <BookletThickness. Max Max="55mm"/>
                <BookletThickness. Min Min="1mm"/>
        </BookletThickness>
        <BookletUnreadableWidth>
                <BookletUnreadableWidth. Length Length="7mm"/>
        </BookletUnreadableWidth>
</Specification>
<ControlCommand Saddle-Stitch="saddleStitch" Switch="ON OFF"/>
<ControlCommand Booklet       ="booklet"   />
<ControlCommand Staple        ="staple" Position="left center right"/>   }4905
<ControlCommand JobShift      ="jobShift"  />
</FINISHING>
```

FIG.50

| #MANAGEMENT NUMBER (Unsigned short) | FINISHER NAME (String) | MAKER NAME (String) | PROFILE NAME (String) | CONNECTION STATE (Boolean) |
|---|---|---|---|---|
| 1 | Finisher-A | ABC | finisher-a-of-abc.xml | false |
| 2 | Finisher-B | ABC | finisher-b-of-abc.xml | false |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | false |
| 7 | Finisher-Z | XYZ | finisher-z-of-xyz.xml | false |
| .. | .. | .. | .. | .. |

| NAME | FUNCTION | LAYOUT | SPEC | CONTROL COMMAND |
|---|---|---|---|---|
| HG-550 | SADDLE STITCH | 2<br>Saddle type | MAXIMUM<br>IMAGE SIZE=320mm<br>MINIMUM<br>IMAGE SIZE=11mm<br>MIDDLE STITCH<br>   ON<br>   OFF<br>... | Saddle-Stitch<br>ON<br>OFF |
| | BOOKLET | 1<br>Booklet type | MAXIMUM<br>IMAGE SIZE=320mm<br>MINIMUM<br>IMAGE SIZE=11mm<br>...<br>...<br>...<br>... | Booklet |
| | STAPLE | 1<br>Sequential | MAXIMUM<br>IMAGE SIZE=320mm<br>MINIMUM<br>IMAGE SIZE=11mm<br>  STAPLING POSITION<br>    UPPER LEFT<br>    CENTER<br>    UPPER RIGHT | Staple<br>left<br>center<br>right |
| | JOB SHIFT | 1<br>Sequential | MAXIMUM<br>IMAGE SIZE=320mm<br>MINIMUM<br>IMAGE SIZE=11mm<br>...<br>...<br>...<br>... | jobShift |
| | | | | |

LEFT-BOUND TYPE

RIGHT-BOUND TYPE

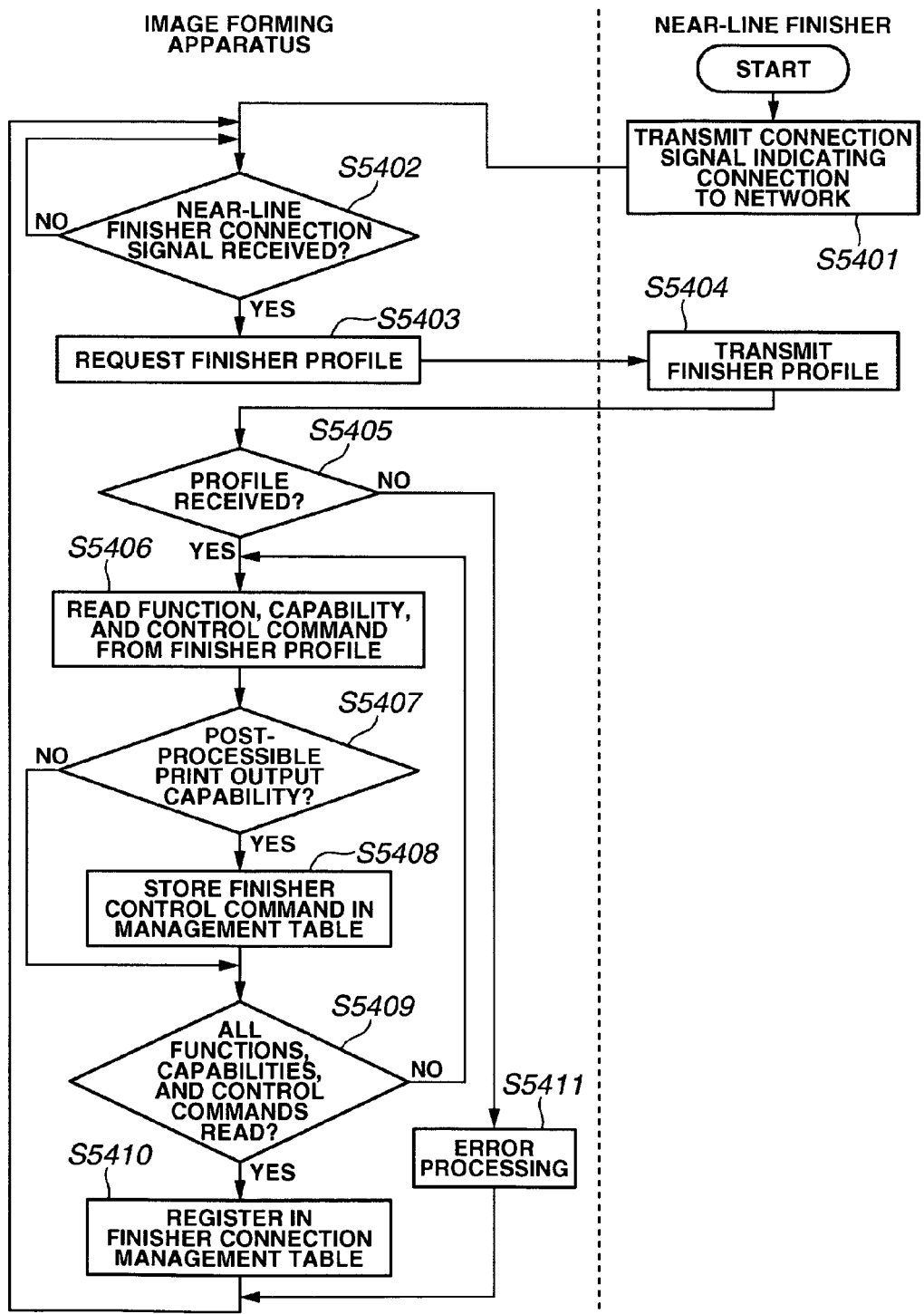

INFORMATION PROCESSING APPARATUS AND RELATED METHOD, IMAGE FORMING APPARATUS AND RELATED CONTROL METHOD, PROGRAM, AND RECORDING MEDIUM

BACKGROUND OF THE INVENTION

1. Field of the Invention

The present invention relates to a display technique for a setting screen of an information processing apparatus that enables an operator to execute settings for a post-processing apparatus that executes post-processing applied to printed products, and further relates to an image forming apparatus that executes print processing.

2. Description of the Related Art

Electro-photographic image forming apparatuses and inkjet printing apparatuses can provide high speed and high quality outputs. A new business model "Print On Demand (referred to as POD)" can handle a large scale of print products and print jobs.

POD includes print processing and related post-processing performed according to user's needs, for example, in an office environment including an image forming apparatus and various post-processing apparatuses, such as a bookbinding apparatus and a sheet cutting machine (hereinafter referred to as "finishers"), connected to the image forming apparatus.

In the print processing for POD, a device driver (hereinafter referred to as a "printer driver") of an image forming apparatus can automatically produce a print job including print attributes relating to post-processing applied to printed products, based on restriction information (i.e., information restricting finisher's functions). As discussed in Japanese Patent Application Laid-open No. 2004-078449, various items can be set as functions of a bookbinding machine, such as:

(a) Whether the bookbinding machine should pick up printed products being stacked from an uppermost position or from a lowermost position; and (b) Whether the bookbinding machine should execute post-processing for printed products set in a face-up condition or for printed products set in a face-down condition.

The printer driver can automatically set an output order (e.g., ascending order/descending order) of the pages and an output direction (e.g., face-up/face-down) of the pages based on functions of the bookbinding machine, so that the bookbinding processing can be correctly performed for the printed products set in the bookbinding machine. In this case, a print job produced by the printer driver reflects specific information specifying finisher functions. Thus, the user needs not confirm the functions relating to the finisher (e.g., the above-described two functions).

Furthermore, in the production of a print job for POD, the type of a finisher connected to the image forming apparatus can be manually set or can be automatically identified. Thus, a user interface (UI) screen of a host computer displaying items relating to the functions can be controlled (or changed) based on the type of an identified finisher and the information specifying the functions of this finisher. A user can perform (i.e., input or select) necessary settings of various functions through the UI screen according to user's individual needs (e.g., cutting method, binding method, stapling or bookbinding designation, etc.). In response to a user's input on the UI screen, the printer driver can produce a print job including control commands for outputting final printed products. The produced print job is output to the image forming apparatus and to the finisher connected to the image forming apparatus.

For example, when a finisher having a stapling function is connected to the image forming apparatus, the printer driver can enable a user to execute stapling settings by providing a stapling setting field as one of function items displayed on the UI screen. In this case, the display contents of the UI screen are controlled by the printer driver based on the information specifying the functions of the finisher. The user needs not confirm the function relating to the finisher (e.g., the function relating to stapling setting).

Furthermore, when a finisher not connected via a physical conveyance path to the image forming apparatus is used to process printed products, the operator must confirm finisher functions beforehand and set the output of the image forming apparatus so as to conform to the finisher functions.

For example, a middle stitch bookbinding machine can be used to produce final printed products. In this case, the operator must execute the settings for arranging two pages of image on a recording medium (e.g., a recording paper sheet) having a size two times the page size of final printed products.

However, when the image forming apparatus is connected to a specific finisher (e.g., a bookbinding machine) whose information is not incorporated in the printer driver, an operator of the image forming apparatus must perform various print settings considering the functions of the newly connected finisher. If there is any restriction(s) relating to added finisher function(s) influencing the item(s) relating to other function(s) of the printer driver, the operator must perform necessary settings considering the effects of the restriction(s). In such a case, it will be difficult for an operator to accurately determine various settings necessary for the post-processing.

If it is known that a specific bookbinding machine is later connected to the image forming apparatus, the printer driver can be programmed beforehand to control the display of a UI screen or print attributes based on specific information specifying finisher functions. However, after the configuration (and contents) of the printer driver is fixed, the printer driver cannot recognize any function(s) of a newly connected finisher, e.g., a sheet cutting machine, a collating machine, or any other finisher other than the bookbinding machine. Thus, the printer driver cannot control the print attributes requiring the use of a newly added and connected finisher (e.g., a sheet cutting machine or a collating machine), unless the printer driver can be appropriately updated considering the use of the newly connected finisher.

Furthermore, when a printer driver UI screen can display function items based on the specific information specifying finisher functions, the printer driver cannot recognize functions of a newly added and connected finisher and accordingly cannot control (or change) the display of the function items on the UI screen. Thus, the operator must confirm the restrictions relating to the function(s) of the finisher and must accurately determine various settings necessary for the post-processing contents.

SUMMARY OF THE INVENTION

The present invention is directed to a technique that enables an operator of a host computer to easily perform the settings necessary for a finisher even when the finisher is not directly connected to an image forming apparatus. Furthermore, the present invention is directed to image formation preferably used when profile settings of a finisher are transmitted to a host computer when the finisher is not directly connected to an image forming apparatus.

According to a first exemplary embodiment of the present invention, an information processing apparatus is provided which is configured to display a setting screen for enabling an operator to select settings for controlling a print output from an image forming apparatus and post-processing applied to a printed product by a post-processing apparatus independent of the image forming apparatus. The information processing apparatus includes an obtaining unit configured to obtain function information including display information indicating a post-processing function of the post-processing apparatus; and a display control unit configured to change display contents of the setting screen based on the display information included in the function information, and display a changed setting screen.

According to an aspect of the aforementioned embodiment, the information processing apparatus may further include a comparing unit configured to compare the function information with setting information relating to a post-processing function of another post-processing apparatus, wherein the display control unit changes the setting screen based on a comparison result by the comparing unit and displays the changed setting screen. According to another aspect of the embodiment, the display control unit changes the setting screen based on the function information, when the function information disagrees with the setting information, and controls the display unit to display the changed setting screen.

According to another aspect of the aforementioned embodiment, the information processing apparatus may further include a producing unit configured to produce first job control information for controlling the image forming apparatus and second job control information for controlling the post-processing apparatus, based on the settings of the display controlled setting screen. While, according to another aspect of the aforementioned embodiment, the information processing apparatus may include an output unit configured to output the first job control information to the image forming apparatus via a network and output the second job control information to the post-processing apparatus.

According to yet another aspect of the present embodiment, the display control unit controls a display unit to display a selection screen enabling the operator to select one of a plurality of post-processing apparatuses connected via a network, when the plurality of post-processing apparatuses have the same function information. And furthermore, in another aspect of the instant embodiment, the display control unit determines whether there space for displaying the contents of the display information on the setting screen, based on the display information included in the function information; displays the contents of display information on the setting screen when there is the space; and adds a new screen on the setting screen and displays the contents of the display information on the new screen.

According to another aspect of the aforementioned embodiment, fundamental display information for displaying the setting screen and the function information are described in a hierarchical configuration classified into setting items of the setting screen, and, when the function information includes new information not existing in the fundamental display information, in the same hierarchical configuration of the fundamental display information and the function information, the display control unit displays the setting screen incorporating the new information at a corresponding hierarchical position within the fundamental display information.

Furthermore, still yet in another aspect of the present embodiment, the information processing apparatus may further include a function determining unit configured to determine whether an additional function included in the function information is identical with any existing function on the setting screen; and a post-processing apparatus deciding unit configured to decide, when the function determining unit determines that there is any overlap of functions, whether to utilize a post-processing apparatus providing the existing function and a post-processing apparatus providing the additional function.

According to another embodiment of the present invention, an image forming apparatus is provided which is configured to communicate with a post-processing apparatus connected via a network, wherein the image forming apparatus includes an image forming unit for producing a print output. The image forming apparatus includes an obtaining unit configured to obtain function information indicating a post-processing function of the post-processing apparatus; a determining unit configured to determine, based on the function information, whether the image forming unit can execute a print output accompanied by post-processing using the post-processing apparatus; and a display control unit configured to a control a display unit to display a setting screen enabling an operator to perform an input operation for controlling the post-processing function to use the post-processing apparatus, when the determining unit determines that the image forming unit can execute the print output accompanied by post-processing using the post-processing apparatus.

According to an aspect of the aforementioned embodiment, the obtaining unit further obtains capability information of the post-processing apparatus corresponding to the post-processing function and control command information for controlling the post-processing apparatus, from the function information of the post-processing apparatus. According to another aspect of the embodiment, the display control unit adds or changes a display of the setting screen to obtain the print output accompanied by the post-processing using the post-processing apparatus.

According to yet another aspect of the aforementioned embodiment, the image forming apparatus may further include a registering unit configured to register, when the determining unit determines that the image forming unit can execute the print output accompanied by the post-processing using the post-processing apparatus, information relating to the post-processing apparatus including the function of the post-processing apparatus, capability information corresponding to the function, and control command information for controlling the post-processing apparatus.

Furthermore, according to another aspect of the aforementioned embodiment, the image forming apparatus may further include an analyzing unit configured to analyze whether an input print job designates post-processing of the print output; and a selecting unit configured to select a post-processing apparatus that can execute the designated post-processing, based on function information registered by the registering unit, according to analysis of the analyzing unit, wherein the display control unit controls the display unit to display the setting screen enabling the operator to perform an input operation for controlling the print output to use the selected post-processing apparatus, based on capability information registered by the registering unit.

Moreover, according to another aspect of the aforementioned embodiment, the image forming apparatus may further include an output unit configured to transmit a control command registered by the registering unit to the selected post-processing apparatus that executes the post-processing for the print output based on an operator's input through the setting screen.

According to another embodiment of the present invention, an information processing method is provided for an information processing apparatus that displays a setting screen for enabling an operator to select settings for controlling a print output from an image forming apparatus and post-processing applied to a printed product by a post-processing apparatus independent of the image forming apparatus. The method includes obtaining function information including display information indicating a post-processing function of the post-processing apparatus; and changing display contents of the setting screen based on the display information included in the obtained function information, and displaying a changed setting screen.

Additionally, according to still another embodiment of the present invention, an information processing method is provided for an image forming apparatus that communicates with a post-processing apparatus connected via a network and includes an image forming unit for producing a print output. The method includes obtaining function information indicating a post-processing function; determining, based on the function information, whether the image forming unit can execute a print output accompanied by post-processing using the post-processing apparatus; and controlling a display unit to display a setting screen enabling an operator to perform an input operation for controlling the post-processing function to use the post-processing apparatus, when it is determined that the image forming unit can execute the print output accompanied by post-processing using the post-processing apparatus.

Moreover, according to another embodiment of the present invention, a control program is provide which is stored on a computer-readable recording medium containing instructions executable by an information processing apparatus that displays a setting screen for enabling an operator to perform settings for controlling a print output of an image forming apparatus and post-processing applied to a printed product of a post-processing apparatus independent of the image forming apparatus. The control program includes instructions to obtain function information, including display information indicating a post-processing function of the post-processing apparatus; and instructions to change display contents of the setting screen based on the display information included in the function information, and display a changed setting screen.

According to another embodiment of the present invention, a control program is provided which may be stored on a computer-readable recording medium containing instructions executable by an image forming apparatus that communicates with a post-processing apparatus connected via a network and includes an image forming unit for producing a print output. The control program includes instructions to obtain function information indicating a post-processing function of the post-processing apparatus; instructions to determine, based on the function information, whether the image forming unit can execute a print output accompanied by post-processing using the post-processing apparatus; and instructions to control a display unit to display a setting screen enabling an operator to perform an input operation for controlling the post-processing function to use the post-processing apparatus, when it is determined that the image forming unit can execute the print output accompanied by post-processing using the post-processing apparatus.

Further, according to yet another embodiment of the present invention, an information processing apparatus is provided that displays a setting screen for enabling an operator to perform settings for controlling a print output of an image forming apparatus and post-processing applied to a printed product of a post-processing apparatus independent of the image forming apparatus. The information processing apparatus includes an obtaining unit configured to obtain function information, including display information indicating a post-processing function of the post-processing apparatus; and a display control unit configured to change display contents of the setting screen based on the display information included in the function information, and display a changed setting screen.

And finally, according to still another embodiment of the present invention, an image forming apparatus is provided which is adapted to communicates with a post-processing apparatus connected via a network, the image forming apparatus including an image forming unit configured to produce a print output. The image forming apparatus includes an obtaining unit configured to obtain function information indicating a post-processing function of the post-processing apparatus; a determining unit configured to determine, based on the function information, whether the image forming unit can execute a print output accompanied by post-processing using the post-processing apparatus; and a display control unit configured to control a display unit to display a setting screen enabling an operator to perform an input operation for controlling the post-processing function to use the post-processing apparatus, when the determining unit determines that the image forming unit can execute the print output accompanied by post-processing using the post-processing apparatus.

Further features and aspects of the present invention will become apparent from the following detailed description of the numerous exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 shows exemplary contents of a finisher profile of a bookbinding machine.

FIG. 14 shows exemplary contents of a finisher profile of a sheet cutting machine.

FIG. 15 is a block diagram illustrating an exemplary processing section relating to a finisher profile in the image forming apparatus.

FIG. 16 shows exemplary contents of a finisher connection management table.

FIG. 26 shows exemplary contents of a finisher connection management table.

FIG. 28 is an exemplary diagram illustrating the arrangement of an image forming system.

FIG. 29 shows exemplary contents of a profile of a perfect bookbinding machine stored in a finisher profile storing region.

FIG. 34 is a schematic diagram illustrating an exemplary arrangement of an image forming system in accordance with a second exemplary embodiment.

FIG. 35 shows exemplary contents of a profile of a three-side sheet cutting machine stored in the finisher profile storing region.

FIG. 49 shows exemplary contents of a finisher profile describing the information relating to near-line finisher functions.

FIG. 50 shows exemplary contents of a finisher connection management table.

FIG. 51 illustrates an exemplary finisher capability management table.

FIG. 54 is a flowchart describing an exemplary processing flow of the near-line finisher and the image forming apparatus, performed when the near-line finisher is connected to the image forming system.

DETAILED DESCRIPTION OF THE EMBODIMENTS

Figure 1:
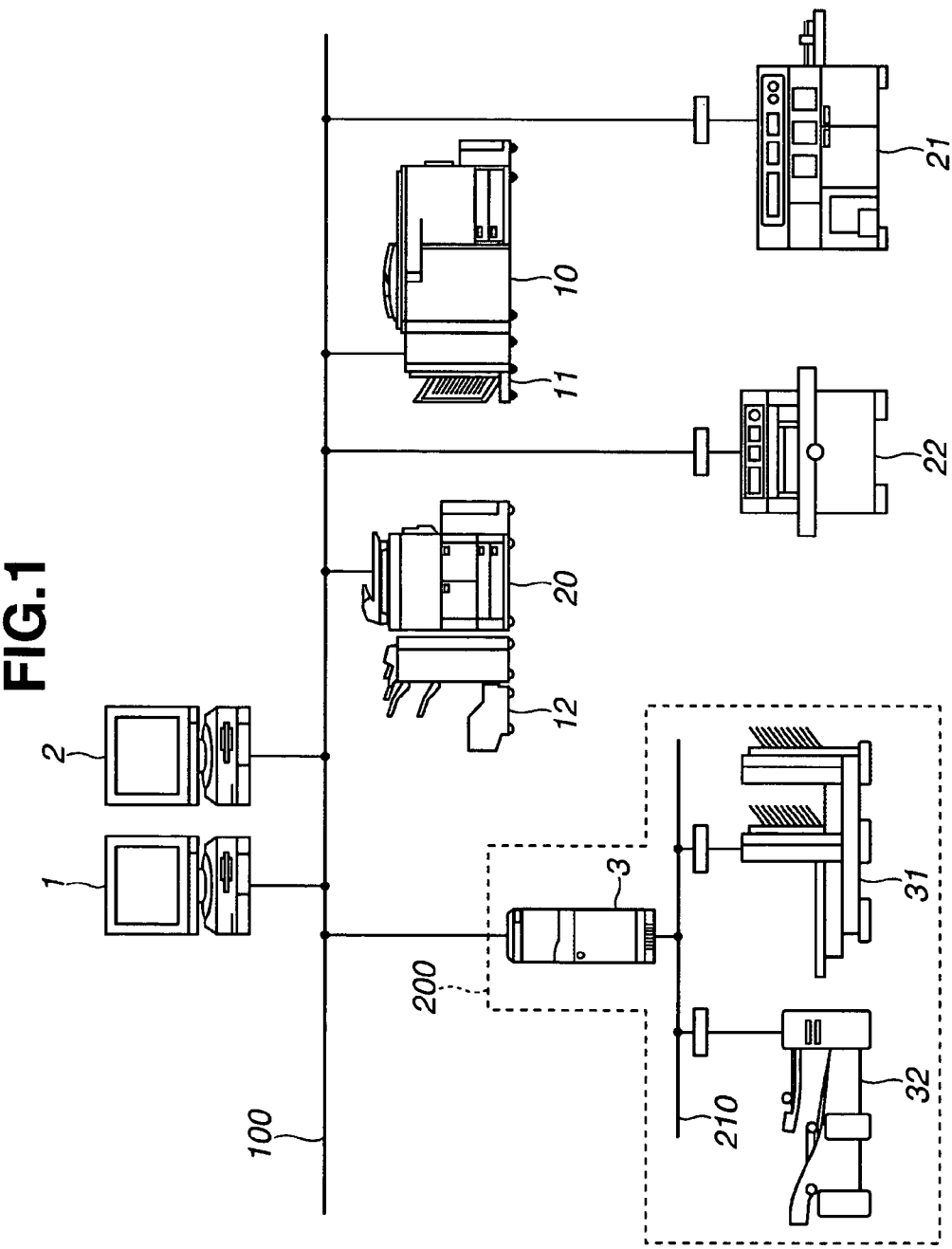
FIG. 1 is a schematic diagram illustrating the arrangement of an image forming system in accordance with an exemplary embodiment.

The following description of the numerous exemplary embodiments is merely illustrative in nature and is in no way intended to limit the invention, its application, or uses.

Note that similar reference numerals and letters refer to similar items in the following figures, and thus once an item is defined in one figure, it may not be discussed for following figures. Exemplary embodiments will be described in detail below with reference to the drawings.

First Exemplary Embodiment

[Exemplary System Arrangement]

FIG. 1 is a diagram showing a schematic arrangement of an image forming system in accordance with an exemplary embodiment. As shown in FIG. 1, plural information processing apparatuses (hereinafter referred to as a "host computer") 1 and 2 and plural image forming apparatuses 10 and 20, such as MFP (multi function peripheral), are connected to a network 100.

In this arrangement, for example, the image forming apparatuses 10 and 20 can receive print jobs from the host computers 1 and 2 via the network 100 and can process the received print jobs. Finishers 11 and 12, respectively connected via physical conveyance paths to the image forming apparatuses 10 and 20, can perform post-processing for printed products produced by the image forming apparatuses 10 and 20. The image forming apparatuses 10 and 20 can set the post-processing for the finishers 11 and 12. In this respect, the finishers 11 and 12 are referred to as "in-line finishers."

On the other hand, when other devices (e.g., devices other than the image forming apparatuses connected via physical conveyance paths) can set the post-processing for the finishers via the network, the finishers are referred to as "near-line finishers." Furthermore, when finishers can set the contents of the post-processing, the finishers are referred to as "off-line finishers." In particular, the near-line finishers and the off-line finishers are different in that the near-line finishers can communicate with other apparatuses. The off-line finishers cannot communicate with other apparatuses.

The control methods of the in-line finishers, the off-line finishers, and the near-line finishers will be described below. The in-line finishers themselves have no capability of directly communicating with the host computers. For example, the in-line finishers are connected with the image forming apparatuses via the common paper conveyance paths and receive printed products conveyed from the image forming apparatuses. The image forming apparatuses can set the contents of processing performed in the finishers. The image forming apparatuses can produce post-processing setting information as the processing contents.

Furthermore, printer drivers operable on the information processing apparatuses can be used to set the in-line finishers as optional configuration of the image forming apparatuses and can produce print jobs designating processing contents (e.g., bookbinding processing) in the in-line finishers.

Next, the off-line finishers have no device configured to communicate with external apparatuses (off-line condition). The off-line finishers can set the contents of processing performed in the finishers. For example, a user can set processing contents through an operating section of the off-line finisher. Alternatively, the off-line finisher can read the print information printed on an object paper sheet, such as a bar code, and can automatically set the post-processing contents.

Finally, the near-line finishers are equipped with a device configured to communicate with external apparatuses. Thus, not only a user can set the processing contents through an operating section of the near-line finisher but also another device, e.g., a host computer, can set the processing contents (i.e., transmit a job ticket) via the network.

Next, the printed product conveyance paths (i.e., paper paths) of the in-line finishers, the off-line finishers, and the near-line finishers will be described below. The following is a description of general features which does not go beyond the purpose of facilitating the understanding, and accordingly should not be used to narrowly interpret the features of these finishers. The in-line finishers are physically connected with the image forming apparatuses and thus can directly receive printed paper sheets produced from the image forming apparatuses via conveyance paths (paper paths). The off-line finishers are not physically connected with the image forming apparatuses. Accordingly, the printed paper sheets produced from the image forming apparatuses are once buffered on carriages, trays, or belt conveyors and are set, at later timing, on input sections of the off-line finishers.

The near-line finishers are similar to the off-line finishers in that the printed paper sheets are once buffered and set, at later timing, on the input sections. However, as described above, the near-line finishers can receive the processing contents (i.e., the job ticket) via the communication device. Furthermore, the in-line finishers can include a communicating section configured to communicate with external devices (e.g., host computers), so that a post-processing instruction (i.e., a job ticket) can be received via the communicating section. In other words, the in-line finishers can function as near-line finishers.

In FIG. 1, the finishers 11 and 12 are constituted as in-line finishers. Furthermore, a near-line finisher 21 (e.g., a casing-in bookbinding machine) and a near-line finisher 22 (e.g., a sheet cutting machine) are connected to the network 100.

It is noted that the present invention is not intended to be limited to the exemplary embodiment shown in FIG. 1. For example, plural near-line finishers each having a casing-in bookbinding function and plural near-line finishers each having a sheet cutting function can be connected to the network 100. In this case, the settings of the near-line finisher can be easily performed based on later-described restriction information (i.e., the information restricting the functions of the finisher).

Furthermore, a finisher system 200 can be connected to the network 100 so as to constitute an image forming system. The finisher system 200 shown in FIG. 1 includes a system server 3, a middle stitch bookbinding machine 31, and a paper folding machine 32 which are mutually connected via a network or a dedicated line (hereinafter, simply referred to as a "network") 210. The system server 3 is connected to the network 100. For example, system server 3 can receive the information relating to the post-processing transmitted from the host computers 1 and 2, and can control the post-processing performed in the middle stitch bookbinding machine 31 and the paper folding machine 32.

Furthermore, the host computers 1 and 2 can obtain restriction information that restricts the functions of the middle stitch bookbinding machine 31 and the paper folding machine 32 included in the finisher system 200. The host computers 1 and 2 can control the display of a user interface based on the obtained restriction information, and can easily perform the settings of the near-line finishers.

[Exemplary Hardware Arrangement of Client PC]

Figure 76:
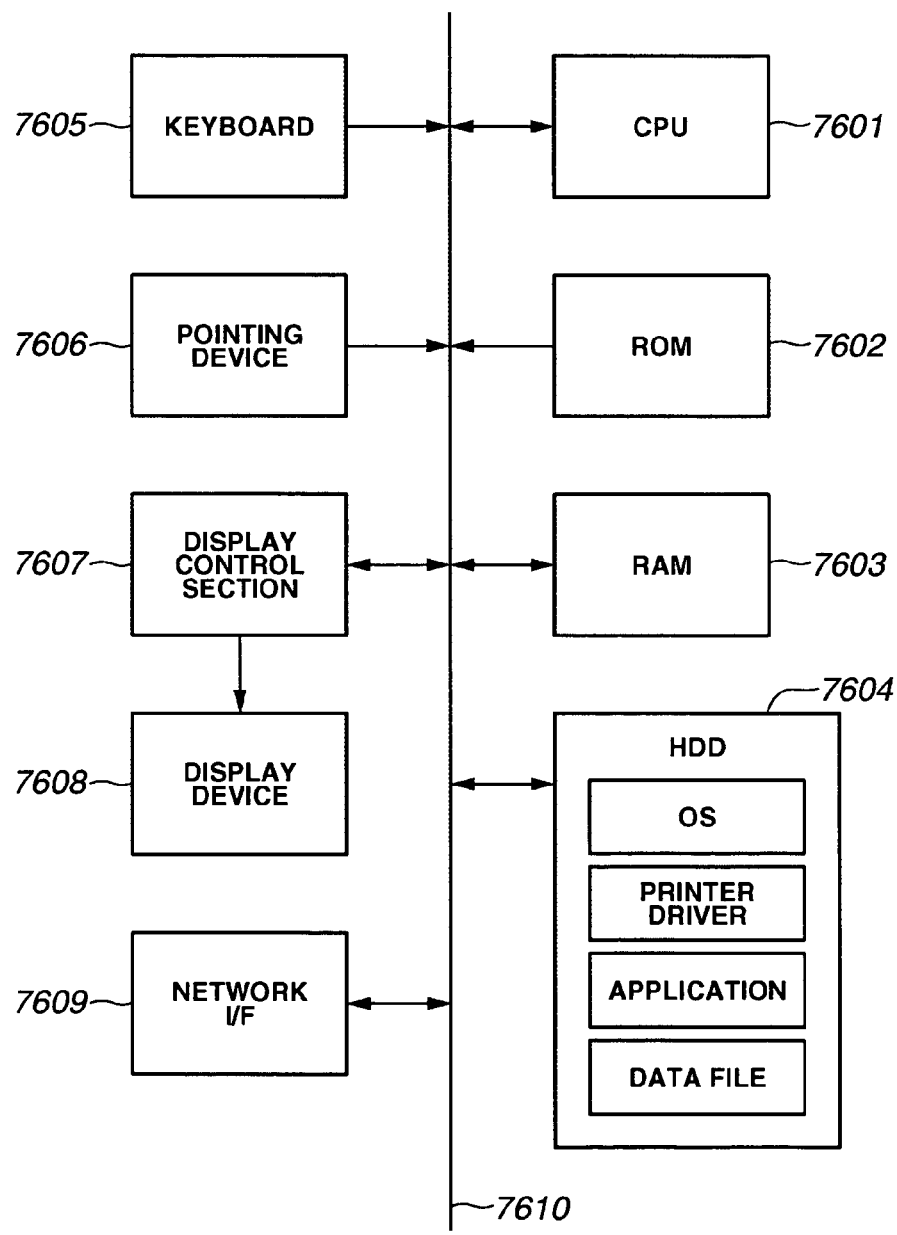
FIG. 76 is a block diagram illustrating an exemplary configuration of a client PC.

FIG. 76 shows an exemplary hardware arrangement of a client PC (i.e., PC 1 or PC 2). The client PC (PC 1 or PC 2) includes a CPU 7601, a ROM 7602, a RAM 7603, a hard disk drive (HDD) 7604, a keyboard 7605, a pointing device 7606, a display control section 7607, a display device 7608, and a network interface 7609 which are connected (in communication) with each other via a system bus 7610. The CPU 7601 can control various operations of the client PC. The ROM 7602 stores a BIOS and a boot program. The RAM 7603 can function as a work area of CPU 7601. The HDD 7604 is a large-capacity storage device that can store an OS (Operating System), a printer driver program, various application programs, and data files created on the applications. The pointing device 7606 is, for example, a mouse (registered trademark).

The display control section 7607, including a video memory, can execute the processing of drawing in the video memory in accordance with an instruction of the CPU 7601 and read image data from the video memory. The display control section 7607 can send the readout image data, as a video signal, to the display device 7608. The network interface 7609 can control and manage the communications between the client PC and the network.

In response to a turning-on action of the electric power source of the apparatus, the CPU 7601 loads the OS from the HDD 7604 to the RAM 7603 in accordance with the boot program stored in the ROM 7602 and activates the OS. Then, a user can operate the keyboard 7605 and the pointing device 7606 to start a desired application program. When the user inputs a print execution instruction from a menu of the application program, the printer driver is loaded to the RAM 7604 and a GUI is displayed to enable the user to execute various print settings. Then, after accomplishing the settings, the user can input a print start instruction to start the print processing.

In the exemplary embodiment, the OS installed on the client PCs 1 and 2 is Windows (registered trademark) provided by Microsoft Corporation. However, any other OS of GUI can be used. Furthermore, the display device 7608 displays a cursor that can shift on a display screen in accordance with a movement of the pointing device 7606. Furthermore, the pointing device 7606 has one or plural buttons. The user can operate the pointing device 7606 to shift the cursor to a target object (e.g., a displayed button or menu item) and can depress a button of the pointing device 7606 as a sequential operation. This sequential operation is referred to as a "click operation" or simply referred to as a "click."

[Exemplary Operation of Printer Driver]

Figure 2:
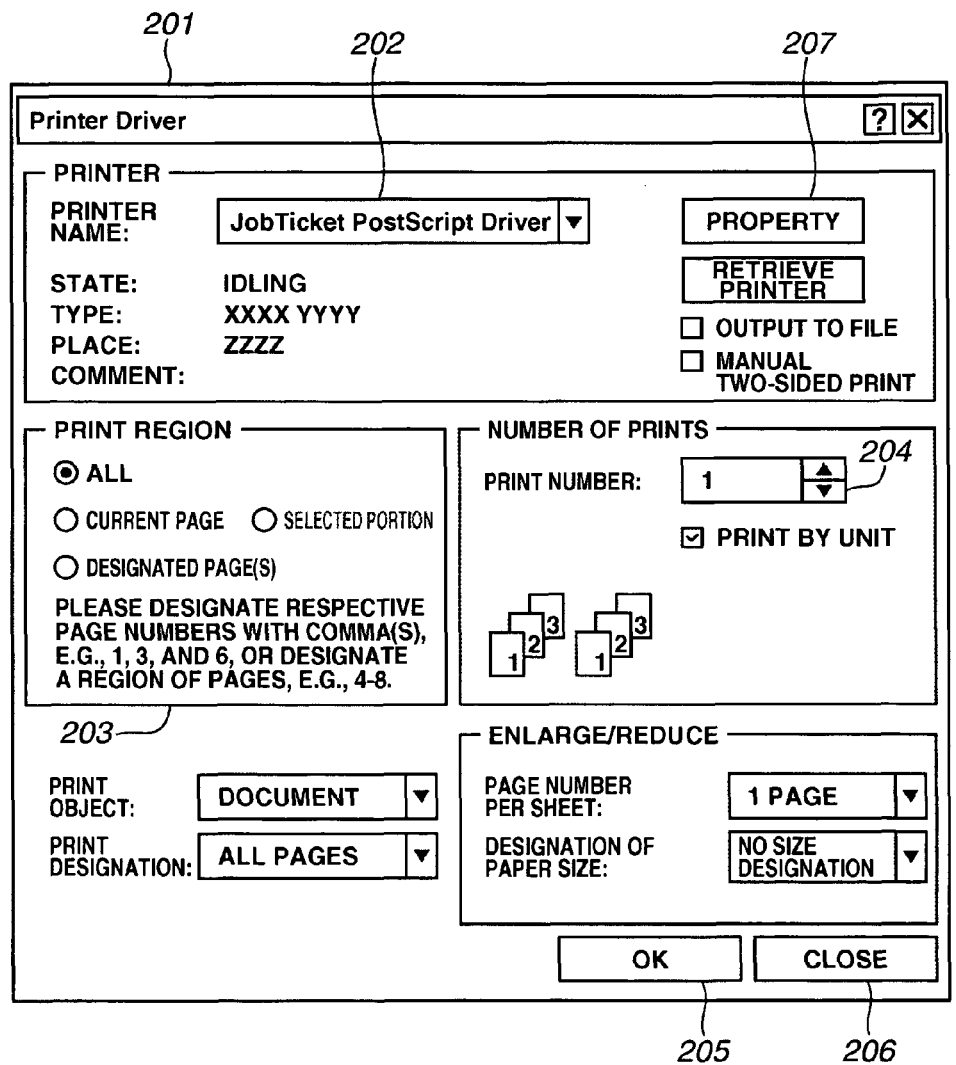
FIG. 2 is a view illustrating an exemplary printer driver UI screen of host computers 1 and 2.
Figure 3:
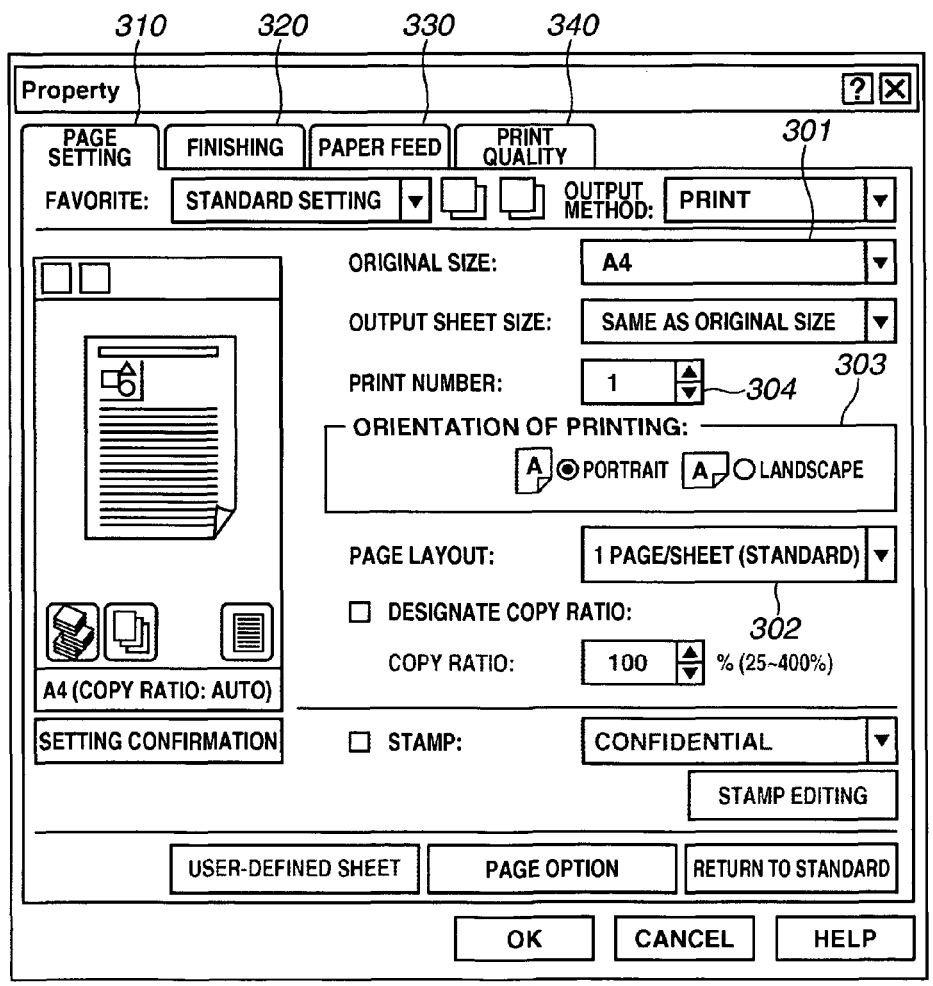
FIG. 3 is a view illustrating an exemplary operation screen (UI) displayed when a user selects a property key.
Figure 4:
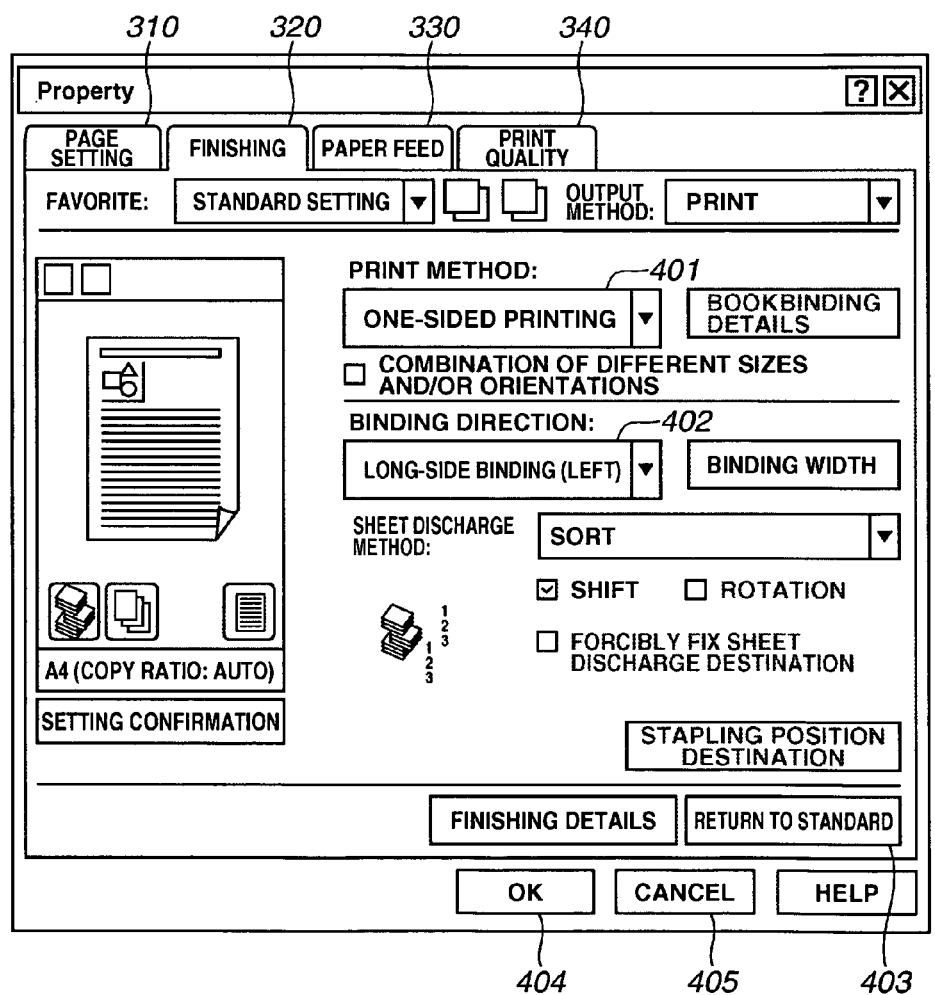
FIG. 4 is a view illustrating an exemplary operation screen (UI) displayed when the user selects the property key.

FIGS. 2 to 4 show an exemplary UI screen of the printer driver used in the host computers 1 and 2. When various setting parameters (i.e., print output processing conditions) are set on the UI screen, the printer driver can transmit, via the network 100 or other communication medium, a command relating to the print output processing conditions together with required image data to a transmission destination, such as an image forming apparatus.

FIG. 2 shows an exemplary UI screen window 201 of the printer driver. The window 201 of the printer driver includes, as a setting item, a transmission destination selecting column 202 that designates an output destination of a print job (including print data). The selecting column 202 allows an operator (i.e., user) to select a desired output destination (i.e., an image forming apparatus) in the image forming system.

The window 201 includes, as another setting item, a page setting column 203 that allows the operator to select a print range in the print job. In other words, the user can designate a desirable range (page(s)) of the image data produced on the application software (hereinafter, referred to as "application") operating on the host computer. For example, the user can control, through the page setting column 203, the image forming apparatus to print all pages or specific page(s) only.

Furthermore, through a print number setting column 204, the user can designate a print number representing the total number of prints to be produced by the image forming apparatus. By clicking on arrows (arrows of scroll bar), the user can increase or decrease the print number. Also, through a property key 207, the user can perform detailed settings relating to the image forming apparatus selected in the transmission destination selecting column 202. In response to a user's input operation on the key 207, the printer driver can control the host computer to display detailed screens shown in FIGS. 3 and 4.

The user can make a key input on an OK key 205 when the settings have been accomplished as the user like on the operation screen of FIG. 2. In response to the user's input, the selected image forming apparatus starts the print processing according to the user's determined settings. The user can depress a cancel key 206 to cancel the processing. When the cancel key 206 is depressed, the printer driver executes a control for canceling the print and terminates the display of the window 201.

FIGS. 3 and 4 show exemplary operation screens (UI) displayed when the user selects the property key 207. The screen shown includes tab keys, such as "page setting" tab 310, "finishing" tab 320, "paper feed" tab 330 and "print quality" tab 340. The user can input an instruction by clicking on a desired tab key (with a pointing device or other operating section equipped in a host computer) to perform the settings for various detailed print output conditions including the settings relating to the "page setting" tab 310, the settings relating to the "finishing" tab 320, the settings relating to the "paper feed" tab 330, or the settings relating to the "print quality" tab 340.

FIG. 3 shows a screen example displayed when the "page setting" tab 310 is depressed. The screen of FIG. 3 includes a paper size setting portion 301 designating the size of recording paper sheets, an input section 302 setting a surface-mounting layout that determines how many page images are arranged on one recording paper sheet (N-up), an orientation setting portion 303 designating the orientation of the printed recording paper sheet, and an input section 304 setting a print number.

FIG. 4 shows a screen example displayed when the "finishing" tab 320 is depressed. On the screen shown in FIG. 4, the user can perform the settings relating to the device selected on the operation screen shown in FIG. 2. When the "finishing" tab 320 is selected based on a user's key operation, the printer driver 505 displays a finisher selecting screen (not shown) to let the user select a desirable finisher if there are plural finisher profiles. When a desirable finisher is selected, the printer driver reads profile information of the selected finisher and displays an operation screen shown in FIG. 4 on the display section according to the readout profile information.

For example, the settings attainable through the operation panel shown in FIG. 4 include various detailed settings, such as the settings relating to stapling processing, the settings relating to sort processing, the settings relating to punching processing, the settings relating to drilling processing, the settings relating to bookbinding processing, the settings relating to sheet processing (including the settings relating to the finishing), the settings relating to selection between one-sided printing and two-sided printing, and the settings relating to image processing (e.g., parameter change relating to tint).

For example, the user can select the one-sided print (or, can switch to the two-sided print) in the selecting field 401 and can select, as post-processing for printed products, a preferable bookbinding direction in a selecting field 402 for the image forming apparatus selected on the operation screen of FIG. 2. The selecting field 402 of FIG. 4 shows the condition that a long-side binding (left) is set as the binding direction of printed products. The binding directions selectable in the selecting field 402 includes a short-side binding (left), a short-side binding (right), and a long-side binding (right) in addition to the long-side binding (left).

The post-processing for the printed products include two types, if the near-line finisher 21 is designated beforehand to perform predetermined post-processing (e.g., casing-in bookbinding). According to the first processing, the printer driver 505 transmits to the image forming apparatus 10 a print job including job control information describing the contents of post-processing performed in the near-line finisher 21 and a near-line finisher ID. According to the second processing, the printer driver 505 (see FIG. 5) produces a job ticket describing post-processing contents and a job ID (identifier) and outputs the produced job ticket to the near-line finisher 21.

In response to a user's operation in an input field 403, the printer driver controls the display of the operation screen shown in FIG. 4 so as to return the print detailed settings to initial values. Furthermore, in response to a user's selection of the "print quality" tab 340, the user can perform the settings relating to resolution or half tone (although not shown).

When the user depresses (instructs) an OK key 404, the printer driver enables the property settings and returns the display screen to the UI screen of FIG. 2. When the user depresses (instructs) a cancel key 405, the printer driver disables the property settings and returns to the UI screen of FIG. 2. The printer driver outputs, as the print job, the print processing conditions including various detailed settings and the image data to the designated device (e.g., image forming apparatuses 10 and 20). The host computer can control the device according to various print processing conditions to execute the image data processing.

[Exemplary Printer Driver Configuration]

Figure 5:
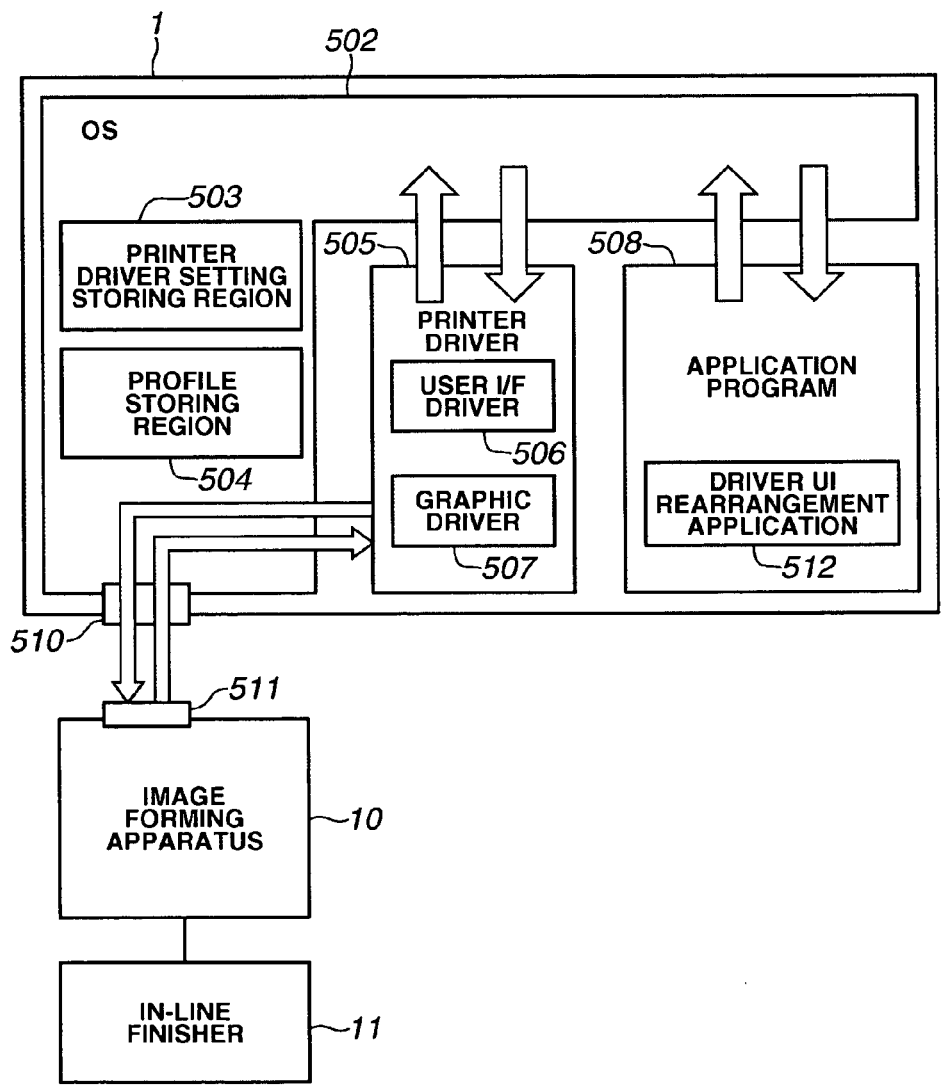
FIG. 5 is a diagram illustrating an exemplary software configuration of the host computer including a printer driver.

FIG. 5 is a diagram showing an exemplary software configuration of the host computer including a printer driver. The configuration shown in FIG. 5 is applied to the host computer 1 (FIG. 1), although the other host computer 2 has a similar configuration. In FIG. 5, an operating system (OS) 502 manages various controls of the host computer 1. The printer driver 505 and application software (program) 508 are installed on the OS 502 and controlled by the OS 502. A driver UI rearrangement application 512, contained in the application program 508, can rearrange the printer driver UI based on the information relating to the finisher profile stored in a profile storing region 504.

The driver UI rearrangement application 512 can compare the obtained finisher profile with the functions displayed on the present printer driver UI, determine whether a display relating to finisher functions should be added on the UI or deleted from the UI, and update the display of the UI based on the judgment. The display control based on the driver UI rearrangement application 512 will be described in more detail with reference to the flowchart of FIG. 39A.

If desirable, the driver UI rearrangement application 512 can be configured as part of the printer driver 505. In this case, the printer driver 505 must determine whether a display relating to the finisher functions should be added on the UI or deleted from the UI. Furthermore, the function of the driver UI rearrangement application 512 can be provided as part of the function of the OS 502. In this case, the OS 502 must determine whether a display relating to the finisher functions should be added on the UI or deleted from the UI.

The printer driver 505 includes a user I/F driver 506 and a graphic driver 507. The user I/F driver 506 can display the user interface (I/F) and store the setting data. The graphic driver 507 can receive a print drawing command instructed from the application program 508 via the OS 502, and can convert the received command into a code that the image forming apparatus (10, 20) can interpret. The printer driver 505 can control the display of the printer driver UI based on the processing of the driver UI rearrangement application 512. The user I/F driver 506 can display the above-described print setting dialog and the property sheet shown in FIGS. 2 through 4 on the screen, when the print settings are instructed from the application program 508 via the OS 502.

The OS 502 includes a printer driver setting storing region 503. The print attributes that the user sets through the user I/F driver 506 can be stored in the printer driver setting storing region 503. Furthermore, the user I/F driver 506, the graphic driver 507, and the application program 508 can access the printer driver setting storing region 503 via the OS 502, and read the print attributes set by the user.

Furthermore, a communication I/F 510 of the host computer is connected to a communication I/F 511 of the image forming apparatus 10 via the communication medium (network 100) The graphic driver 507 can transmit, via the OS 502, a print job (print data), for example, to the image forming apparatus 10. Furthermore, the graphic driver 507 can obtain, via the OS 502, the information relating to configuration of the image forming apparatus 10 as well as the information relating to the status.

[Exemplary Flow of Printing]

Figure 6:
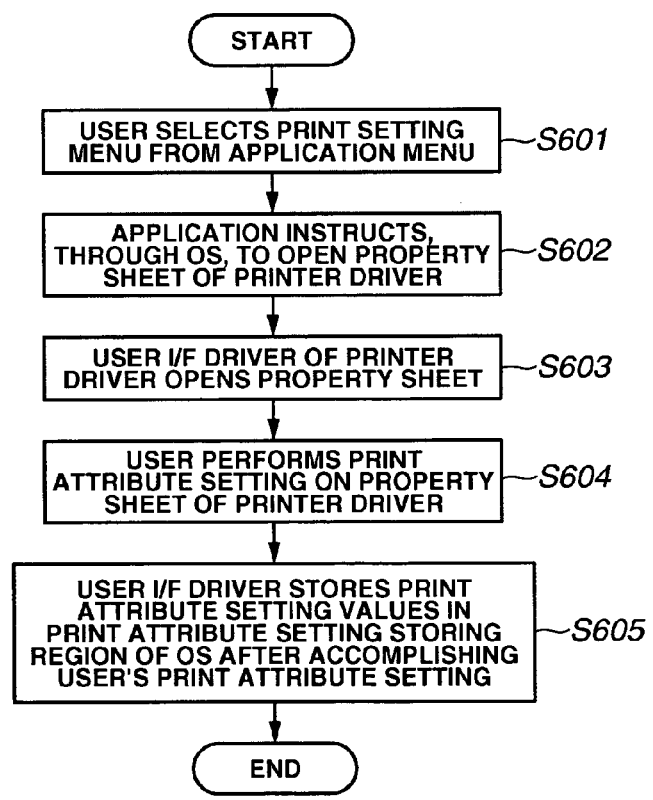
FIG. 6 is a flowchart describing an exemplary procedure pertaining to user's settings with respect to print attributes.
Figure 7:
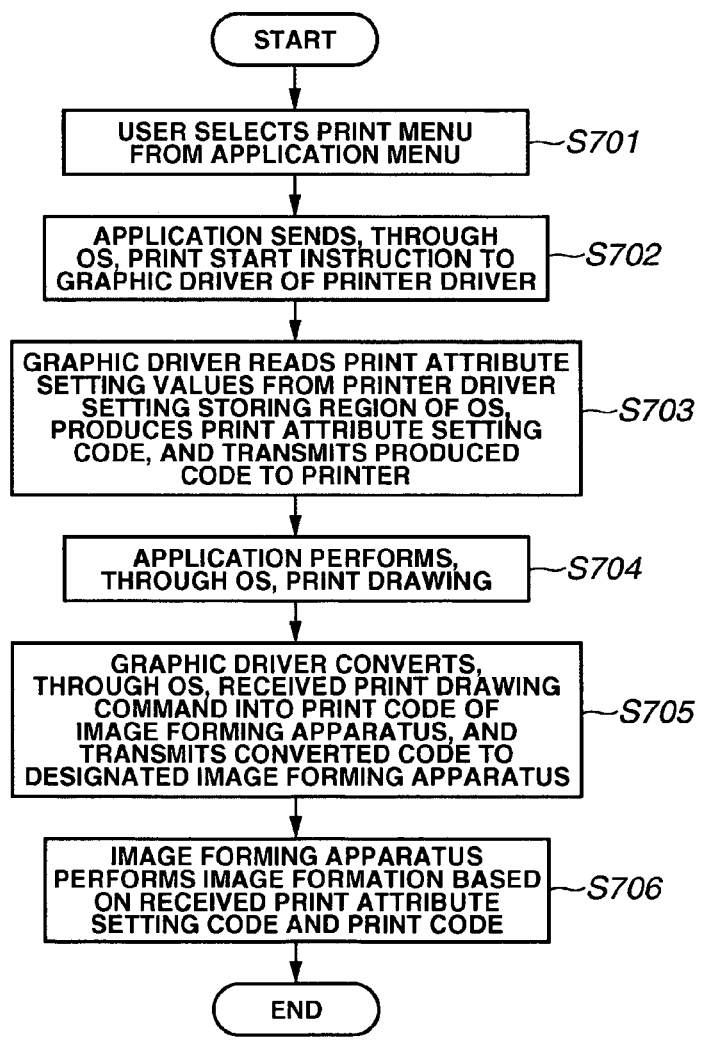
FIG. 7 is a flowchart describing an exemplary procedure starting with a user's print instruction and ending with a printing operation.

Next, a printing flow starting with user's settings of print attributes on the printer driver and ending with the output of print products will be described. FIG. 6 is a flowchart showing the setting procedure performed by a user to set print attributes. FIG. 7 is a flowchart showing the flow starting with a user's print instruction and ending with the print operation.

First, in step S601 of FIG. 6, the user can select a print setting menu from a menu of the application program 508 (hereinafter, simply referred to as "application"). In response to selection of the print setting menu, the application 508 calls an API (Application Programming Interface) of the OS 502 and instructs the printer driver 505 to display a print attribute setting property sheet (refer to step S602). In response to the instruction, the OS 502 controls the printer driver 505 to perform the display of the print attribute setting property sheet.

In step S603, the user I/F driver 506 of the printer driver 505 receives the instruction from the OS 502 and displays the print attribute setting property sheet shown in FIG. 2 on the screen of the display device. Next, in step S604, the user can set desired print attributes on the above-described property sheets shown in FIGS. 2 to 4. After completing the print attribute settings, the user can depress the OK button 205 on the property sheet of FIG. 2 to fix the print attribute settings. In response to the depression of the OK button 205, the user I/F driver 506 calls the API of the OS 502 and stores the print attribute setting values set by the user in the printer driver setting storing region 503 of the OS 502 (refer to step S605). With the above-described operations, the settings of print attributes and the storage of setting values can be completed.

Next, to print a document according to the print attribute settings, the user can execute the procedure shown in the flowchart of FIG. 7. First, in step S701, the user can select a print menu from the menu of the application 508. In response to the user's selection, the processing procedure proceeds to step S702. In step S702, the application 508 calls the API of the OS 502 and instructs the printer driver 505 to start the printing operation. The print setting dialog shown in FIG. 2 can be once displayed during the processing of FIG. 7. In response to a print instruction, the OS 502 instructs the printer driver 505 to start the print operation.

In response to a print start instruction, the graphic driver 507 of the printer driver 505 reads the print attribute setting values from the printer driver setting storing region 503 of the OS 502 (refer to step S703). Then, the graphic driver 507 produces a print attribute setting code and transmits the produced code to a designated image forming apparatus. Next, in step S704, the application 508 performs, through the OS 502, the print drawing based on the document data.

In step S705, the OS 502 sends a drawing instruction to the graphic driver 507. The graphic driver 507 converts a received print drawing command into a print code that the image forming apparatus can interpret, and transmits the print code to the image forming apparatus. In step S706, the image forming apparatus performs the image forming processing, including the rendering, based on the received print attribute setting code and the print code. Then, the image forming apparatus outputs print products.

Through the above-described procedure, the user can set desired print attributes and can obtain print products.

[Exemplary Arrangement of Image Forming Apparatus]

Figure 8:
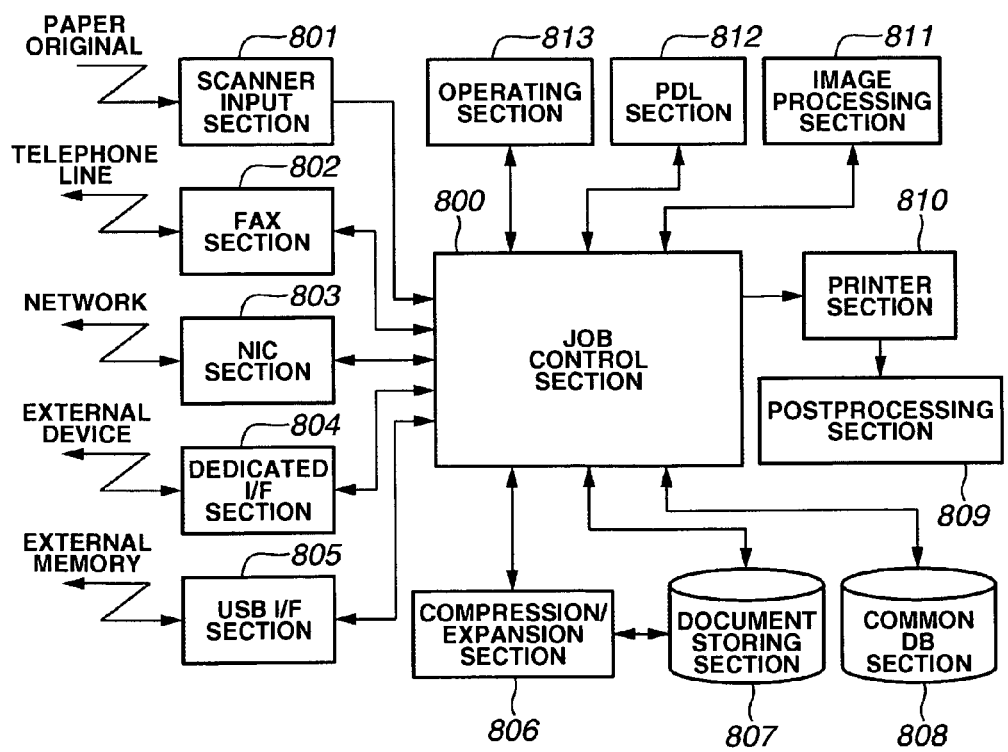
FIG. 8 is a block diagram illustrating an exemplary arrangement of an image forming apparatus.

FIG. 8 is block diagram showing the arrangement of an image forming apparatus in accordance with an exemplary embodiment. The image forming apparatus includes a job control section 800, a scanner input section 801, a FAX section 802, an NIC (Network Interface Card) section 803, a dedicated I/F section 804, a USB interface (I/F section) 805, a compression/expansion section 806, a document storing section 807, a common DB section 808, a post-processing section 809, a printer section 810, an image processing section 811, a PDL section 812, and an operating section 813.

The scanner input section 801 can perform reading of images. The FAX section 802, represented by a facsimile, can perform transmission/reception of images via a telephone line. The NIC section 803 can perform transmission/reception of image data and device information via a network. The dedicated I/F section 804 can perform transmission/reception of information with other image forming apparatus or with a host computer. The USB interface 805 can perform writing/reading of image data with a USB device represented by a USB (Universal Serial Bus) memory.

The job control section 800 can temporarily store image data according to the operation of the image forming apparatus, appropriately read the image data, and control an output processing step (processing path). Furthermore, in response to an operator's instruction entered from the operating section 813, the job control section 800 can perform the data transfer to external apparatuses. More specifically, the job control section 800 can transmit the image data read out from the memory, such as a hard disk, to the host computers 1 and 2 and other image forming apparatuses via the dedicated I/F section 804.

The document storing section 807 includes a hard disk or a comparable memory that can store numerous image data. For example, the document storing section 807 can store, in its memory, plural types of image data including image data entered from the scanner input section 801, image data of a facsimile job entered via the FAX section 802, image data transmitted from a computer or other external apparatus and entered via the NIC section 803, and image data transmitted from other image forming apparatus and entered via the dedicated I/F section 804.

Furthermore, according to the processing of the printer section 810 (or other output section), the job control section 800 can read the image data from the hard disk or other memory and can transfer the readout image data to the printer section 810 (or output section) appropriately.

The compression/expansion section 806 can compress image data when the image data are stored in the document storing section 807 and further can expand the compressed image data to the original data when the image data are read out of the document storing section 807. Furthermore, if the image data are JPEG, JBIG, ZIP, or other compression data transmitted via the network, the compression/expansion section 806 can extract (expand) the compression data after the image data are entered into the image forming apparatus.

The common DB section 808 stores various parameters and tables, such as fonts, color profiles, and gamma tables, which are commonly used and can be read out when required. Furthermore, the common DB section 808 can store new parameters and tables and can correct and update the stored parameters and tables. For example, the common DB section 808 can store register data relating to a near-line finisher which is newly registered to the image forming apparatus.

When PDL data are entered, the job control section 800 controls the PDL section 812 to execute RIP (Raster Image Processor) processing and also controls, if necessary, the image processing section 811 to perform the image processing for outputting print products. Furthermore, the job control section 800 can control the document storing section 807 to store intermediate data produced in the processing of the image data or print ready data (i.e., print output bit map data or their compressed data) if necessary.

The job control section 800 can send the above-described print ready data to the printer section 810. The post-processing section 809 can execute finishing processing (e.g., sorting or bookbinding processing) for the recording materials (e.g., recording paper sheets) printed in the printer section 810.

The job control section 800 can perform switching of paths according to the operation of the image forming apparatus. Numerous examples of the aforementioned path switching are provided below, such as:

Copy function: Scanner input section →Image processing section →Printer section;

FAX reception function: FAX section →Image processing section →Printer section;

Network scan: Scanner input section →NIC section;

Network print: NIC section →PDL section →Image processing section →Printer section;

Scanning to external apparatus: Scanner input section →Dedicated I/F section;

Printing from external apparatus: Dedicated I/F section →Image processing section →Printer section;

Scanning to external memory: Scanner input section →USB I/F section;

Printing from external memory: USB I/F section →PDL section →Image processing section →Printer section;

Box scan function: Scanner input section Image processing section →Document storing section;

Box print function: Document storing section Printer section;

Box reception function: NIC section →PDL section →Image processing section →Document storing section;

Box transmission function: Document storing section →NIC section; and

Preview function: Document storing section →Operating section.

Also, other various functions, including E-mail service and Web server function, can be combined with the above examples.

The box scan, box print, box reception, and box transmission functions are performed by the image forming apparatus to execute writing and reading of data using the document storing section 807. More specifically, to execute the input/output of data, the memory of the document storing section 807 is divided into plural regions to temporarily store the data for respective jobs or users together with user IDs and passwords.

Furthermore, the operating section 813 can allow a user to select one of the above-described various flows or functions and also allow the user to input an instruction. When the operating section 813 has a high-resolution display device, the user can use the operating section 813 to preview the image data stored in the document storing section 807 and can instruct printing of the image data if acceptable.

The image forming apparatus 10 can set the functions of the in-line finisher 11 and the near-line finishers 21 and 22. The image forming apparatus 10 can store finisher profiles (later-described) that describe the functions of respective finishers. The image forming apparatus 10 can transmit the finisher profiles to the host computer (e.g., 1 or 2 of FIG. 1) to set the functions to be used. The host computer can execute a setting operation based on the received finisher profiles. For example, at the timing of shipment, the image forming apparatus 10 can obtain the profiles of all types of connectable finishers and store the obtained profiles in its memory.

In this case, if the image forming apparatus 10 newly supports the near-line finishers 21 and 22 after finishing the shipment, the image forming apparatus 10 can obtain profile information (i.e., near-line finisher profiles) of the near-line finishers 21 and 22 at the timing the near-line finishers 21 and 22 are newly connected to the network.

Furthermore, when a finisher has no profile information, the image forming apparatus 10 can obtain the profile information from a home page of the finisher maker that can provide newest profile information including updated (i.e., changed or added) functions. Accordingly, even if no finisher profiles are available at the timing of shipment, the image forming apparatus 10 can later obtain necessary profiles. The profile information describes the capabilities and properties of a corresponding apparatus. In this respect, the profile information can be referred to as capability information or property information.

[Exemplary Setting of Finisher]

The job control section 800 can hold the finisher profiles describing the functions of the post-processing section 809 (i.e., the in-line finisher, the near-line finisher, and the off-line finisher), for example, in the common DB section 808. The job control section 800 can set the functions to be used based on the finisher profiles.

At the timing of shipping the image forming apparatus, the common DB section 808 can store the profiles of all finishers that are connectable to the image forming apparatus. Furthermore, when a finisher is newly connected to the image forming apparatus after finishing the shipment, the job control section 800 of the image forming apparatus can obtain the profile information stored in this finisher. The job control section 800 of the image forming apparatus can communicate via the NIC section 803 with the near-line finishers (e.g., 21 and 22 in FIG. 1) and the finisher system (e.g., 200 in FIG. 1) connected to the network 100, to obtain the finisher profile data.

Furthermore, when a finisher has no profile information, the job control section 800 of the image forming apparatus can download the profile information of a home page of the finisher maker that can provide newest profile information including updated (i.e., changed or added) functions.

[Exemplary Arrangement of Post-Press]

The present exemplary embodiment discloses a middle stitch bookbinding machine, as an example of the in-line finisher, and a perfect bookbinding machine (FIG. 10) and a sheet cutting machine (FIG. 11) as examples of the near-line finisher.

Figure 9:
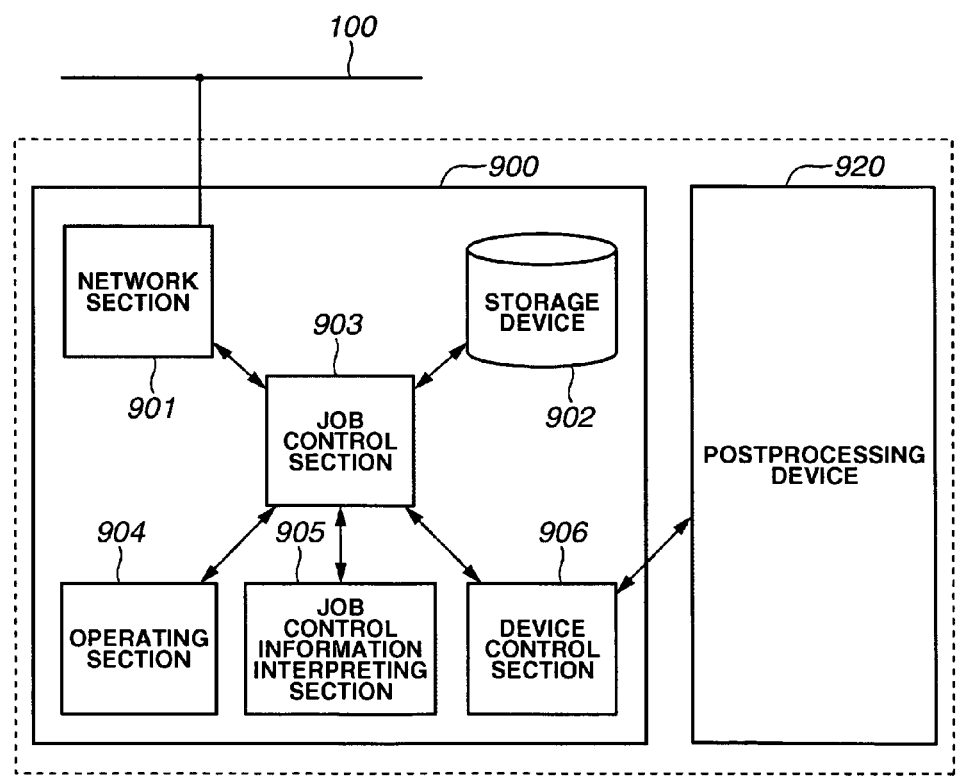
FIG. 9 is a block diagram illustrating an exemplary internal arrangement of a controller of a near-line finisher.

FIG. 9 is a block diagram showing an example of the internal arrangement of a controller 900 of the near-line finisher that controls a post-processing device 920. The controller 900 includes a network section 901, a storage device 902, a job control section 903, an operating section 904, a job control information interpreting section 905, and a device control section 906.

The network section 901 can perform communications with other network devices, such as the host computer and the image forming apparatus. The storage device 902 is a primary storage device, such as DRAM, which can temporarily store the information or a secondary storage device, such as HDD. The job control section 903 can control a job of the near-line finisher. The operating section 904 can allow a user to input ID or other information. The job control information interpreting section 905 can interpret and convert the entered job information into the form capable of controlling the post-processing device. The device control section 906 can control the post-processing device 920. The above-described modules constitute the near-line finisher.

Figure 10:
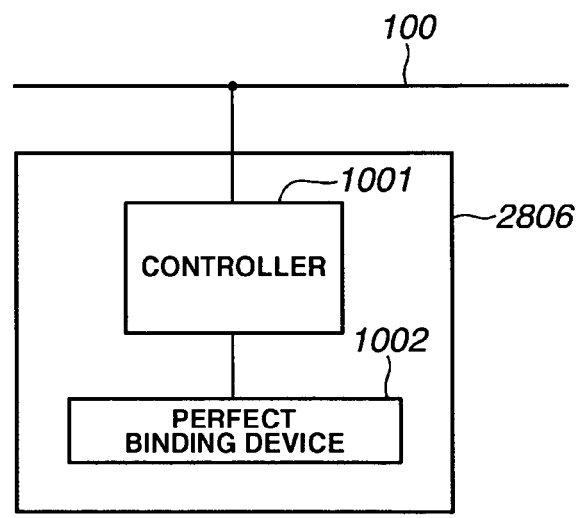
FIG. 10 is a block diagram illustrating an exemplary configuration of a perfect bookbinding machine.
Figure 11:
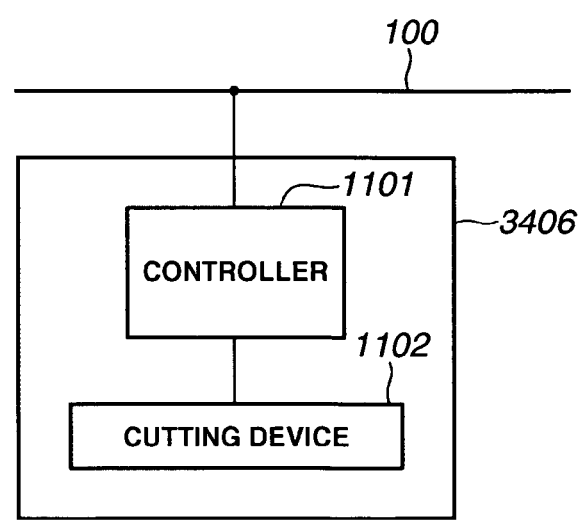
FIG. 11 is a block diagram illustrating an exemplary configuration of a sheet cutting machine.

In FIG. 10, a controller 1001 has functions comparable with those of the controller 900 shown in FIG. 9. Thus, under the control of the controller 1001, the perfect bookbinding machine 2806 can communicate with other devices via the network 100 and can control a perfect binding device 1002. Similarly, in FIG. 11, a controller 1101 has functions comparable with those of the controller 900 shown in FIG. 9. Thus, under the control of the controller 1101, the sheet cutting machine 3406 can communicate with other devices via the network 100 and can control a sheet cutting device 1102.

[Exemplary Processing Flow in Near-Line Finisher]

Figure 12:
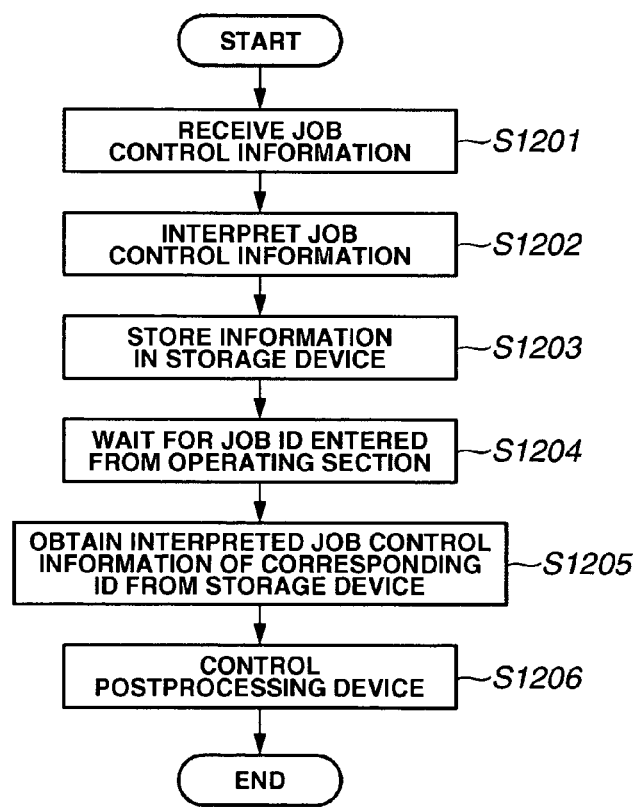
FIG. 12 is a flowchart describing an exemplary processing flow in a near-line finisher.

FIG. 12 is a flowchart showing a processing flow of the near-line finisher. First, in step S1201, the network section 901 receives job control information. The job control information interpreting section 905 interprets the received job control information (refer to step S1202), and converts the job control information into the data capable of controlling the post-processing device 920. The storage device 902 stores the job control data together with the print job ID (refer to step S1203). Next, the operating section 904 allows an operator to input a job ID of the print job to be processed (refer to step S1204). In response to the user's input, the job control section 903 obtains job control information relating to the designated print job from the storage device 902 (refer to step S1205). The job control information is set in the device control section 906. Then, the device control section 906 controls the post-processing device 920 according to the job control information (refer to step S1206).

In the flowchart of FIG. 12, the storage device 902 temporarily stores the job control information and the job control information can be read out at appropriate timing. However, when a network server (or MFP) capable of storing such job control information is available, the received job control information can be registered in the server. In this case, in response to a job ID entered from the operating section 904, the job control section 903 can access the server to obtain the job control information corresponding to the entered job ID, and can transfer the job control information to the job control information interpreting section 905.

[Internal Configuration of Profile]

In the present exemplary embodiment, the finisher profile is described by XML (extensible Markup Language) format. There are various types of finishers, such as bookbinding machines, sheet cutting machines, and holding machines, which are differentiated in functions. Furthermore, due to addition of new function(s), same type of finishers may have different profiles. Therefore, the finisher profiles are described according to the XML format described by the tag format, as a transcription capable of appropriately responding to the addition of functions. Needless to say, the format of finisher profiles is not limited to the XML format and therefore can be any other format that can be adaptively described in response to the addition of new functions.

FIG. 13 shows an example of the finisher profile of a bookbinding machine. FIG. 14 shows an example of the finisher profile of a sheet cutting machine. In FIGS. 13 and 14, "FinishingType" (1301, 1401) represents a type of the bookbinding machine or the sheet cutting machine, "Manufacturer" (1302, 1402) represents a maker (i.e., manufacture) name, and "ProductName" (1303, 1403) represents a product type. According to the example shown in FIG. 13, the bookbinding machine (Type: Bookbookbinding) is the type 11ABC manufactured by ABC corporation. According to the example shown in FIG. 14, the sheet cutting machine (Type: Cutting) is the type 10XYZ manufactured by XYZ corporation. The tags, such as "Booklet" (1304) in FIG. 13 and "Cutting" (1404) in FIG. 14, describe inherent capabilities of the bookbinding machine and the sheet cutting machine.

For example, in the case of the bookbinding machine (refer to FIG. 13), variations of the bookbinding, such as "middle stitch folding" (1305), "side stitch" (1306), "corner stitch" (1307), "double folding" (1308), "side stitch folding" (1309), and "corner stitch folding" (1310), can be registered as bookbinding functions. Further, reference numeral 1311 represents function information.

Furthermore, in the case of the sheet cutting machine (refer to FIG. 14), cutting size information (1405, 1406) and maximum thick information 1407 can be registered. Furthermore, according to the "cutting" tag 1404 of FIG. 14, the maximum input dimensions (MaxInputDimensions) are 360 mm in both longitudinal and lateral (X, Y) directions. Furthermore, the maximum output dimensions (MaxOutputDimensions) are 310 mm in both longitudinal and lateral (X, Y) directions. The minimum output dimensions (MinoutputDimensions) are 80 mm in the lateral (X) direction and 150 mm in the longitudinal (Y) direction. Furthermore, the maximum thickness (MaxThickness) is 70 mm.

As described above, the profile information of each finisher includes various information, such as type of function (machine type), maker name, product type, and performances (e.g., dimensions and stitch position) in each function. The profile information is, for example, stored in a storage device 2101 of the finisher. The image forming apparatus can read the profile information from the storage device 2101. The information processing apparatus, serving as a host computer, can directly collect the profile information from the near-line finisher under the control of its printer driver.

Regarding the inherent functions of each finisher, they can be independently defined using tags to describe the profile.

[Finisher Connection and Management of Profile]

FIG. 15 is a block diagram showing an exemplary processing section relating to finisher profiles in the image forming apparatus 10. The image forming apparatus 10 includes a communication I/F 1502, a finisher profile control section 1503 which is part of a processor 1507, a finisher connection management table 1504, an operation panel 1506 and a finisher profile storing region 1505. The communication I/F 1502 can communicate with external devices. The finisher profile control section 1503 can manage the finisher profiles and transmit a profile in response to a request from an external device.

The finisher connection management table 1504 can manage finisher names, corresponding finisher profile names, and connection states. The finisher profile storing region 1505 can store detailed contents of the finisher profile. The finishers connectable to the image forming apparatus 10 are registered beforehand. Their names and other information are stored in the finisher connection management table 1504. The profiles corresponding to respective finishers are stored in the finisher profile storing region 1505.

FIG. 16 is an exemplary table showing the contents of the finisher connection management table 1504. This table includes the information of finishers connectable to the image forming apparatus. The finisher connection management table 1504 includes, as registered items, a management number 1602 (variable type is Unsigned Short), a finisher name 1603 (variable type is String), a maker name 1604 (variable type is String), a corresponding profile's profile name 1605 (variable type is String), and a finisher's connection state 1606 (variable type is Boolean, "false" represents a disconnected state, and "true" represents a connected state).

According to the table, when the management number 1602 is #5, the finisher name 1603 is "Finisher-X", the maker name 1604 is "XYZ" corporation, the corresponding profile's profile name 1605 is "finisher-x-of-xyz.xml", and the finisher's connection state 1606 is "true (i.e., connected)." Similarly, the information corresponding to each management number 1602 can be known from the finisher connection management table 1504. According to the example of FIG. 16, only the finisher having the management number #5 is in a connected state (i.e., true).

Next, an exemplary procedure for connecting the near-line finisher to the image forming apparatus will be described with reference to a flowchart of FIG. 17. For example, the "Finisher-Y" manufactured by XYZ corporation (i.e., the finisher corresponding to the management number #6 in the finisher connection management table 1504 shown in FIG. 15) can be connected in the following manner.

It is now supposed that, after a new near-line finisher is installed, a user connects the near-line finisher to the image forming apparatus via a LAN cable or other communication medium. The finisher profile control section 1503 (i.e., a processor 1507) of the image forming apparatus 10 executes the processing shown in FIG. 17.

In step S1701, a new finisher is installed and connected to the image forming apparatus (e.g., 10 or 20 in FIG. 1) via a communication medium. Next, in step S1702, a user performs a connecting operation, through the operation panel, for a near-line finisher newly connected to the network to bring the near-line finisher into an available condition. The operator, through the operation panel of the image forming apparatus (10, 20), changes the finisher's connection state 1606 from a disconnected state (false) to a connected state (true). The operation contents will be described later with reference to FIGS. 21 to 23. Then, in step S1703, the finisher profile control section 1503 updates the connection state of the finisher connection management table 1504 in response to a response of the near-line finisher indicating that the near-line finisher is ready to use.

[Renewal Operation of Connection State]

Figure 21:
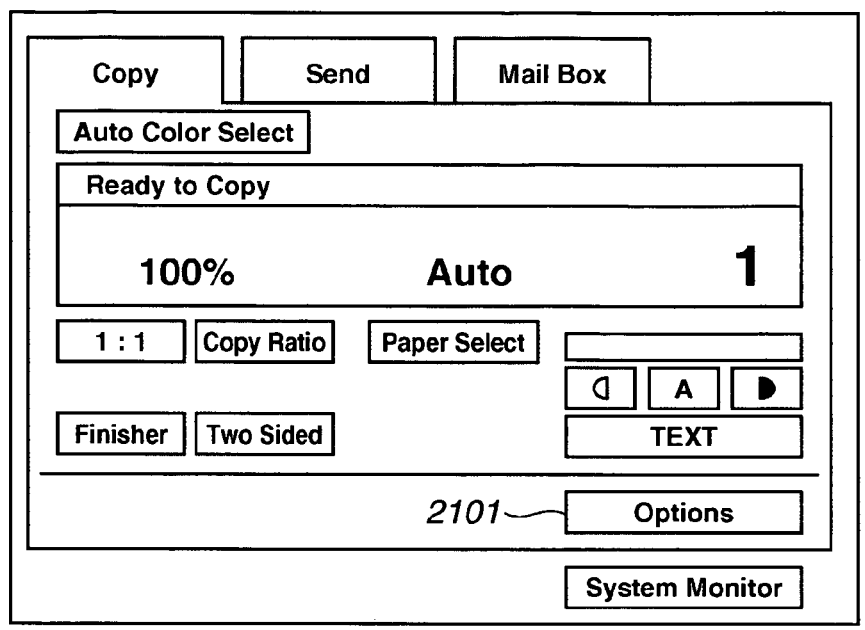
FIG. 21 illustrates an initial condition of an exemplary operation panel of the image forming apparatus.

FIG. 21 shows an initial condition of the operation panel in the image forming apparatus (10, 20). First, to perform the connection settings for the finisher, the operator depresses an option (Options) button 2101 shown in FIG. 21. The option (Options) button is provided for the optional settings of the image forming apparatus. When the option (Options) button is depressed, a screen of FIG. 22 can be displayed.

Figure 22:
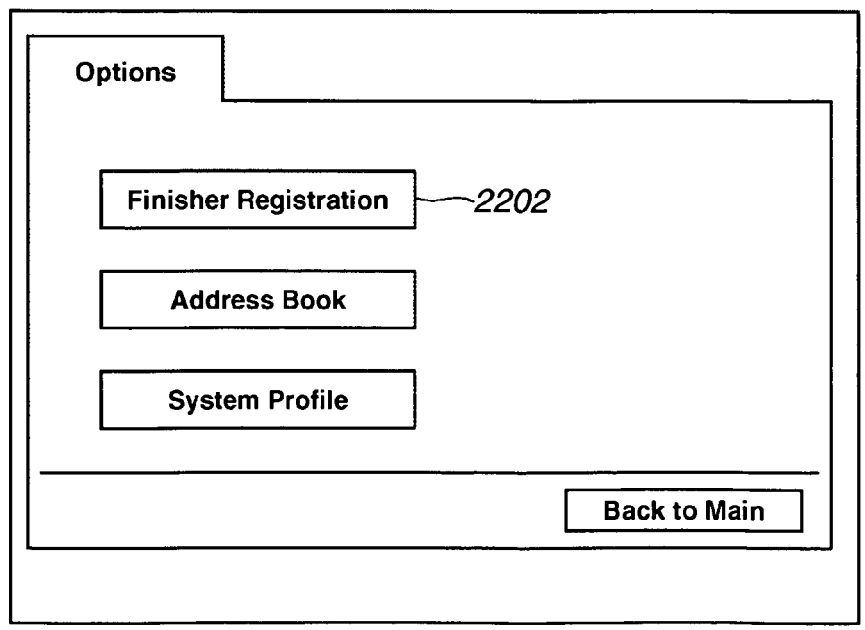
FIG. 22 is a view illustrating an exemplary operation panel displayed when an option setting button is depressed.

On the screen of FIG. 22, the operator can depress a "Finisher Registration" button 2202. In response to the depression of this button, a finisher connection registration screen of FIG. 23 can be displayed. The finisher connection registration screen shows a list of finishers that can be registered. The connection registration of each finisher can be performed on this screen. The list of finisher data may include, for example, a finisher name 2301, a maker name 2302, and a connection state 2303. The list can display a total of seven finishers simultaneously and can other finishers listed before or after these finishers by depress a button (2304, 2305) to scroll the screen.

Regarding the connection registration of a finisher or its cancellation, the operator can touch the display of a target finisher to turn it into a selected condition (see reference numeral 2307) and can depress a "Connect" button 2309 to register the connection of the target finisher or depress a "De-Connect" button 2308 to cancel the connection registration.

For example, according to the example, to register the connection of the Finisher-Y of XYZ Corporation, the operator can touch anywhere in the line 2307 area to turn the display of Finisher-Y into the selected condition. Then, the operator can depress the "Connect" button 2309 to register the connection of Finisher-Y. In response to the depression of the "Connect" button 2309, the image forming apparatus 10 transmits a connection request (i.e., a request inquiring whether the target finisher is available) to the near-line finisher. In a response to this connection request is received, the designated near-line finisher is available and accordingly the image forming apparatus 10 displays "Connected."

If no response is obtained, the designated near-line finisher is unavailable and accordingly the display cannot be changed. Finally, the image forming apparatus enables the settings. Then, the operator can depress an "OK" button 2311 to return the operation panel to the initial condition. If the operator touches a "Cancel" button 2310, the registration work can be abandoned. The entire contents entered through the operation panel can be erased. Thus, no updating work for the finisher connection management table 1504 of the image forming apparatus can be performed.

Figure 23:
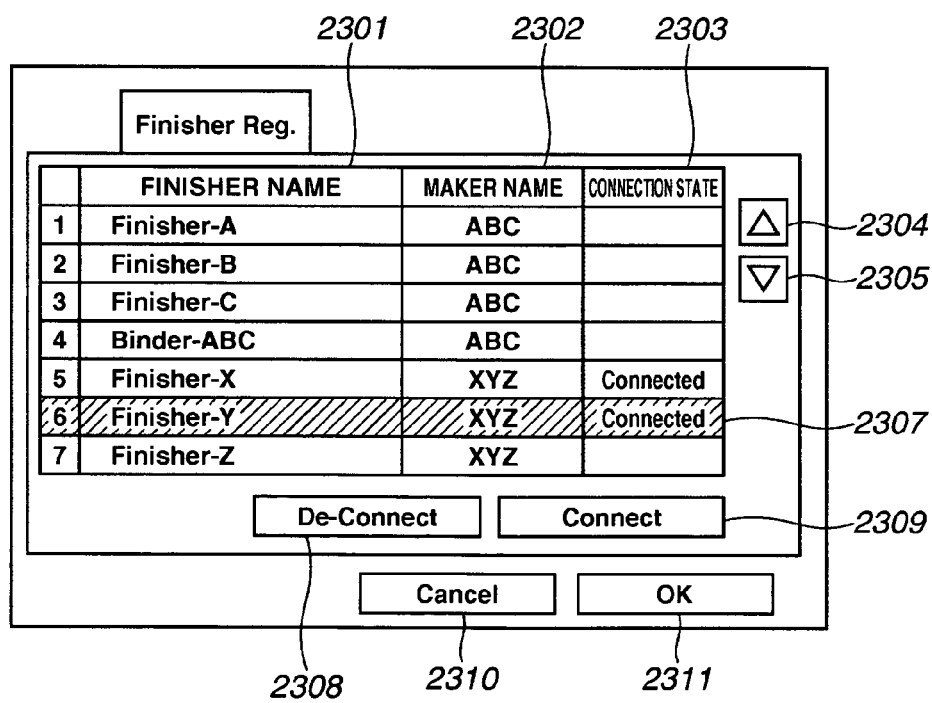
FIG. 23 is an exemplary view illustrating a finisher connection registration screen.

According to the example, the operator has made a connection registration for Finisher-Y2307 of XYZ Corporation on the finisher connection registration screen shown in FIG. 23. In response to this registration, the connection state of #6 finisher (i.e., Finisher-Y) changes form "false" (refer to 1607 in FIG. 16) to "true" (refer to 2601 in FIG. 26).

Through the above-described procedure, the connection registration processing relating to a newly added near-line finisher can be completed. According to the above-described example, the settings relating to the connection registration of a finisher was done by an operator through the operation panel of the image forming apparatus after finishing the connection of the near-line finisher.

However, the method for registering the connection of a finisher is not limited to a particular one and accordingly any other method will be used if the finisher connection management table 1504 can be updated. For example, the image forming apparatus (10, 20) and the finisher can communicate with each other via the network 100 according to the protocol defined at the timing of connection. In this case, the image forming apparatus (10, 20) can automatically perform the connection registration when connection of the finisher is recognized.

Furthermore, the image forming apparatus can transmit a request for acquiring a finisher profile to the connected near-line finisher. Then, the image forming apparatus can receive a finisher profile transmitted from the near-line finisher. The received finisher profile can be stored in the finisher profile storing region 1505. Furthermore, the name of the received finisher profile can be registered in the field of finisher profile name 1605 of the finisher management table 1504. Furthermore, the finisher's address can be registered in relation to the finisher profile.

As described above, the image forming apparatus can read the profile information of a near-line finisher from the registered near-line finisher. Subsequently, the computer can obtain the profile information from the image forming apparatus. However, if desirable, the computer can directly obtain the profile information from the near-line finisher.

[Acquirement of Finisher Profile]

Next, an exemplary printer driver's procedure for obtaining a finisher profile from the image forming apparatus and storing the finisher profile will be described. In the configuration shown in FIG. 5, the profile storing region 504 is a memory region in the OS 502 that can store finisher profiles obtained by the printer driver 505 from the image forming apparatus (e.g., 10 in FIG. 1).

The printer driver 505 can activate a profile acquiring module via the API (Application Programming Interface) of the OS 502 and can store, in the profile storing region 504, the finisher profile obtained from the image forming apparatus 10 using the profile acquiring module. The profile acquiring module can be configured as part of a module of the printer driver 505, or can be provided as part of functions of the OS 502.

Furthermore, to request or transmit a finisher profile, the communication I/F 510 of the host computer and the communication I/F 511 of the image forming apparatus 10 are connected via a communication medium (e.g., network 100). The communication protocol is not limited to a particular type and accordingly any other protocol can be used, as far as the printer driver can transmit a finisher profile acquiring request and the image forming apparatus can return detailed contents of the requested finisher profile.

Figure 24:
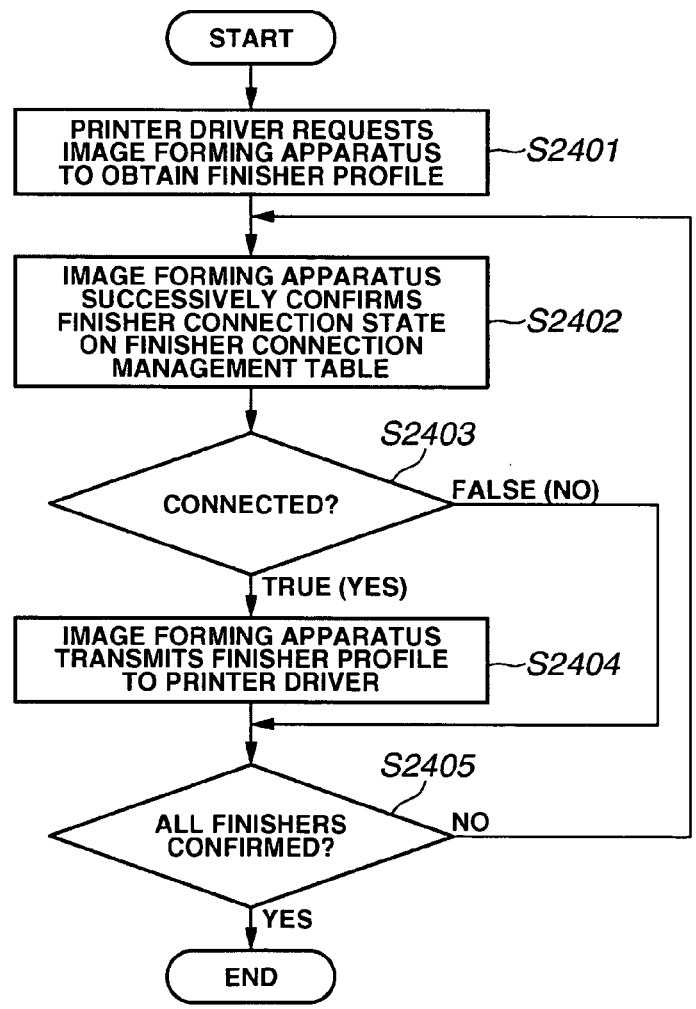
FIG. 24 is a flowchart describing an exemplary processing flow of a printer driver that obtains a finisher profile from the image forming apparatus.

FIG. 24 is a flowchart describing an exemplary processing flow of the printer driver 505 that obtains a finisher profile from the image forming apparatus 10. In step S2401, the printer driver 505 requests the image forming apparatus 10 to obtain a profile of a finisher whose connection is registered. In response to the acquiring request of the printer driver 505, the finisher profile control section 1503 of the image forming apparatus 10 successively retrieves registered contents of the finisher connection management table 1504 to confirm the connection state of each finisher (refer to step S2402). For example, when the finisher profile control section 1503 confirms the connection state of the "Finisher-A" in the finisher connection management table 1504 held by the image forming apparatus 10, it is known that the connection state of "Finisher-A" is "false" as shown in FIG. 26.

Thus, in the judgment of the connection state (refer to step S2403), the connection state of "Finisher-A" is "false" (i.e., NO in step S2403). The processing flow proceeds to step S2405. In step S2405, it is determined whether confirmation of all finishers listed in the finisher connection management table 1504 has been completed.

When the confirmation of all finishers has been completed (i.e., YES in step S2405), this routine terminates. When the confirmation of all finishers is not completed yet (i.e., NO in step S2405), the processing flow returns to step S2402 to repeat the above-described processing for each of "Finisher-B", "Finisher-C", "Binder-ABC" - - - registered in the finisher connection management table 1504.

For example, in the processing of the "Finisher-X" (i.e., #5 registered in the finisher connection management table 1504), the connection state of "Finisher-X" is true (i.e., true in step S2403) and accordingly the processing flow proceeds to step S2404.

On the other hand, in the judgment of the connection state (refer to step S2403), if the connection state of "Finisher-A" is "true" (i.e., YES in step S2403), the process proceeds to step 2404. In step S2404, the finisher profile control section 1503 transmits a finisher profile corresponding to Finisher-X, which is in a connection state (in an available condition), to the printer driver 505. In this case, the finisher profile control section 1503 can recognize that the finisher profile name corresponding to the finisher Finisher-X is "finisher-x-of-xyz.xml" (refer to the field 1605 corresponding to the finisher name Finisher-X) from the finisher connection management table 1504. The finisher profile control section 1503 reads the finisher profile from the finisher profile storing region 1505 and transmits the readout finisher profile to the printer driver.

After completing the confirmation with respect to a final finisher in the finisher management table, the information indicating that the confirmation in step S2405 is completed for all finishers is transmitted to the printer driver before terminating this routine.

On the other hand, the printer driver 505 receives a response from the image forming apparatus and determines whether the response indicates "incomplete." When the response is "incomplete," the received data is the finisher profile and can be stored in the storing region. In this manner, the printer driver can obtain, from the image forming apparatus, the finisher profile of a near-line finisher in a connection state (i.e., in an available state).

[Print Processing Flow in Host Computer]

To print a document, a user can select a print menu in the menu of the application software. In response to the user's selection (instruction), the application software can call the API of the OS to send a print start instruction to the printer driver. In response to the print instruction, the OS instructs the printer driver to start printing. In response to the print start instruction, the graphic driver constituting the printer driver reads the print setting information from the printer driver setting storing region of the OS, and produces job control information for the image forming apparatus and job control information instructing the finishing settings for the selected finisher.

Then, the printer driver produces a print job including the produced job control information and transmits the produced print job to the image forming apparatus (according to a first processing method), or transmits job tickets of the print job and the job control information to the image forming apparatus and to the selected finisher, respectively (according to a second processing).

In practice, the job control information can include JDF (Job Definition Format), PJL (Print Job Language), and PDL (Page Description Language) commands. The JDF is an XML based file format that can inclusively define/describe and manage/control all steps in the creation and manufacturing of printed products. In the present exemplary embodiment, the JDF is simply referred to as a job ticket. The PJL is a general language that can handle the PDL as a print job. The present exemplary embodiment uses the JDF. When the selected finisher is a near-line finisher, a job ticket is transmitted as job control information to this near-line finisher. When the selected finisher is an in-line finisher, job control information described in the PJL or PDL of the print job is transmitted to the image forming apparatus connected to this in-line finisher.

When the selected finisher is an off-line finisher, the contents of the job control information are converted into a format that an operator can read and input into the off-line finisher and a print job including the converted job control information is transmitted to the image forming apparatus. When the transmission destination is a near-line finisher, the transmission destination address is an IP address stored in relation to the finisher profile.

The application program, through the OS, performs print drawing based on document data. The print drawing command instructed to the OS is delivered as a print drawing command to the graphic driver. The graphic driver converts the received print drawing command into drawing information that the image forming apparatus can interpret, and transmits the drawing information, as the data constituting a print job (simply referred to as "print job") to the image forming apparatus.

After receiving the drawing information, the image forming apparatus performs the rendering and printing based on the received drawing information. The page description language representing the drawing information is, for example, LIPS, PCL, or PS. With the above-described procedure, the user can obtain a desired print output.

Figure 25:
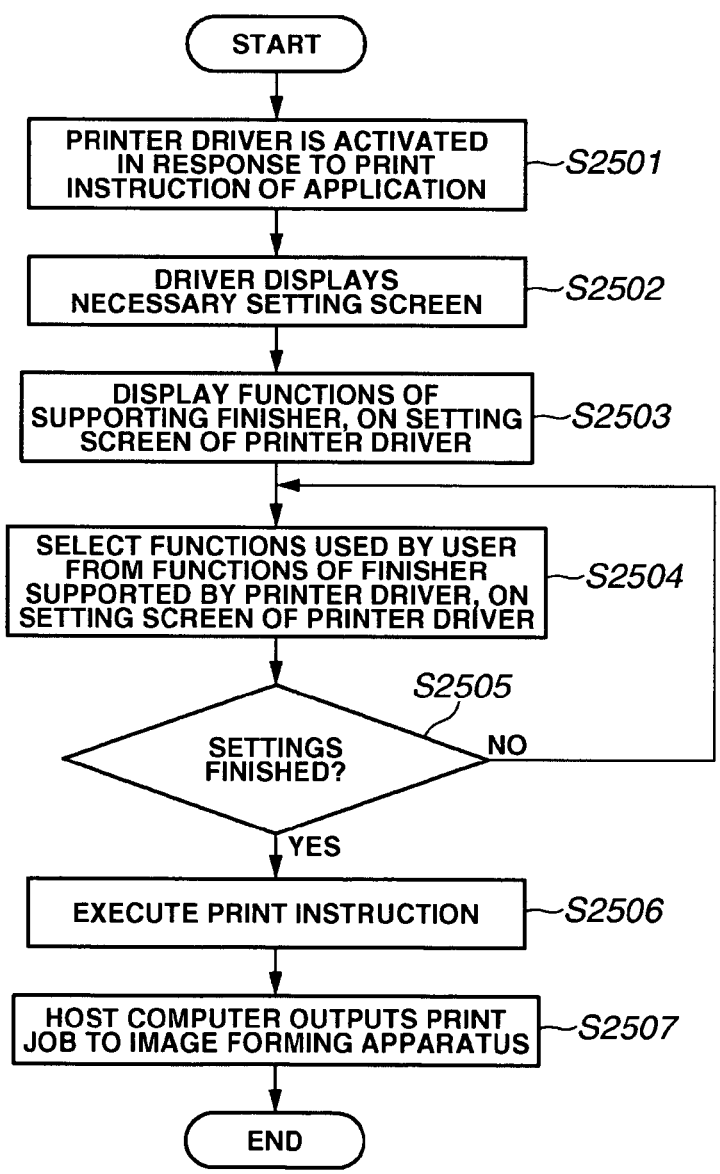
FIG. 25 is a flowchart describing an exemplary processing flow of the host computer that produces a print job.

FIG. 25 is a flowchart describing an exemplary processing flow (i.e., settings of post-processing) in the host computer that produces a print job. First, in step S2501, after an operator created the print data based on the application program, the printer driver 505 is activated. In step S2502, the printer driver 505 displays a UI screen (FIG. 2) for performing the settings of a finisher. In step S2503, functions of the supporting finisher on the setting screen of the printer driver are displayed. When the operator depresses the property button 207, the printer driver 505 displays a detailed property setting screen (FIG. 3).

In step S2504, when the finishing processing is applied to the print data, the printer driver 505 displays the detailed finishing setting screen (FIG. 4) in response to the operator's selection of the finishing tab (320). When the operator selects required finishing items (i.e., finishing functions) on the detailed setting screen (FIG. 4), the printer driver 505 performs the settings of finishing functions provided by a finisher that the printer driver 505 supports (refer to step S2505).

The processing in step S2504 is repeated unless the settings of all required finisher functions are accomplished (i.e., NO in step 2505). When the settings of finisher functions are completed (i.e., YES in step S2505), the processing flow proceeds to step S2506. In the settings of finisher functions, the printer driver 505 determines whether newly incorporated finisher functions contradict the operator's designated finishing items (i.e., finishing functions).

For example, when an operator uses the initial setting screen of the printer driver to set newly incorporated finisher functions, the operator may erroneously input numerical values that cannot be accepted by the finisher. To avoid such contradiction, the printer driver 505 controls the display of the UI screen so that the operator's settings can be acceptable for the finisher. The contents of the display control will be described in more detail.

Then, in step S2506, the printer driver 505 executes a print instruction based on the setting contents in response to the operator's depression of the OK button 205 shown in FIG. 2. Then, the host computer (1, 2) outputs a print job including produced job control information to the image forming apparatus (10, 20) (refer to step S2507).

[Finishing Processing]

Figure 58:
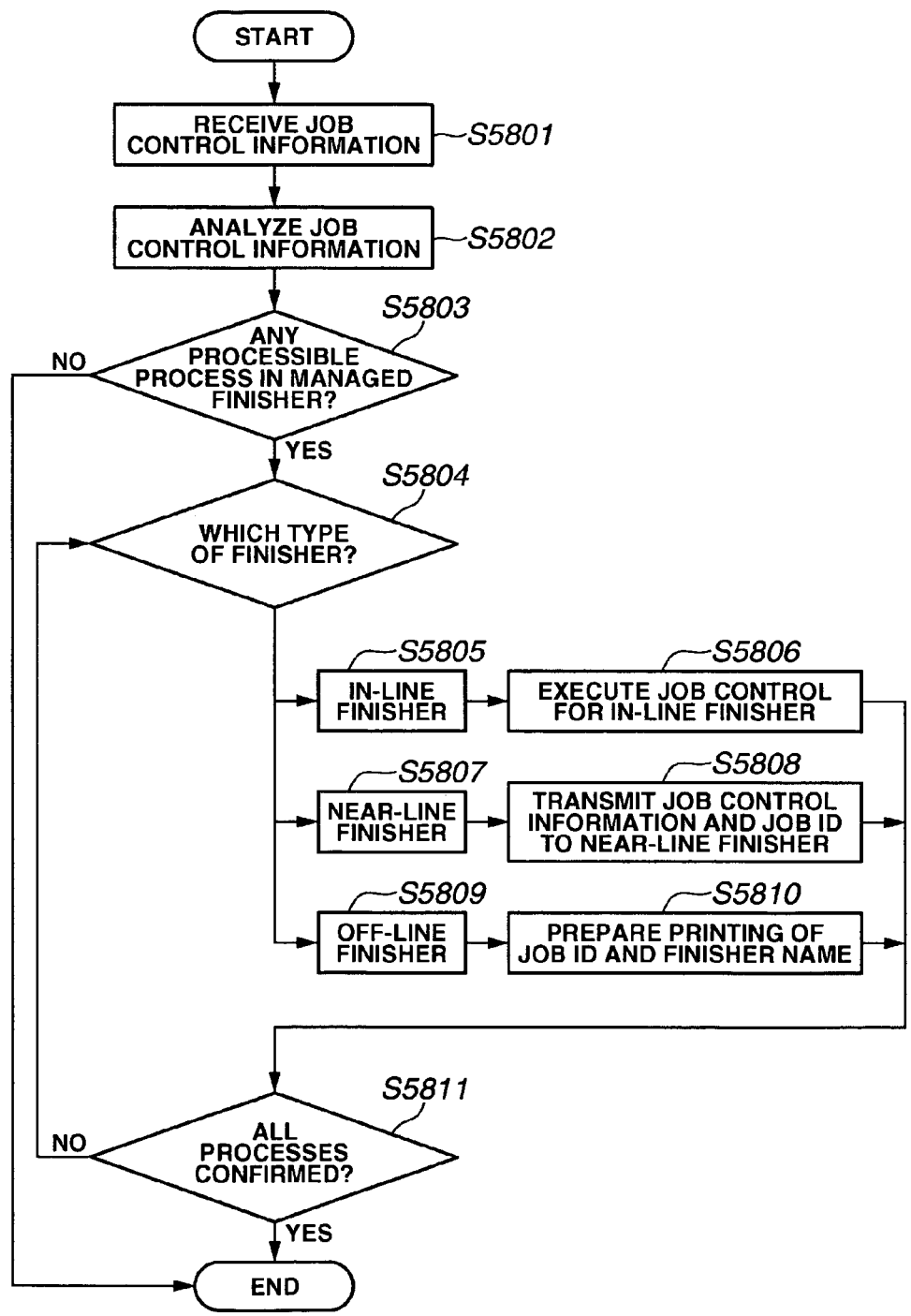
FIG. 58 is a flowchart describing an exemplary finisher processing flow of the image forming apparatus.

Next, an exemplary finisher processing flow according to the first processing method will be described with reference to a flowchart of FIG. 58. According to the first processing method, the printer driver transmits to the image forming apparatus a print job including job control information describing the post-processing contents of the near-line finisher. The image forming apparatus receives the job control information and executes the finishing processing in accordance with the related description in the job control information.

First, in step S5801, the job control information is received from the printer driver or the like. Next, in step S5802, the received job control information is analyzed. In step S5803, it is determined whether any registered finisher can process the received job control information based on the profile information managed in the image forming apparatus. To this end, for example, it is preferable to prepare a table describing the relationship between the tags described in the profile information and the tags described in the job control information, which can be referred to by the control section of the image forming apparatus. Then, the finisher profiles collected by the image forming apparatus can be scanned with tags corresponding to the tags described in the job control information.

If all function tags are met or hit, the job control information can be processed (more specifically, the designated finishing processing is executable). However, in the present exemplary embodiment, the printer driver can produce the job control information corresponding to the finisher profiles and accordingly step S5803 can be skipped.

When there is no registered finisher that can process the processing described in the job control information, described by a tag showing a function, (i.e., NO in step S5803), this routine terminates. When there is a registered finisher (i.e., YES in step S5803), the type of this registered finisher is confirmed in step S5804. When the registered finisher is an in-line finisher, the processing flow proceeds to step S5805 and the image forming apparatus performs the job control for the in-line finisher according to the settings designated in the job control information (refer to step S5806).

In the judgment of step S5804, the finisher type can be discriminated based on the IP address correlated with the profile information that can be hit in the scanning of step S5803. If any IP address is correlated, the finisher type is a near-line finisher. Although an off-line finisher has no profile information, the finisher type can be identified based on a job ID. For example, a discriminable code can be put to a job ID of the job control information for an off-line finisher. In this case, the job control information for an off-line finisher is excluded from the judgment objected in step S5803.

When the registered finisher is a near-line finisher, the processing flow proceeds to step S5807 and the image forming apparatus transmits the job control information and the job ID to this near-line finisher (refer to step S5808). The transmission destination is an IP address entered at the timing of connection of the near-line finisher. When the registered finisher is an off-line finisher, the processing flow proceeds to step 5809 and the image forming apparatus instructs preparation for printing the job ID and the designate finisher name (refer to step S5810).

In the present exemplary embodiment, when the printer driver employs the second processing method, the printer driver directly transmits the job control information to the addressed finisher. Thus, the printer can receive only the job control information for the near-line finisher. It is, therefore, possible to execute step S5806 immediately after accomplishing the processing of step S5802. Furthermore, the printer receives the print job in addition to the job control information and executes the print processing based on the received job and information.

Next, in step S5811, it is determined whether all processes (post-processing) have been confirmed. When there is a process to be processed (i.e., NO in step S5811), the processing flow returns to step S5804 to continue the above-described processing for the next process. When the processing of all processes has been completed (i.e., YES in step S5811), this routine terminates.

As described above, the in-line finisher of the printer executes the post-processing. If the job control information of the near-line finisher is transmitted to the printer, the job control information can be transferred to the addressed near-line finisher.

[Processing Flow in Image Forming Apparatus]

Next, an exemplary processing procedure of the image forming apparatus according to an exemplary embodiment will be described with reference to flowcharts shown in FIGS. 18, 19, and 20. The processing of FIG. 18 corresponds to the above-described control in the management of the finisher and the profile in the image forming apparatus. Furthermore, FIG. 19 shows a processing flow executed by the image forming apparatus, to execute the processing described in FIG. 24 (i.e., the processing that the printer driver obtains the finisher profile from the image forming apparatus).

[Setting of Near-Line Finisher]

Figure 18:
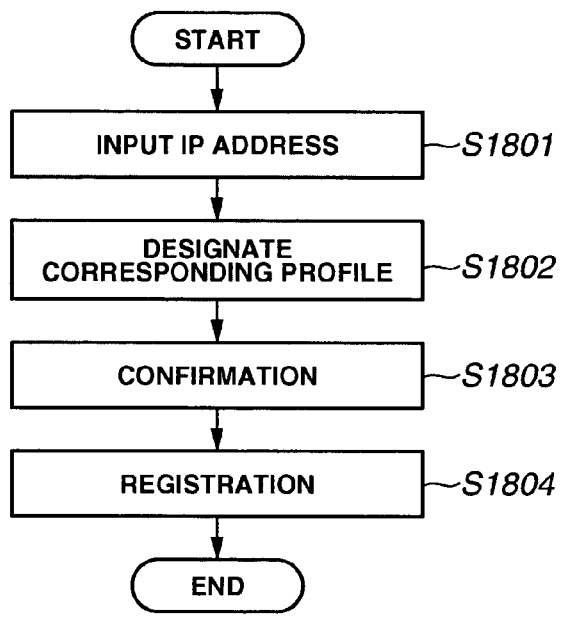
FIG. 18 is a flowchart describing an exemplary processing flow for registering a near-line finisher connected to the image forming apparatus.
Figure 19:
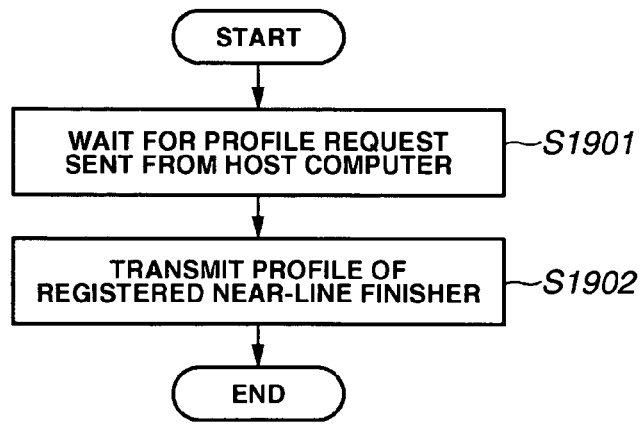
FIG. 19 is a flowchart describing an exemplary processing flow responding to a profile acquiring request.

FIG. 18 is a flowchart describing an exemplary processing flow for registering a near-line finisher connected to the image forming apparatus. To start the processing shown in FIG. 18, an operator can open a near-line finisher setting screen, for example, from a user mode, through the operating section 813 of the image forming apparatus (e.g., 10, 20 of FIG. 1). First, in step S1801, an IP address designated by the user is entered via the operating section 1907. Regarding the designation of the IP address, the user can directly input an IP address corresponding to the near-line finisher or can input an IP address of a predetermined subnet.

Next, in step S1802, a designated finisher is identified based on the entered IP address with reference to the finisher list stored in the finisher profile storing region 903 of the image forming apparatus. And, a list of finishers connectable to the image processing apparatus is displayed. Thus, the user can select a maker and a product name of the near-line finisher from the displayed list and can designate a corresponding profile.

In step S1803, the image forming apparatus displays a screen to let the operator to check whether the contents entered in steps S1801 and S1802 are correct. When the user inputs an instruction indicating the correctness of the contents, the processing flow proceeds to step S1804. In step S1804, the image forming apparatus requests the finisher corresponding to the entered address to transmit the profile information, and stores the profile information received from the finisher in the common DB section 80. The finisher corresponding to the stored finisher profile is added to the finisher management table. The changed finisher management table is stored in the secondary storage device or in a non-volatile memory.

Furthermore, as another exemplary embodiment, the maker and the product name can be known from an ID obtained from the near-line finisher. In this case, at the timing the user inputs an IP address, an ID acquiring request can be issued to obtain the IP from the near-line finisher and to display the obtained ID. In accordance with the ID selected by the user, the profile information can be requested to the finisher corresponding to the ID.

The profile information can be obtained from the corresponding finisher, as a usable finisher connected to the network. The finisher management table can be rewritten correspondingly. The finisher profile can be requested to the finisher corresponding to the entered IP address. The IP address and the profile information can be stored as correlated data.

[Profile Acquiring Request Processing by Host Computer]

FIG. 19 is a flowchart describing an exemplary processing flow responding to a request of the host computer (1, 2) with respect to a list of near-line finishers registered in the image forming apparatus (10, 20) and acquirement of the profile.

First, in step S1901, when the image forming apparatus (10, 20) waits for an acquiring request of the finisher profile transmitted from the host computer (1, 2). When the acquiring request is received, the processing flow proceeds to step S1902. Then, the image forming apparatus (10, 20) transmits the profile corresponding to the near-line finisher registered in the processing of FIGS. 12 and 18 to the host computer (e.g., 1 or 2 of FIG. 1). In the present exemplary embodiment, only the profile corresponding to the user's registered finisher is transmitted. However, it is possible that all profiles including non-registered profiles held in the image forming apparatus can be transmitted.

According to the processing of FIG. 19, the profile of the operator's registered near-line finisher is transmitted to the host computer. However, the profiles of the near-line finisher and the in-line finisher held in the image forming apparatus, or the profile of the finisher system, can be transmitted in response to the profile acquiring request of the host computer.

[Print Processing Flow]

Figure 20:
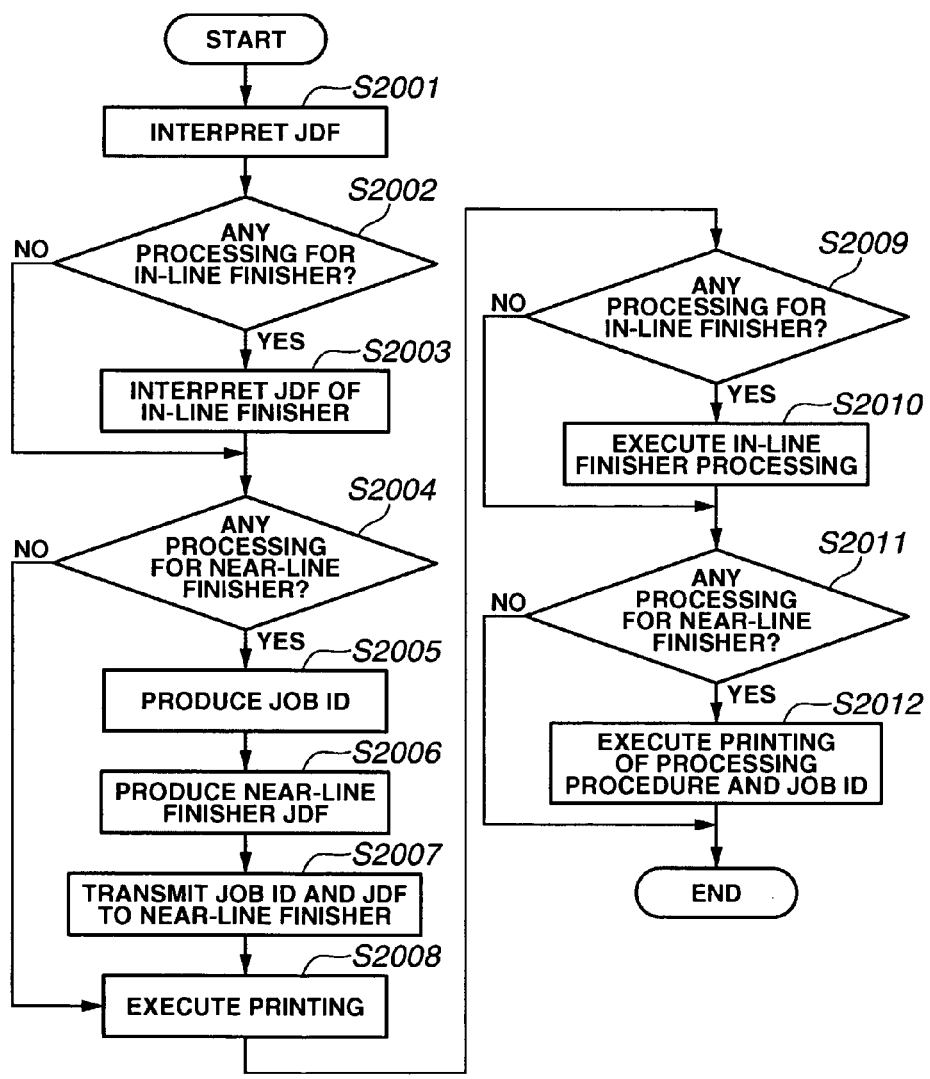
FIG. 20 is a flowchart describing an exemplary print processing flow in the image forming apparatus.

FIG. 20 is a flowchart describing an exemplary print processing flow in the image forming apparatus (10, 20) that receives a print job including JDF (Job Definition Format), i.e. a job ticket, transmitted from the host computer. The JDF is a kind of job ticket, i.e., a data file describing various processing information relating to a manuscript print order. Of course, the job ticket type is not limited to JDF.

In step S2001, when the image forming apparatus (10, 20) receives a print job, the job control section 800 interprets the JDF included in the print job. Then, it is determined whether there is any processing corresponding to the in-line finisher (refer to step S2002). When the processing corresponding to the in-line finisher is not included (i.e., NO in step S2002), the processing flow proceeds to step S2004. On the other hand, when the processing corresponding to the in-line finisher is included (i.e., YES in step S2002), the processing flow proceeds to step S2003. In step S2003, the job control section 800 interprets the JDF corresponding to the in-line finisher.

Next, in step S2004, the job control section 800 interprets the JDF and determines whether there is any processing corresponding to the near-line finisher. When the processing corresponding to the near-line finisher is not included (i.e., NO in step S2004), the processing flow proceeds to step S2008. In the following two cases, there will be no request for the near-line finisher. In one case, a user of the client PC issues a print job not using the near-line finisher. In the other case, the printer driver of the client PC directly transmits control information for executing the post-processing, as a job ticket, to a corresponding near-line finisher.

On the other hand, when the processing corresponding to the near-line finisher is included (i.e., YES in step S2004), the processing flow proceeds to step S2005. In step S2005, the job control section 800 produces a job ID. Then, in step S2006, the job control section 800 produces the JDF to be transmitted to the near-line finisher. In step S2007, the job control section 800 transmits the job ID and the JDF to the near-line finisher. In step S2008, the job control section 800 controls the printer section 810 to execute a print operation.

In step S2009, it is determined whether there is any processing corresponding to the in-line finisher. When the processing corresponding to the in-line finisher is not included (i.e., NO in step S2009), the processing flow proceeds to step S2011. On the other hand, when the processing corresponding to the in-line finisher is included (i.e., YES in step S2009), the processing flow proceeds to step S2010. Thus, the in-line finisher processing is executed as the post-processing applied to the print obtained as a result of the print operation (refer to step S2008).

On the other hand, when the processing corresponding to the in-line finisher is not included (i.e., NO in step S2009), the processing flow proceeds to step S2011 without executing the processing of step S2010. In step S2011, it is determined whether there is any processing corresponding to the near-line finisher. When the processing corresponding to the near-line finisher is not included (i.e., NO in step S2011), the image forming apparatus terminates this routine. When the processing corresponding to the near-line finisher is included (i.e., YES in step S2011), the processing flow proceeds to step S2012. In step S2012, the image forming apparatus produces and prints the job ID and a work instruction describing the processing procedure, for the processing in the corresponding near-line finisher and instruction for the operator, before terminating this routine.

In this case, the printed job ID is identical with the job ID transmitted to the near-line finisher in step S2007. An aspect of step S2012 is to notify the operator of the near-line finisher to which the operator should convey the printed product, after completing the print processing based on the print data, as well as the job ID to be entered into the near-line finisher.

[Processing in Finisher]

Figure 27:
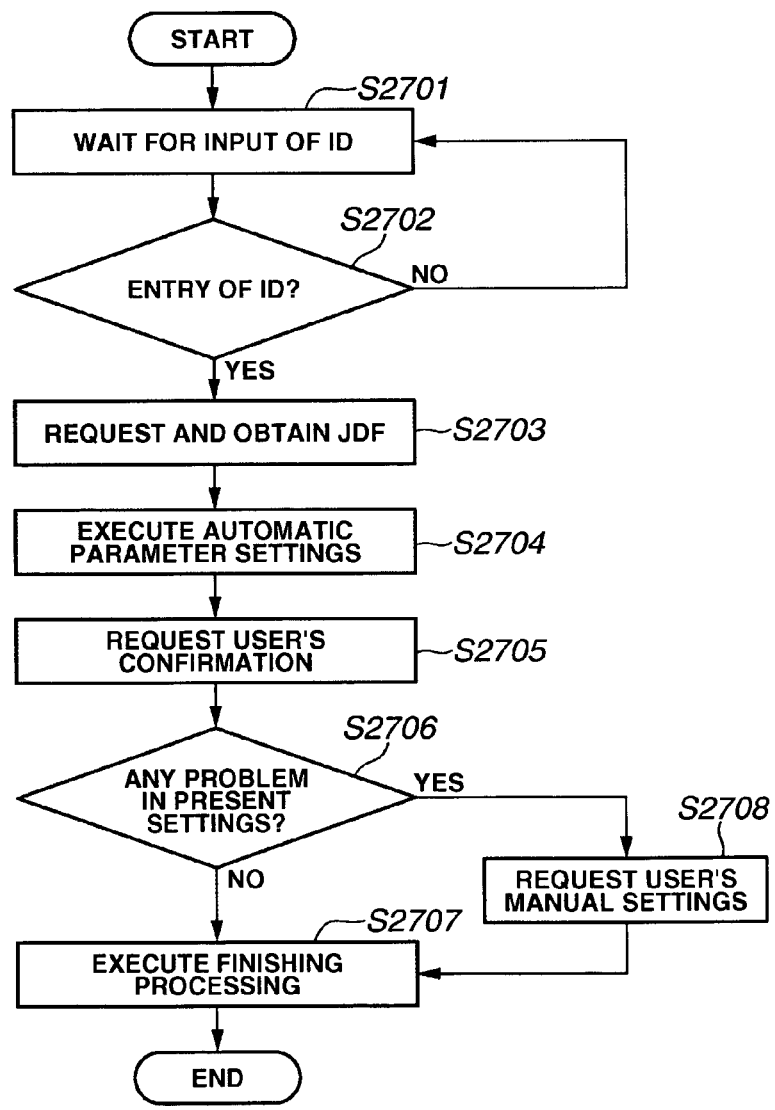
FIG. 27 is a flowchart describing an exemplary processing flow of the finisher.

FIG. 27 is a flowchart describing an exemplary processing flow of the finisher. As described previously, after accomplishing the print processing on the client PC, the printer driver of the client PC transmits the JDF and the print data to the image forming apparatus selected by the operator. When the received JDF includes a processing request corresponding to the finisher, the image forming apparatus transmits the job control information to the finisher. In particular, in the case of the near-line finisher, the image forming apparatus transmits the job ID and the job control information corresponding to the near-line finisher. The near-line finisher receives the job ID and the job control information and stores them in the storage device 902 (refer to FIG. 9).

Hereinafter, the exemplary processing procedure of the near-line finisher based on the job control information stored in the storage device 902 will be described with reference to the flowchart of FIG. 27. First, in step S2701, the near-line finisher waits for an ID entered from an operator. When the ID is entered (i.e., YES in step S2702), the processing flow proceeds to step S2703.

In step S2703, the near-line finisher (e.g., 21, 22 of FIG. 1) requests the job control section 800 of the image forming apparatus to transmit a JDF corresponding to the received ID, and obtains the JDF returned in response to the request. In step S2704, based on the contents of the JDF, the finisher automatically sets the parameters, such as a recording paper size, required for performing predetermined post-processing. Thus, the operator needs not to manually set the parameters based on a conventionally used printed procedure manual.

Next, in step S2705, the finisher controls a predetermined display device to display the parameters to let the user confirm the setting contents. The user confirms the displayed contents and depresses a processing start button of the finisher, if there is no problem. Thus, the finisher starts the processing according to the parameters set in step S2704. For example, if the designated finisher is a cutting finisher, the finisher starts a cutting operation according to the determined dimensions.

When there is any problem with the present settings (i.e., YES in step S2706), the processing flow proceeds to step S2708 to request the user to manually set the parameters suitable for the near-line finisher. When the automatically set parameters include no problem (i.e., NO in step S2706), or after accomplishing the manual parameter settings in step S2708, the processing flow proceeds to step S2707 to execute finishing processing.

If the use of plural near-line finishers is designated, the above-described processing is performed similarly for the next near-line finisher. As described above, using the finisher profiles in the system arrangement of the exemplary embodiment enables the driver to use the finisher functions regardless of the differences in the in-line, off-line, and near-line finishers.

[Processing relating to Addition of Near-line Finisher]

Next, exemplary processing in a case that another near-line finisher is newly added to the image forming system will be described. FIG. 28 is a diagram illustrating an exemplary arrangement of an image forming system, including a host computer 1 that includes a printer driver controlling an image forming apparatus 10, a paper feeding apparatus 2803, and an in-line finisher 11. The in-line finisher 11, for example, has a middle stitch bookbinding function in addition to a stapling function and a punching function.

Furthermore, the image forming system of FIG. 28 includes a perfect bookbinding machine 2806 as a near-line finisher. The host computer 1, the image forming apparatus 10, and the near-line finisher (i.e., perfect bookbinding machine) 2806 are connected to the network 100.

[Connection of Perfect Bookbinding Machine and Property Information File]

Figure 17:
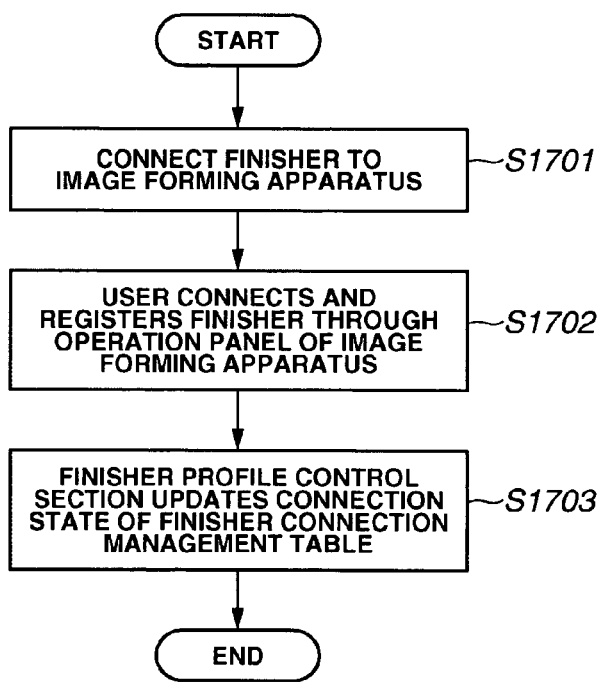
FIG. 17 is a flowchart describing an exemplary procedure for connecting a finisher to the image forming apparatus.

The operator can connect the perfect bookbinding machine (i.e., near-line finisher) 2806 to the image forming system, according to the connecting procedure of the near-line finisher described in FIGS. 15 to 17. After finishing the connection procedure, the finisher profile storing region 1505 of FIG. 15 stores a property information file (i.e., property profile) that specifies the functions of the perfect bookbinding machine 2806. FIG. 29 exemplary shows the contents of the profile of the perfect bookbinding machine 2806 stored in the finisher profile storing region 1505.

In FIG. 29, a tag 2901 is an identifier indicating that the finisher is a perfect bookbinding machine. A tag 2902 shows a maker name of the finisher, i.e., "ABC" according to the example. A tag 2903 shows a product name of the finisher, i.e., "NSB100" according to the example. A tag 2904 shows the processible book binding size of the perfect book binding machine 2806. The portion <MaxBookletDimensions> through </MaxBookletDimensions> shows a maximum size of the processible input original. According to the example, the maximum dimensions are 320 mm×320 mm. Furthermore, the portion <MinBookletDimensions> through </MinBookletDimensions> shows a minimum size of the processing input original. According to the example, the minimum dimensions are 110 mm×145 mm.

The description of tags 2905 and 2906 shows restriction information restricting the functions of the perfect bookbinding machine. According to the property profile described according to the XML format, the restriction information can be describe by the tag <Restrictions> (2907) through the tag </Restrictions> (2908). The printer driver 505 can identify the restriction information added in the property profile by recognizing the tag.

The description of the tag 2905 shows the thickness of the input original processible in the perfect bookbinding machine 2806. According to the example, the processible original thickness is in the range from 1 mm to 55 mm. Furthermore, when the bookbinding machine performs a perfect binding operation, the produced book has an unreadable region near the spine of a book which cannot be perfectly uncovered and accordingly cannot be read when a book is opened. The description of the tag 2906 shows the width of such an unreadable region. According to the example, the unreadable width is 7 mm in each page.

[Display Control of User Interface]

The driver UI rearrangement application 512 installed in the host computer 1 can obtain the finisher profile of the perfect bookbinding machine 2806 from the image forming apparatus 10, and can add a function display item on the user interface (UI) screen based on the obtained finisher profile. Alternatively, the driver UI rearrangement application 512 can change the setting contents of a function display item already displayed on the screen.

Figure 39A:
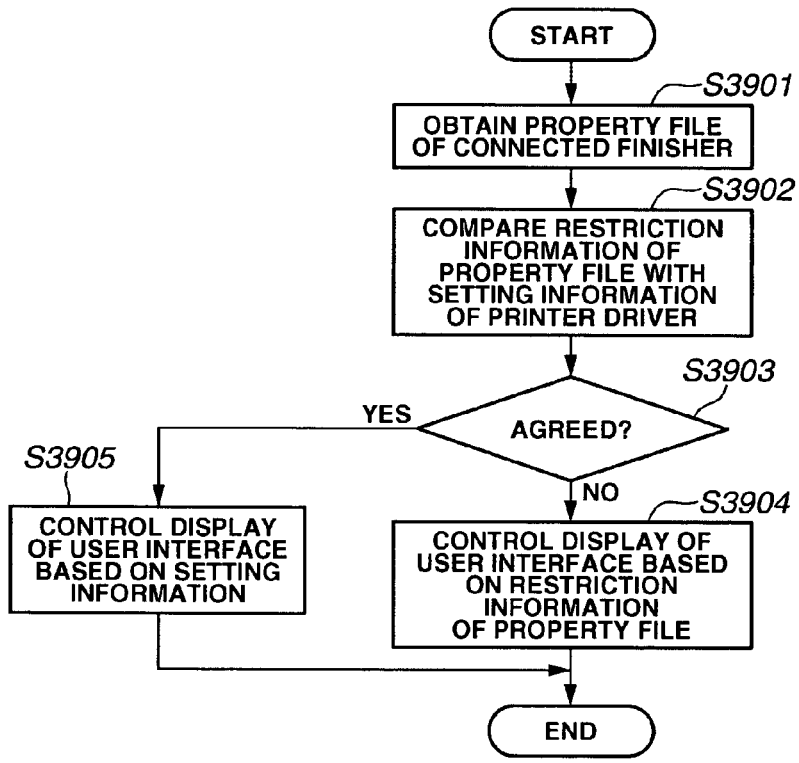
FIG. 39A is a flowchart schematically describing an exemplary display control flow of the user interface executed by the printer driver.

FIG. 39A is a flowchart schematically describing an exemplary display control flow of the user interface executed by the driver UI rearrangement application 512. First, in step S3901, the driver UI rearrangement application 512 obtains a property information file (i.e., property profile) of the connected near-line finisher. Next, the driver UI rearrangement application 512 compares restriction information set in the property file with the setting information of the printer driver (step S3902).

When the restriction information agrees with the setting information (i.e., YES in step S3903), the processing flow proceeds to step S3905. In step S3905, the driver UI rearrangement application 512 controls the display of the user interface based on the setting information of the printer driver. On the other hand, when the restriction information set in the property file disagrees with the setting information of the printer driver (i.e., NO in step S3903), the processing flow proceeds to step S3904. In step S3904, the driver UI rearrangement application 512 controls the display of the user interface based on the restriction information set in the property file.

The setting information of the printer driver is, for example, determined considering the in-line finisher, or the near-line finisher, to be connected to the image forming apparatus as initial conditions. However, the setting information of the printer driver is not limited to the information restricting the functions of these finishers.

For example, if a different near-line finisher is later connected to the image forming system, the restriction information in the finisher profile of this finisher can be used as the reference to be compared in step S3902. In this case, the printer driver setting storing region 503 can store, as setting information, the information restricting the previous finisher function (settable range, numerical values, orientation of the document, page layout, etc.) In the processing of step S3902 in FIG. 39A, the driver UI rearrangement application 512 can check the setting information stored in the printer driver setting storing region 503.

Figure 39B:
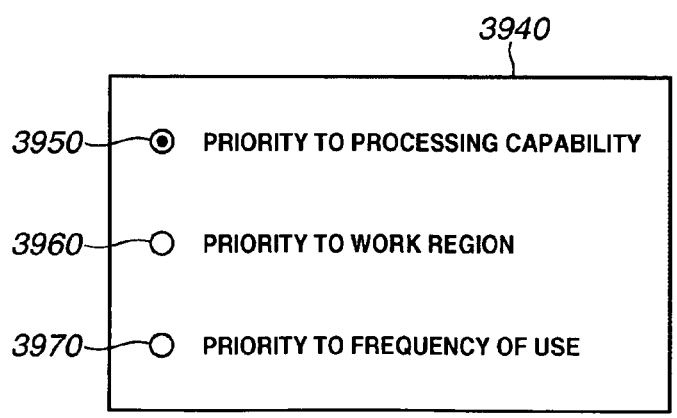
FIG. 39B is a diagram illustrating an exemplary user interface used to select a near-line finisher.

Furthermore, when plural near-line finishers having the same restriction information are selectable, the driver UI rearrangement application 512 can display a user interface that enables the operator to select a desirable near-line finisher (refer to FIG. 39B). The driver UI rearrangement application 512, for example, can display a user interface 3940 that allows the operator to select a desirable near-line finisher considering the property of near-line finishers, information relating to the operator's work region, and the information relating to the frequency of operator's use or other operation history.

When the "priority to the processing capability" 3950 is selected by the operator on the user interface 3940 shown in FIG. 39B, the driver UI rearrangement application 512 can select an optimum near-line finisher with reference to the finisher profiles of respective finishers that describe processing capabilities (e.g., processing speed, and processing capacity).

Furthermore, when the "priority to work region" 3960 is selected by the operator, the driver UI rearrangement application 512 can select an optimum near-line finisher so as to reduce the work time required for the post-processing, based on the information (such as the installation place of the near-line finisher) stored in the printer driver setting storing region 503. For example, to reduce a shifting distance of the operator, the driver UI rearrangement application 512 can designate a finisher closest to the image forming apparatus that the operator is using.

Furthermore, when the "priority to frequency of use" 3970 is selected by the operator, the driver UI rearrangement application 512 can select an optimum near-line finisher based on the information relating to the cumulative frequency of use, for example, stored in the printer driver setting storing region 503.

The information processing apparatus (1, 2) displays a setting screen for enabling the operator to perform the settings to control the print output of the image forming apparatus and the post-processing apparatus (21, 22) (or including the finisher system 200) that executes the post-processing for the printed products produced from the image forming apparatus (10, 20).

The information processing apparatus (1, 2) includes an acquiring section, a comparing section, and a display control section. The acquiring section can obtain the function information (e.g., 1311 in FIG. 13, 1404-1407 in FIG. 14, and 2905, 2906 in FIG. 29) showing post-processing functions of the post-processing apparatus.

The comparing section can compare the function information obtained by the acquiring section with the setting information of other post-processing apparatus (i.e., information showing post-processing functions of this post-processing apparatus). The display control section can change the setting screen based on the comparison result of the comparing section and can display the changed setting screen.

The driver UI rearrangement application 512 installed on the host computer (1, 2) can operate, under the control of the OS 502, to execute the above-described functions of the acquiring section, the comparing section, and the display control section.

Figure 30:
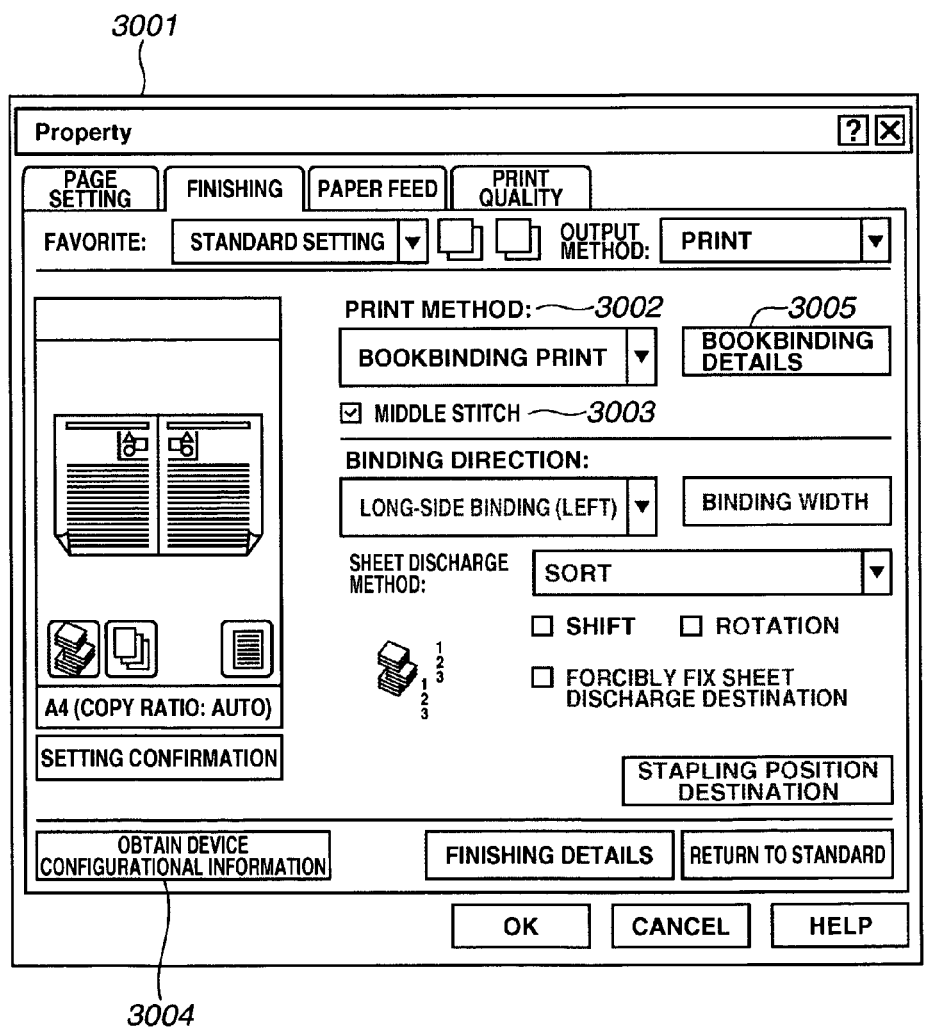
FIG. 30 is a diagram illustrating an exemplary finishing sheet of a user interface of the printer driver in the condition that the printer driver has not yet obtained a finisher profile of the perfect bookbinding machine.

FIG. 30 shows an exemplary finishing sheet 3001 of the user interface (UI) of the printer driver, in the condition that the driver UI rearrangement application 512 has not yet obtained the finisher profile of the perfect bookbinding machine 2806. Through the finishing sheet 3001, an operator can set functions of the in-line finisher 11 (refer to FIGS. 1 and 28) directly connected to the image forming apparatus 1. The in-line finisher 11 has a stapling function, a punching function, a middle stitch bookbinding function, and a sheet cutting function for cutting the printed products along one side after finishing the bookbinding processing.

Regarding the bookbinding settings, the operator can set a "bookbinding print" in the input field of the print method (refer to step 3002 in FIG. 30). Then, the operator can input a check mark in the setting field of the middle stitching function (refer to step 3003), to accomplish the settings for the middle stitch bookbinding operation. The operator can use a button 3005 that opens a dialog to perform bookbinding details settings when the "bookbinding print" is selected in the input field of the print method 3002. The contents of the bookbinding details setting dialog will be described later.

Next, according to the above-described procedure, the driver UI rearrangement application 512 obtains the finisher profile of the perfect bookbinding machine 2806 (i.e., the near-line finisher) connected to the network 100. This processing corresponds to step S3901 of FIG. 39A.

The operator, for example, depresses a button 3004 of the UI finishing sheet 3001 to obtain the information relating to the device configuration, when the perfect bookbinding machine 2806 (i.e., the near-line finisher) is newly connected to the network 100. In response to the user's depression of the button 3004, the driver UI rearrangement application 512 can obtain a finisher profile of the perfect bookbinding machine 2806 from the image forming apparatus 10, according to the processing described in FIGS. 5 and 24 that can acquire the finisher profile including the information relating to the device configuration.

The timing for obtaining the finisher profile may be based on an operator's instruction, and is not limited to the execution of the processing of FIG. 24. For example, the finisher profile can be obtained when the finishing sheet 3001 of the user interface (UI) shown in FIG. 30 is opened.

Through the processing shown in FIG. 24 that obtains the information relating to device configuration, the driver UI rearrangement application 512 can obtain the finisher profile of the post-processing apparatus (i.e., perfect bookbinding machine 2806) that is newly connected. The driver UI rearrangement application 512 can analyze the contents of the obtained finisher profile and can control (or change) the display of the user interface (UI) based on the analysis. The driver UI rearrangement application 512 can discriminate a character string "Non-Stitch Booklet" contained in the tag 2901 of the finisher profile, and can recognize that this finisher is a perfect bookbinding machine.

With this recognition, the perfect binding is enabled in the case that the bookbinding print is selected as the print method. The driver UI rearrangement application 512 can add a perfect binding check box 3102 on a printer driver's finishing sheet of the finishing sheet 3101 of the user interface (UI) shown in FIG. 31. Thus, through the user interface (UI) of the printer driver 505, the operator can set the functions of the perfect bookbinding machine 2806 connected, as the near-line finisher, to the image forming apparatus via the network 100.

Besides addition of the function item on the user interface (UI), the driver UI rearrangement application 512 can control the display of the user interface (UI) to change the contents of the screen based on the restriction information described below. The driver UI rearrangement application 512 retrieves, from the obtained finisher profile, the tags <Restriction> (2907) and </Restriction> (2908) that are restriction information restricting the functions of the perfect bookbinding machine 2806.

According to the finisher profile shown in FIG. 29, the description of tags 2905 and 2906 sandwiched between two tags 2907 and 2908 shows detailed restriction information. For example, according to the perfect binding bookbinding operation, the printed product has a binding portion which cannot be opened. Thus, the tag 2906 describes the unreadable region as restriction information. According to the example, the unreadable region adjacent to the binding portion has a width of 7 mm.

Figure 32:
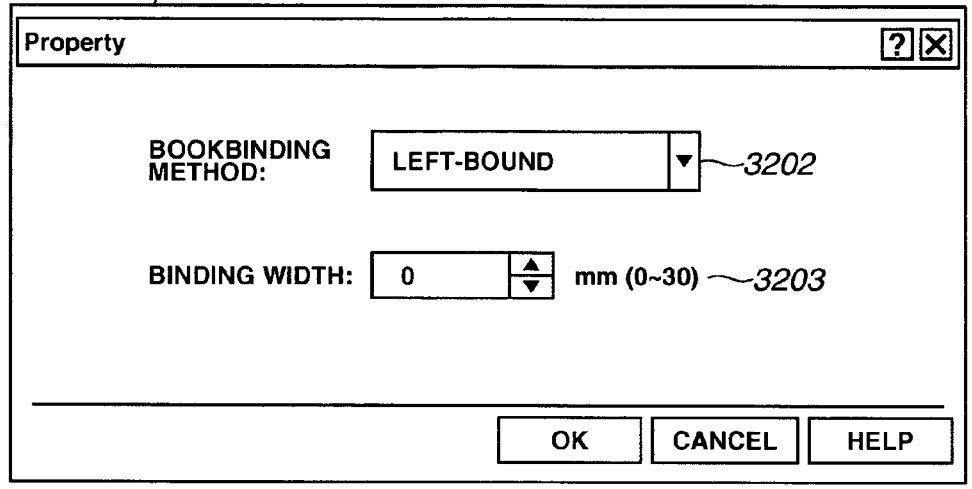
FIG. 32 is a diagram illustrating an exemplary detailed bookbinding dialog for setting details of the bookbinding.

FIG. 32 is a diagram illustrating an exemplary detailed bookbinding dialog 3201 for setting details of the bookbinding, displayed when the middle stitch bookbinding 3003 is selected on the user interface (UI) screen shown in FIG. 30 and the bookbinding details setting button 3005 is depressed. The detailed bookbinding dialog 3201 includes a setting portion 3202 for selecting "left-bound" or "right-bound" as a bookbinding method and a setting portion 3203 for designating the binding width of the bookbinding operation.

The binding width of the bookbinding operation defines a region on the page where the image is formed (i.e., designating the margin to be provided from the spine of a book (i.e., binding portion of the bookbinding). The binding width can be set in the units of millimeter. According to the example shown in FIG. 32, the binding width can be set in the range from 0 mm to 30 mm as default restriction information. According to the middle stitch bookbinding, a recording paper sheet is double folded and the stitching is applied to the folded portion. Thus, the minimum value of the binding width is set to 0 mm. Furthermore, although the example shows 30 mm as a practical value, there is no physical restriction with respect to the maximum value of the binding width.

Figure 31:
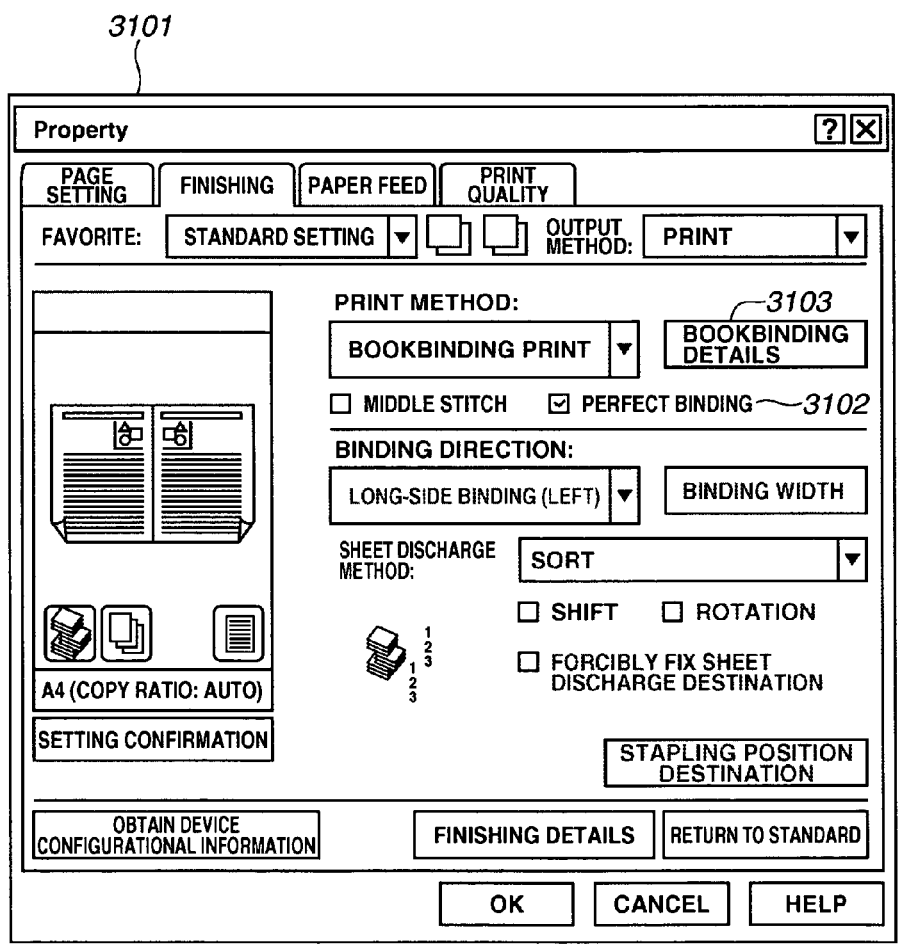
FIG. 31 is a diagram illustrating the finishing sheet of the user interface.
Figure 33:
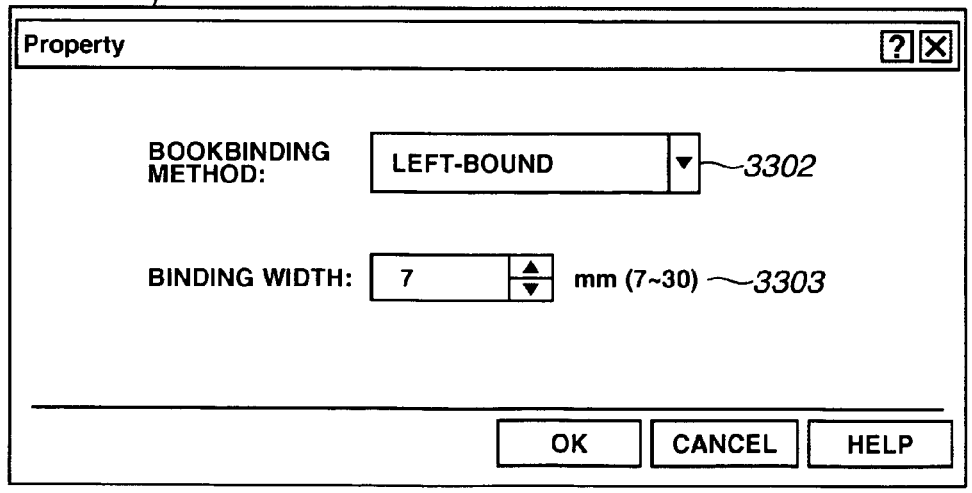
FIG. 33 is a diagram illustrating an exemplary detailed bookbinding dialog for setting details of the bookbinding, displayed when the perfect binding bookbinding is selected on the user interface of FIG. 31 and a bookbinding details setting button is depressed by an operator.

FIG. 33 is a diagram illustrating an exemplary detailed bookbinding dialog 3301 for setting details of the bookbinding, displayed when the perfect binding bookbinding is selected on the user interface (UI) of FIG. 31 and a bookbinding details setting button 3103 is depressed by the operator.

Setting items of the detailed bookbinding dialog 3301 are similar to those of the detailed bookbinding dialog 3201 shown in FIG. 32. The detailed bookbinding dialog 3301 includes a setting portion 3302 for selecting "left-bound" or "right-bound" as a book binding method and a setting portion 3303 for designating the binding width of the bookbinding operation However, in this case, the driver UI rearrangement application 512 can obtain the finisher profile of the perfect bookbinding machine 2806, can compare the contents of the restriction information being set in the obtained profile with the default restriction information of the user interface (UI) of the printer driver 505 (corresponding to the processing of steps S3902 and S3903 in FIG. 39A), and can change the contents of the user interface (UI) screen based on the restriction information.

When the restriction information is different from the setting information, the driver UI rearrangement application 512 can change the contents of the user interface (UI) screen according to the contents of the restriction information set in the finisher profile (corresponding to the processing of step S3904 in FIG. 39A). In this case, according to the restriction information (2906) that defines the unreadable range of 7 mm adjacent to the spine of a book (i.e., the binding portion of the bookbinding), the display contents (binding width) of the user interface (UI) screen 3201 can be changed from the default setting range (0 mm to 30 mm) (i.e., 3203 of FIG. 32) to a setting range based on the restriction information (7 mm to 30 mm) (i.e., 3303 of FIG. 33).

If the driver UI rearrangement application 512 permits the default setting (0 mm to 30 mm) in a case that the perfect bookbinding machine 2806 is designated to perform the perfect binding bookbinding, the image formed on a recording paper sheet cannot be seen in the range of 0 mm to 6 mm. Therefore, if the settings of the user interface (UI) are unconditionally accepted, the operation settings and the actual post-processing result will contradict with each other when the settings cannot be realized in the actual perfect binding bookbinding processing.

To avoid such contradiction, the driver UI rearrangement application 512 can change the default setting range (0 mm to 30 mm) to a new range (7 mm to 30 mm) reflecting the restriction information, based on a binding width range set as the restriction information (i.e., <BookletUnReadableWidth. Length="7 mm"/>: refer to tag 2906 in FIG. 29). According to the change of the setting range, the driver UI rearrangement application 512 can control the display of the user interface (UI).

In the above-described example, only one near-line finisher is added and connected. However, the driver UI rearrangement application 512 installed on the host computer (1 or 2) can obtain finisher profiles of plural near-line finishers (i.e., the middle stitch bookbinding machine 31 and the paper folding machine 32) constituting the finisher system 200 shown in FIG. 1. Then, the driver UI rearrangement application 512 can compare the restriction information set in the obtained finisher profiles with the default restriction information, and can control the display of the user interface based on the comparison result.

As described above, according to the present exemplary embodiment, the operator can easily perform the settings of a finisher without confirming the connection state and restricted functions of the finisher.

Second Exemplary Embodiment

Next, a second exemplary embodiment of the present invention will be described with reference to the drawings.

FIG. 34 is a schematic diagram illustrating the arrangement of an image forming system in accordance with the second exemplary embodiment. The image forming system of FIG. 34 is different from the image forming system of FIG. 28 in that the near-line finisher 2806 is replaced with a three-side sheet cutting machine 3406 that is connected to the network 100.

With respect to the connection of the three-side sheet cutting machine, the driver UI rearrangement application 512 performs the following display control. The connection of the near-line finisher in the present exemplary embodiment can be performed according to the procedure described in the first exemplary embodiment.

[Connection of Three-Side Sheet Cutting Machine and Property Information File]

The operator can connect the three-side sheet cutting machine 3406 (i.e., the near-line finisher) to the image forming system, according to the procedure of FIGS. 15 to 17 described in the first exemplary embodiment. After accomplishing the connecting procedure, the finisher profile storing region 1505 shown in FIG. 15 can store the property information file (i.e., profile) that specifies the functions of the three-side sheet cutting machine 3406. FIG. 35 shows exemplary contents of the profile of the three-side sheet cutting machine 3406 stored in the finisher profile storing region 1505.

In FIG. 35, a tag 3501 is an identifier indicating that the finisher is a three-side sheet cutting machine. A tag 3502 shows a maker name of the finisher, i.e., "ABC" according to the example. A tag 3503 shows a product name of the finisher, i.e., "ABC CUT 100" according to the example. A tag 3504 shows the processible input/output size of the three-side sheet cutting machine 3406. The portion <MaxInputDimensions> through </MaxInputDimensions> shows a maximum size of the settable input printed product. According to the example, the maximum dimensions are 330 mm×330 mm. Furthermore, the portion <MinOutputDimensions> through </MinOutputDimensions> shows a minimum cutting size of the printed product. According to the example, the minimum dimensions are 100 mm×142 mm.

The description of a tag 3508 shows restriction information restricting the functions of the three-side sheet cutting machine 3406. The description of the tag 3505 shows the information relating to the thickness of the input original processible in the three-side sheet cutting machine 3406. According to the example, the processible thickness is equal to or less than 50 mm. The description of a tag 3506 shows a minimum cutting width of the three-side sheet cutting machine 3406. According to the example, the processible minimum cutting width is 3 mm in both X and Y directions. The description of a tag 3507 shows a maximum cutting width of the three-side sheet cutting machine 3406. According to the example, the processible minimum thickness is 230 mm in the X direction and 94 mm in the Y direction.

[Display Control of User Interface]

The driver UI rearrangement application 512 installed on the host computer 1 can obtain the finisher profile of the three-side sheet cutting machine 3406 from the image forming apparatus 10, and can add a function display item on the user interface (UI) screen based on the obtained finisher profile, or can change the setting contents of a function display item.

The finishing sheet screen of the printer driver's user interface (UI) is similar to the screen shown in FIG. 30 described in the first exemplary embodiment, before the driver UI rearrangement application 512 obtains the finisher profile of the three-side sheet cutting machine 3406.

Through the finishing sheet screen 3001 of the user interface (UI) shown in FIG. 30, the user can set the functions of the in-line finisher 11 connected to the image forming apparatus 10. The in-line finisher 11 has a stapling function, a punching function, a middle stitch bookbinding function, and a sheet cutting function for cutting one side of the printed products after finishing the bookbinding operation.

The settings relating to the sheet cutting include a print method setting 3002 and a middle stitch setting 3003. The sheet cutting operation is feasible only when the middle stitch is selected in the bookbinding print. Thus, the settings for the sheet cutting operation cannot be displayed by only selecting the bookbinding print in the print method input field 3002 on the finishing sheet screen 3001.

Figure 36:
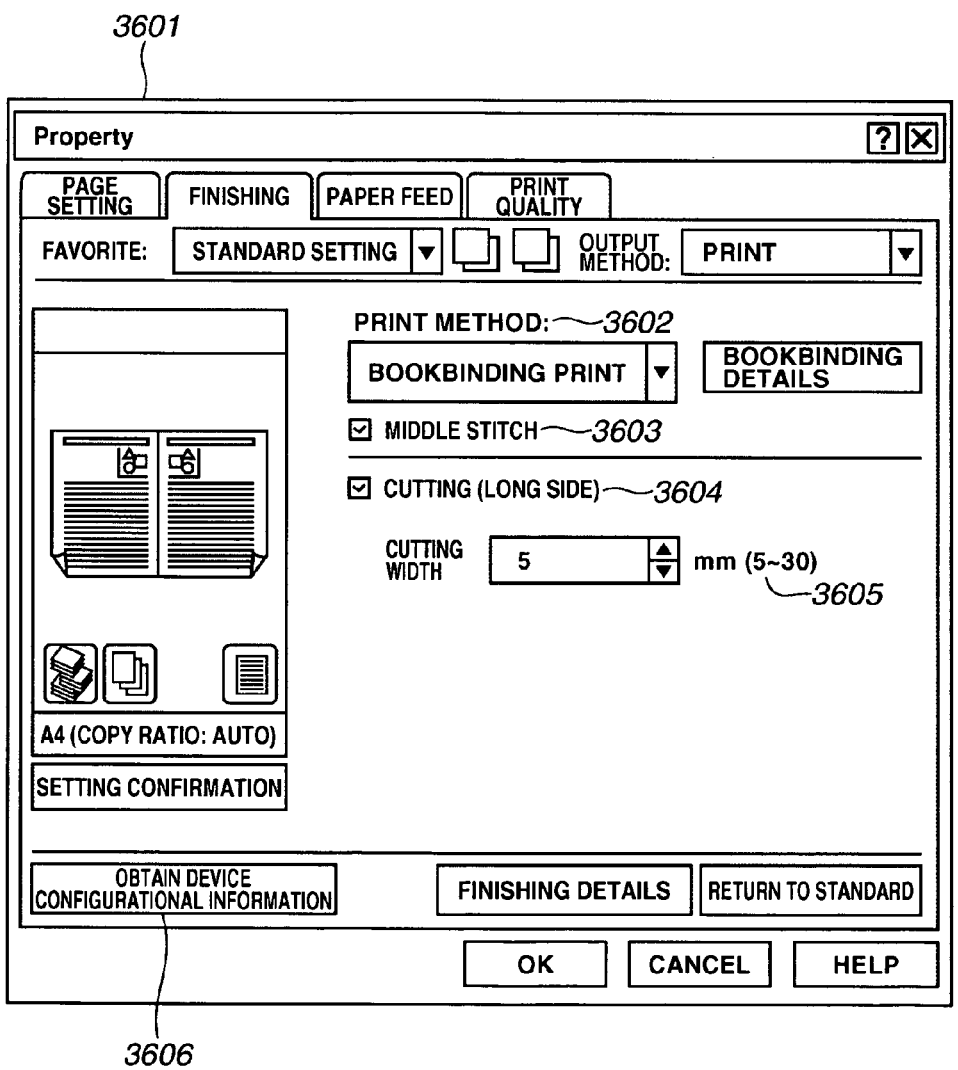
FIG. 36 is a diagram illustrating an exemplary finishing sheet displayed when a middle stitch is selected on the finishing sheet of FIG. 30.

FIG. 36 shows an exemplary finishing sheet 3601 displayed when under "print method:" 3602 (where "bookbinding print" has been selected), the middle stitch 3603 is also selected on the finishing sheet 3001 from FIG. 30. In particular, check mark 3603, entered in the check box designating the middle stitch, indicates that the middle stitch is designated (i.e., ON state). When the check box is in an ON state, the operator can perform the settings for the sheet cutting operation. On the finishing sheet 3601, the operator can select a cutting type in a check box 3604 and can set a cutting width in an input field 3605. The cutting width setting field 3605 allows the operator to set a desirable cutting width in the range of 5 mm to 30 mm, which is given as a default setting range corresponding to the in-line finisher 11.

Next, the driver UI rearrangement application 512 obtains the finisher profile of the three-side sheet cutting machine 3406 which is connected to the network 100. The operator, for example, depresses a button 3606 of the UI finishing sheet 3601 to obtain the information relating to the device configuration, when the three-side sheet cutting machine 3406 (i.e., the near-line finisher) is newly connected to the network 100. In response to the user's depression of the button 3606, the driver UI rearrangement application 512 can obtain the finisher profile of the three-side sheet cutting machine 3406 from the image forming apparatus 10, according to the processing described in FIGS. 5 and 24 that can acquire the finisher profile including the information relating to the device configuration.

The timing for obtaining the finisher profile is based on an operator's instruction, and is not limited to the execution of the processing of FIG. 24. For example, the finisher profile can be obtained when the finishing sheet 3601 of the user interface (UI) shown in FIG. 36 is opened.

Through the processing shown in FIG. 24 that obtains the information relating to device configuration, the driver UI rearrangement application 512 can obtain the finisher profile of the post-processing apparatus (i.e., three-side sheet cutting machine 3406) that is newly connected.

Figure 37:
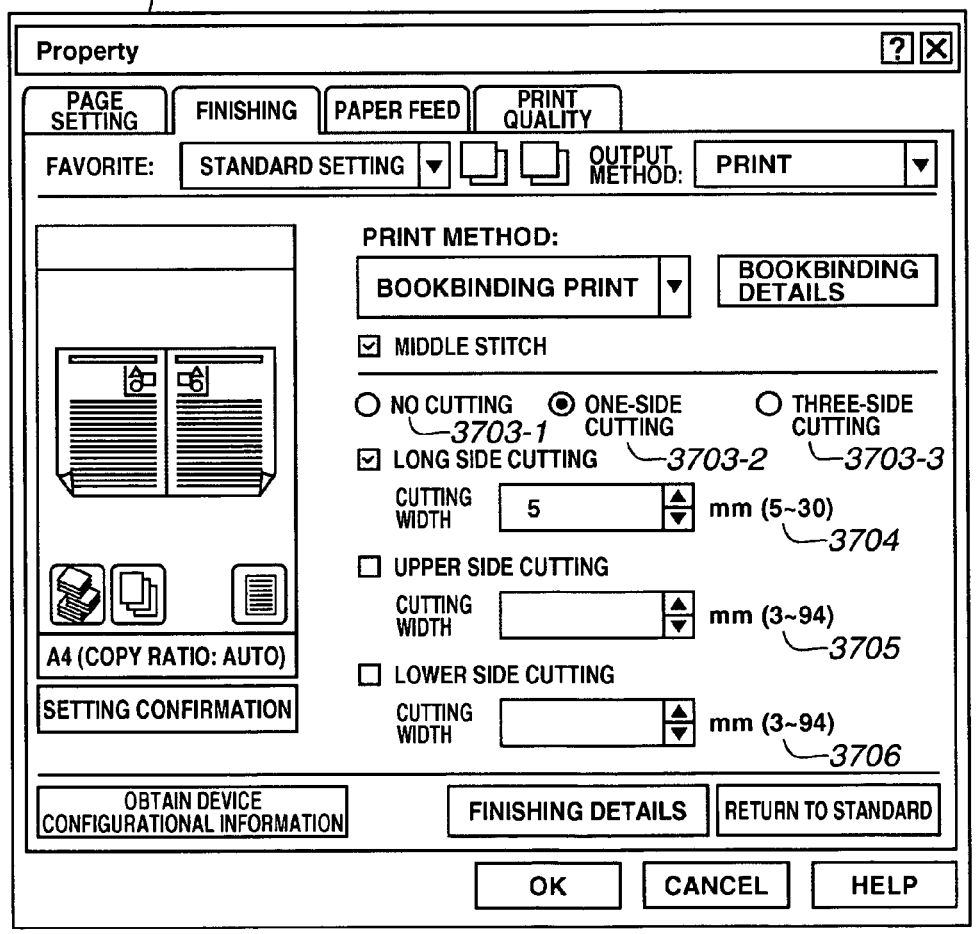
FIG. 37 is diagram illustrating an exemplary user interface used for detailed settings with respect to a sheet cutting method and a cutting width.

The driver UI rearrangement application 512 can analyze the contents of the obtained finisher profile and can control (or change) the display of the user interface (UI) based on the analysis. The driver UI rearrangement application 512 can discriminate a character string "3-side Cutter" contained in the tag 3501 of the finisher profile, and can recognize that this finisher is a three-side sheet cutting machine. With this recognition, the cutting is enabled in the case that the bookbinding print is selected as the print method and further the middle stitch is selected. The driver UI rearrangement application 512 can add radio buttons 3703, that allows the operator to select a cutting method, on a printer driver's finishing sheet of the finishing sheet 3701 of the user interface (UI) shown in FIG. 37.

The operator can select a radio button 3703-1 when no sheet cutting operation is necessary. The operator can select a radio button 3703-2 when a one-side sheet cutting operation is necessary. When the radio button 3703-2 is selected, the in-line finisher 11 is designated as a post-processing machine. The operator can select a radio button 3703-3 when a three-side sheet cutting operation is necessary. When the radio button 3703-3 is selected, the near-line finisher (i.e., three-side sheet cutting machine 3406) is designated as a post-processing machine.

Furthermore, the finishing sheet 3701 allows the operator to set a sheet cutting width for each of a long side cutting 3704, an upper side cutting 3705, and a lower side cutting 3706.

When the "one-side sheet cutting" 3703-2 is selected by the operator, the driver UI rearrangement application 512 enables the cutting width 3704 as a selectable cutting width of the long side cutting operation. In this case, the driver UI rearrangement application 512 can control (or change) the display for the cutting width 3705 of the upper side cutting operation and the cutting width 3706 of the lower side cutting operation. For example, the display can be differentiated by using masking or the like.

According to the example, the range (5 mm to 30 mm) of the cutting width 3704 for the long side cutting operation is based on the default setting information. The range (3 mm to 94 mm) of the cutting width 3705 for the upper side cutting and the range (3 mm to 94 mm) of the cutting width 3706 for the lower side cutting are based on the settings of restriction information (i.e., <Minimum Cutting Length.Y Y="3 mm"/, <Maximum Cutting Length.Y Y="94 mm"/> (refer to tags 3506 and 3507 in FIG. 35)). If the print is performed based on the settings shown in FIG. 37, the bookbinding print and the middle stitch are successively performed and finally the pages of the book are cut along their long sides by the width of 5 mm.

When the "three-side sheet cutting" 3703-3 is selected by the operator, the driver UI rearrangement application 512 can control the display of the user interface (UI) so as to change respective cutting width setting ranges, based on the restriction information included in the finisher profile of the three-side sheet cutting machine 3406.

Figure 38:
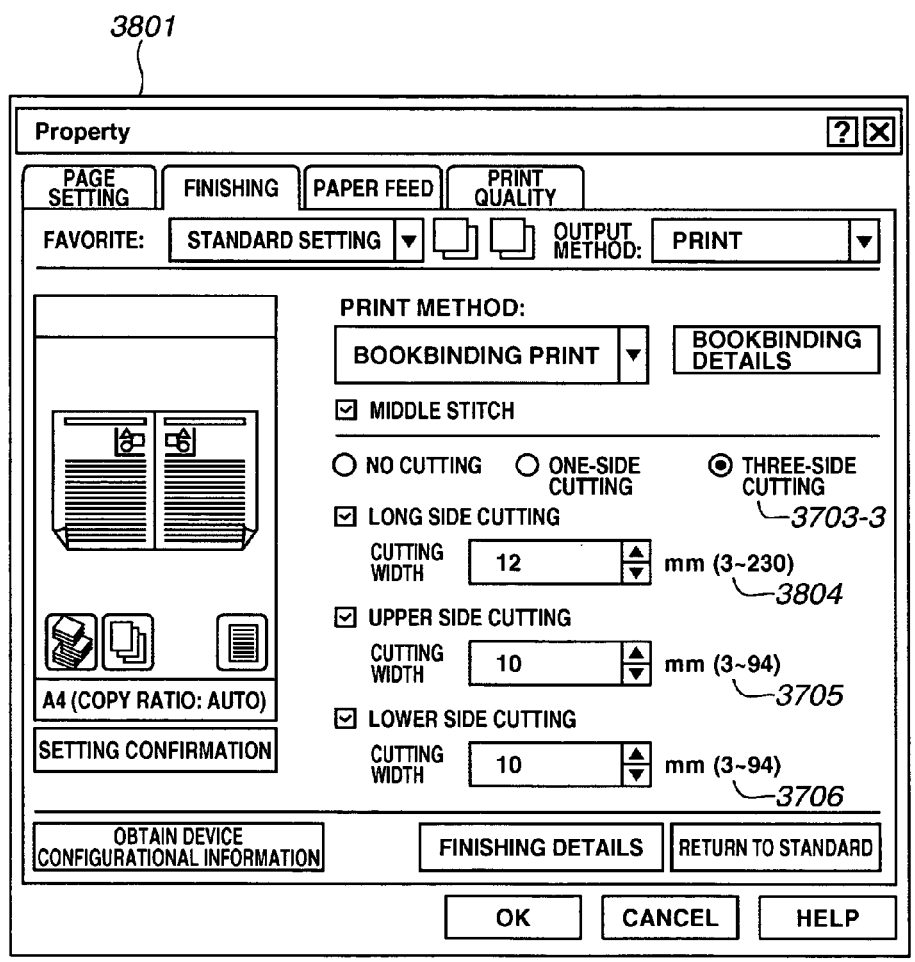
FIG. 38 is a diagram illustrating an exemplary user interface used for detailed settings with respect to the sheet cutting method and the cutting width.

FIG. 38 shows an exemplary user interface (UI) displayed when the setting range of the cutting width 3804 for the long side cutting is changed based on the contents of the restriction information contained in the finisher profile of the three-side sheet cutting machine 3406. Here, the finishing sheer 3801 is similar to the finishing sheet 3701 of the user interface (UI) shown in FIG. 37.

The driver UI rearrangement application 512 compares the setting (3 mm to 230 mm) of the cutting range in the X direction corresponding to the long side, as the restriction information included in the finisher profile of the three-side sheet cutting machine 3406, with the cutting range (5 mm to 30 mm) for the one-side sheet cutting operation set as the default settings corresponding to the in-line finisher 11, and changes the contents of the user interface (UI) based on the restriction information.

If the near-line finisher (i.e., the three-side sheet cutting machine 3406) starts its operation without changing the settings of the cutting range (5 mm to 30 mm) that are set for the in-line finisher, the cutting operation will not be performed when the printed products exceeding the range of 5 mm to 30 mm. Thus, the settings and the actual post-processing will contradict with each other.

To avoid such contradiction, based on the restriction information relating to the cutting range in the X direction corresponding to the long side (i.e., <Minimum Cutting Length.X X="3 mm"/>, <Maximum Cutting Length.X X="230 mm"/>: refer to tags 3506 and 3507 in FIG. 35), the driver UI rearrangement application 512 changes the default setting range (5 mm to 30 mm) to a new range (3 mm to 230 mm) reflecting the restriction information, and controls the display of the user interface (UI).

Regarding the cutting widths of the upper side and the lower side (refer to steps 3705 and 3706 in FIG. 38), the sheet cutting ranges are already displayed based on the restriction information. Therefore, the display contents need not be changed. When the three-side sheet cutting 3703-3 is selected as the sheet cutting method, the driver UI rearrangement application 512 controls the display with respect to the cutting widths of the upper side and the lower side based on the restriction information included in the finisher profile. Thus, no contradiction occurs in the relationship between the setting values and the post-processing. The display control for newly changing the cutting range is unnecessary.

According to the example of FIG. 38, the cutting width of the long side is 12 mm, and the cutting widths of the upper side and the lower side are 10 mm. If the print is performed based on the above settings, the bookbinding print and the middle stitch are successively performed while the information relating to the cutting widths is transmitted to the three-side sheet cutting machine 3406 according to the above-described procedure. Subsequently, the operator delivers the printed products from the image forming apparatus 10 to the three-side sheet cutting machine 3406. The three-side sheet cutting machine 3406 can perform a cutting operation based on the transmitted information relating to the cutting widths.

According to the present exemplary embodiment, the operator can easily perform the settings of a finisher without confirming the connection state and restricted functions of the finisher.

Third Exemplary Embodiment

Figure 40:
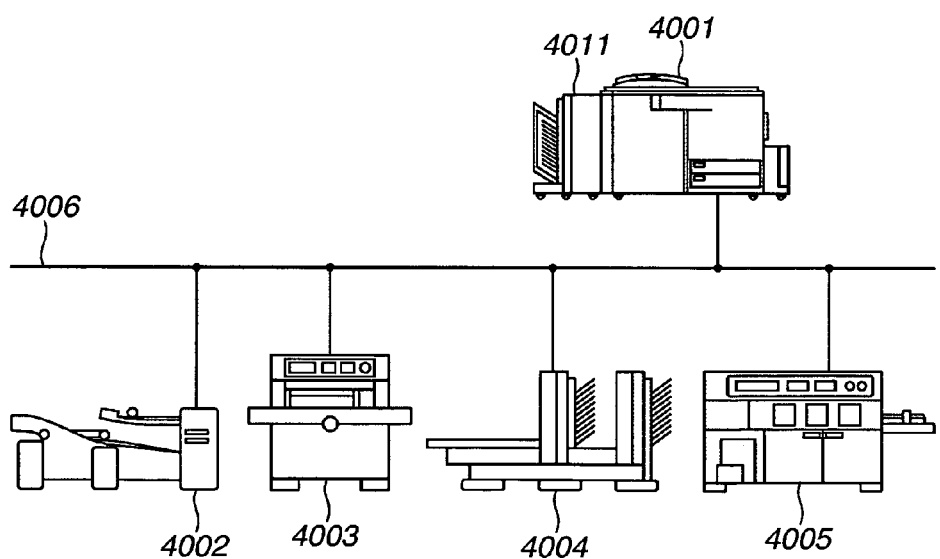
FIG. 40 is a schematic diagram illustrating the arrangement of an image forming system in accordance with a third exemplary embodiment.

FIG. 40 is a schematic diagram illustrating an exemplary arrangement of an image forming system in accordance with a third exemplary embodiment. The image forming system of FIG. 40 includes an image forming apparatus 4001, a paper folding machine 4002, a sheet cutting machine 4003, a middle stitching machine 4004, and a casing-in bookbinding machine 4005. The paper folding machine 4002, the sheet cutting machine 4003, the middle stitching machine 4004, and the casing-in bookbinding machine 4005 can operate as near-line finishers. Besides the near-line finishers shown in FIG. 40, the image forming apparatus 4001 can communicate according to predetermined protocol with other near-line finishers, such as a stapler, a drilling machine, an inserting machine, and a collator, which are connected to a network 4006.

Figure 41:
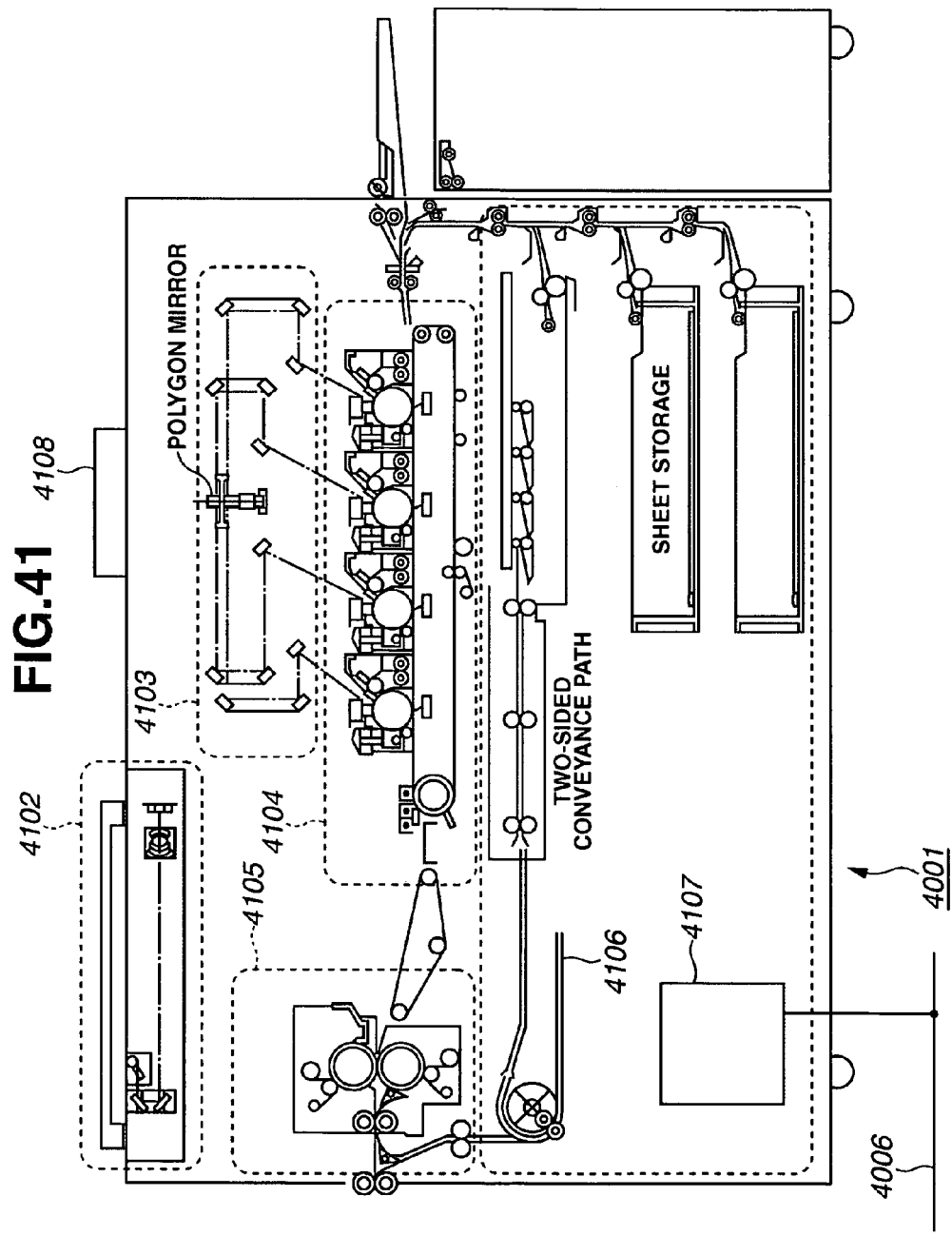
FIG. 41 is a schematic diagram illustrating the arrangement of an image forming apparatus in accordance with the third exemplary embodiment.

FIG. 41 is a schematic diagram illustrating the arrangement of the image forming apparatus 4001 in accordance with the third exemplary embodiment. The image forming apparatus 4001 includes a scanner section 4102, a laser exposing section 4103, an image forming section 4104, a fixing portion 4105, a paper feed/conveyance section 4106, a job control section 4107 controlling these sections, and an operating section 4108 for operation settings.

Figure 42:
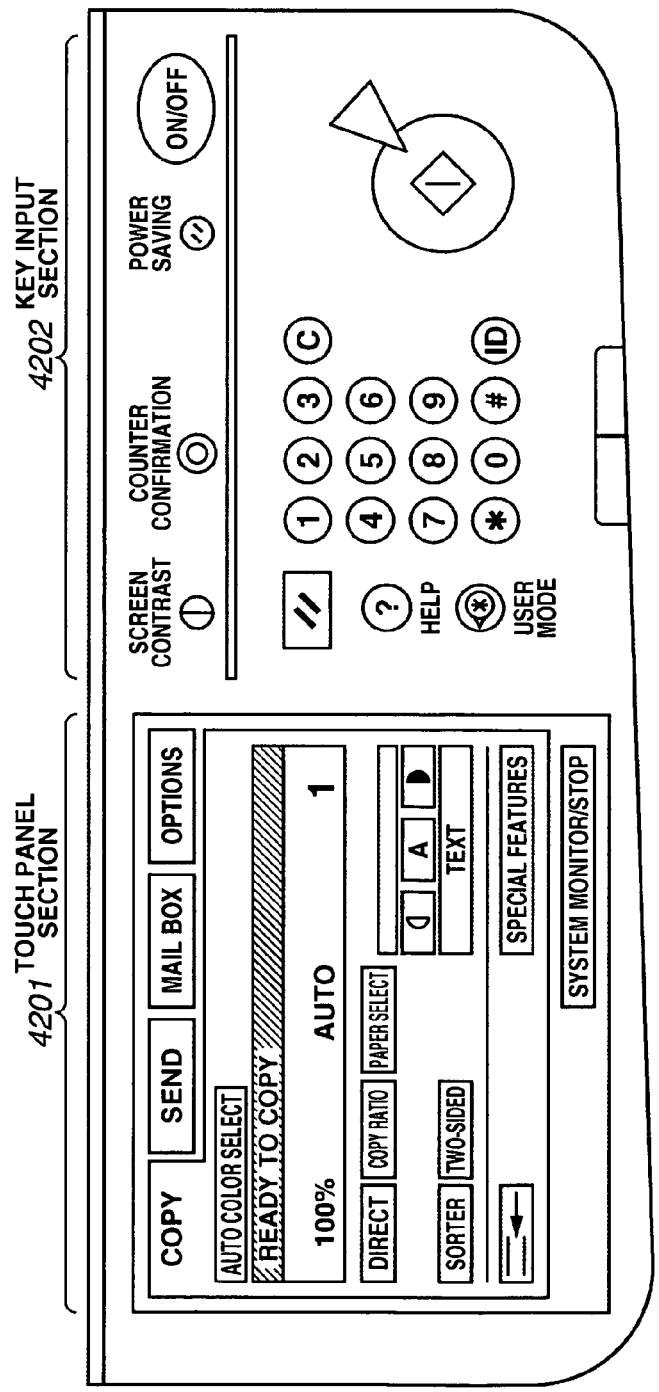
FIG. 42 is a schematic diagram illustrating an operation input section of the image forming apparatus in accordance with the third exemplary embodiment.
Figure 43:
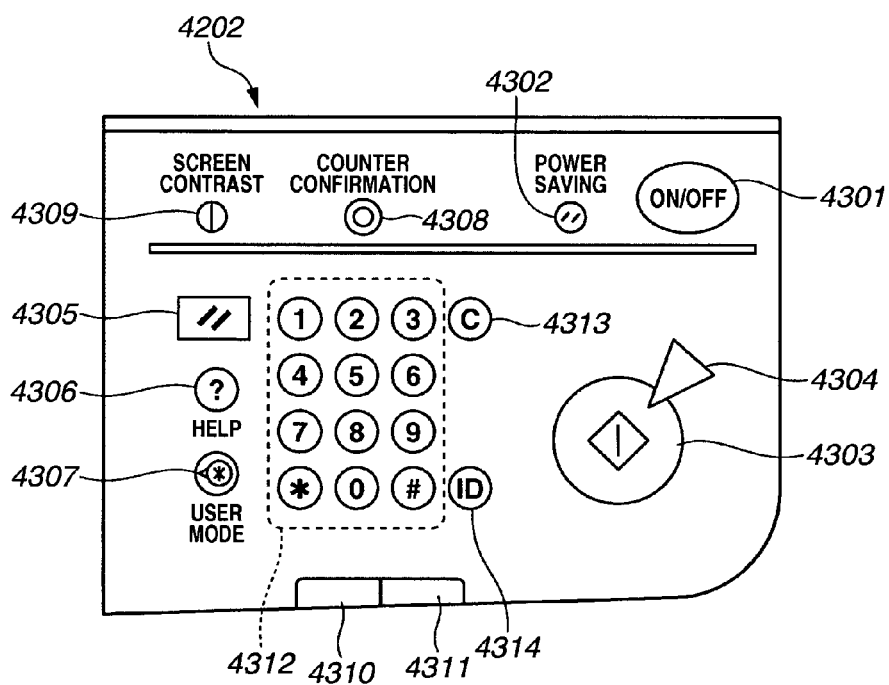
FIG. 43 is a diagram illustrating exemplary details of a key input section.
Figure 44:
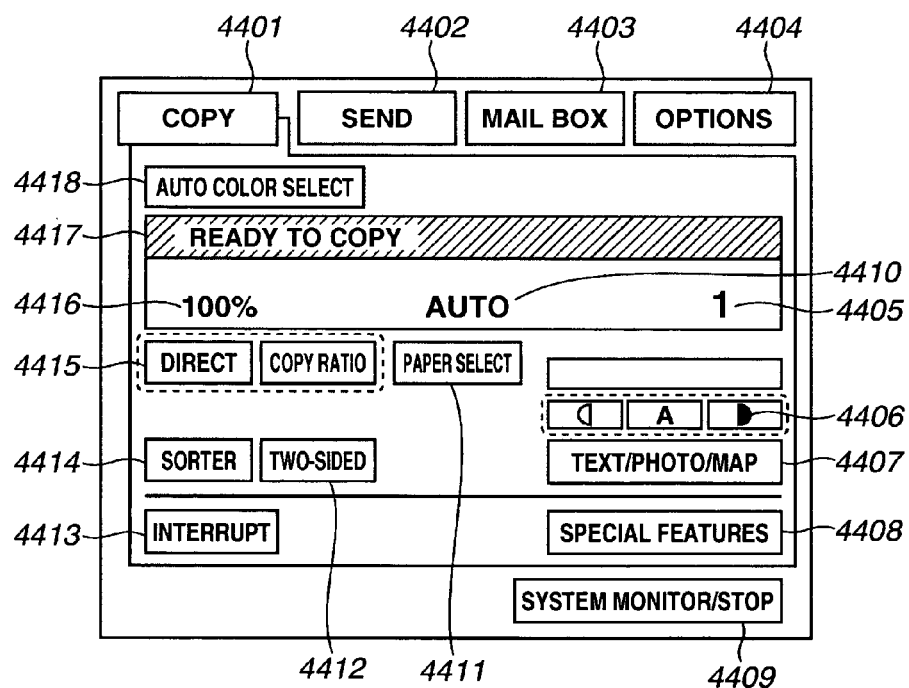
FIG. 44 is a diagram illustrating exemplary details of a touch panel section.

FIG. 42 is a schematic diagram illustrating an exemplary operation input section 4108 of the image forming apparatus 4001. The operation input section 4108 includes a touch panel section 4201 and a key input section 4202. FIG. 43 is an exemplary diagram illustrating details of the key input section 4202. FIG. 44 is an exemplary diagram illustrating details of the touch panel section 4201.

The key input section 4202 shown in FIG. 43 includes an operating section power switch 4301 provided for switching between a standby mode (i.e., normal operating condition) and a sleep mode (according to which the main controller stops the program and waits for an interrupt relating to the network print or the facsimile, to save the electric power consumption). The key input section 4202 can be controlled when the power switch for the entire system is in an ON state.

When the power saving key 4302, i.e., a control key for suppressing power consumption, is depressed, the control temperature of the fixing unit in the standby mode can be reduced, although a longer time is required to reach a printing condition. The power saving key 4302 can be modified so as to decrease the control temperature according to a power saving rate.

A start key 4303 is a control key that enables the operator to instruct start of a copy or a transmission. A stop key 4304 is a control key that enables the operator to interrupt the operation. A ten key 4312 is a control key that enables the operator to perform various settings. A clear key 4313 is a control key that enables the operator to cancel various settings. An ID key 4314 is a control key that enables the operator to input a password number to acquire authorization to use the image forming apparatus 4001.

A reset key 4305 is a control key that enables the operator to return the settings to the default conditions. A help key 4306 is a control key that enables the operator to display a guidance or help message. A user mode key 4307 is a control key that enables the operator to shift to a user's own system setting screen. A counter confirmation key 4308 is a control key that enables the operator to display a total number of printed products based on the data memorized in a soft counter provided in the image forming apparatus 4001 that can count a print number. For example, the number of output prints can be displayed according to an operation mode (e.g., copy/print/scan/fax), a color mode (e.g., color/monochrome), or a paper size (large/small).

An image contrast dial 4309 is a dial that enables the operator to adjust the visibility of the screen by changing the intensity of a backlight equipped for the liquid crystal display in the touch panel section. An execution/memory lamp 4310 is a lamp that flickers during the execution of a job or during access to the memory to notify the operator of it. An error lamp 4311 is a lamp that flickers when no job can be executed or when an error (such as a service person call) occurs, or to notify a jam or shortage of expendable supplies.

FIG. 44 shows an exemplary touch panel display including an LCD (Liquid Crystal Display: liquid crystal display section) and transparent electrodes provided thereon. When the operator touches a transparent electrode corresponding to a key displayed on the LCD, an related operation screen can be displayed. FIG. 44 shows an initial screen in the standby mode. Various operation screens can be displayed in accordance with setting operations.

A copy tab 4401 is a tab key that enables the operator to transit to an operation screen for the copy action. A transmit tab 4402 is a tab key that enables the operator to transit to an operation screen for instructing a transmission (Send) action, such as fax or electronic mail (E-mail) transmission. A box tab 4403 is a tab key that enables the operator to transit to a screen for inputting/outputting a job into a box (i.e., a job storing unit provided for each user). An option tab 4404 is a tab key that enables the operator to set optional function, such as scanner settings. A system monitor key 4409 is a key that enables the operator to display the conditions of the image forming apparatus 4001. By selecting each tab, the operator can transit to each operation mode.

A color select setting key 4418 is a key that enables the operator to select a color copy, a monochrome copy, or an automatic selection. A copy ratio setting key 4415 is a key that enables the operator to transit to a setting screen on which the operator can perform copy ratio settings (e.g., direct, enlarge, and reduce). A post-processing setting key 4414 is a key that enables the operator to transit to a stapling or punching setting screen on which the operator can designate the number, position, etc.

Furthermore, a two-sided setting key 4412 is a key that enables the operator to transit to a setting screen on which the operator can select either one-sided print or two-sided print. A paper size setting key 4411 is a key that enables the operator to transit to a setting screen on which the operator can select a paper feeding tray, a paper size, and a media type. An image mode setting key 4407 is a key that enables the operator to select an image mode suitable for the original image, such as a text mode or a photograph mode. A density setting key 4406 is a key that enables the operator to adjust the density of an output image.

Next, a status display section 4417 performs a simplified display indicating the current status, such as a standby condition, a warming-up condition, a jam, and an error. A copy ratio display section 4416 displays a copy ratio set by the operator through the copy ratio setting key 4415. A paper size display section 4410 displays the paper size and the mode set by the operator through the paper size setting key 4411. A copy number display section 4405 displays the copy number designated by the operator through the ten key or displays a momentary copy number. Furthermore, an interrupt key 4413 can be used to interrupt the copy action to execute another job. A special feature key 4408 is a key that enables the operator to perform the settings for continuous page copying, front page/assembled pages, reduced layout, image shift, etc.

The image forming apparatus 4001 has functions similar to those of the image forming apparatus described in the first exemplary embodiment with reference to FIG. 8. More specifically, the job control section 4107 of FIG. 41 (corresponding to the job control section 800 in FIG. 8) can control various functional sections to execute a print job produced by the host computer. In this case, the job control section 4107 can communicate via the NIC section 803 (refer to FIG. 8) with the near-line finisher (e.g., the sheet cutting machine 4003, or the middle stitch bookbinding machine 4004 shown in FIG. 40) that is connected to the network 4006, to obtain the information (i.e., finisher profile) specifying a near-line finisher function. The job control section 4107 can reflect the contents of the finisher profile to the user interface (UI) used for the post-processing of printed products.

Figure 45:
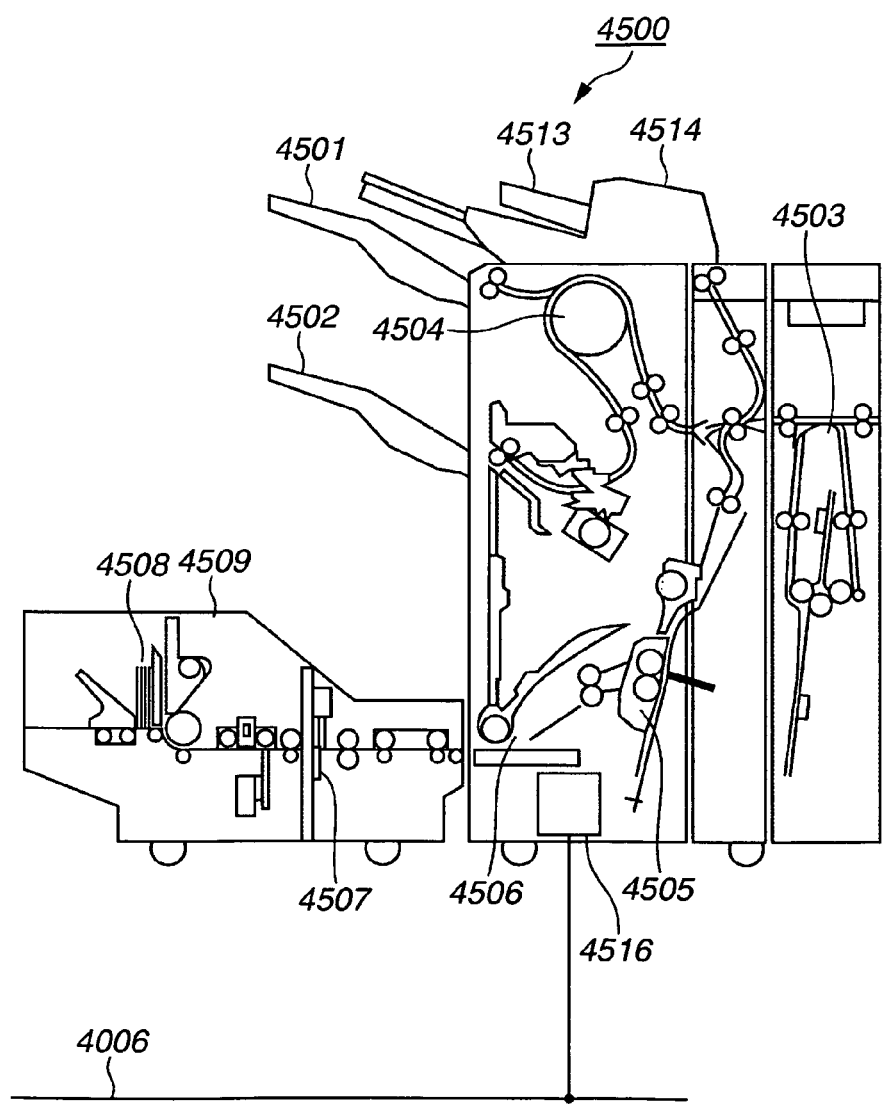
FIG. 45 is a diagram illustrating an exemplary arrangement of a near-line finisher.

FIG. 45 is a diagram illustrating an exemplary arrangement of a near-line finisher 4500. The near-line finisher 4500 can control start, interruption, and completion of the processing based on an instruction from a finisher control section 4516. The finisher control section 4516 is connected to the network 4006 (refer to FIG. 40). The finisher control section 4516 has a communication function (i.e., data transmission/reception function) for receiving the data form an external device (e.g., the image forming apparatus 4001 or the host computer connected to the network 4006) and transmitting the data to the external device.

The printed products (i.e., stacked sheets) disposes on a paper feed tray (hereinafter, simply referred to as "sheets") are conveyed along the path in the near-line finisher 4500 when the near-line finisher 4500 starts the processing. The near-line finisher 4500 is equipped with a sample tray 4501 and a stack tray 4502 which can be selectively used according to a job type or a copy number of discharged sheets.

There are two sorting methods. One method is a bin sorting method for sorting the output sheets to plural bins. The other method is a shift sorting method for sorting the output sheets for each job using an electronic sorting function. Using a large-capacity memory equipped in the control section 4516 can support an electronic sorting function by using a so-called collating function that can change the buffered page order and the discharge order.

Furthermore, when the stapling mode is set for the job to be output, the finisher control section 4516 controls the near-line finisher 4500 to discharge the sheets to the stack tray 4502. In this case, before the sheets are discharged to the stack tray 4502, the sheets can be successively stored for each job in a processing tray provided in the finisher and can be bound on the processing tray by a stapler. Thus, each bundle of recording paper sheets can be discharged to the stack tray 4502.

Furthermore, according to a job type, a Z folding machine 4503 can fold the sheets into a Z shape and a puncher 4504 can open two (or three) filing holes. For example, when the operator sets the Z folding processing through the operation input section 4108 as the settings relating to the sheet processing for a job to be output, the finisher control section 4516 controls the Z folding machine 4503 to execute the folding processing for the sheets corresponding to the job. Then, the sheets are conveyed along the path in the finisher and discharged to a designated tray, i.e., to the stack tray 4502 or to the sample tray 4501.

Furthermore, when the operator sets the punching processing through the operation input section 4108 as the settings relating to the sheet processing corresponding to a job to be output, the finisher control section 4516 controls the puncher 4504 to execute the punching processing for the sheets corresponding to the job. Then, the sheets are conveyed along the path in the finisher and discharged to a designated tray, for example, to the stack tray 4502 or to the sample tray 4501.

Furthermore, when the operator sets the saddle stitching processing through the operation input section 4108 as the settings relating to the sheet processing corresponding to a job to be output, the finisher control section 4516 controls a saddle stitcher 4505 to execute the saddle stitching processing for the sheets corresponding to the job. The saddle stitcher 4505 can bind the sheets at two central portions, and can fold the sheets fixed along the center line with a roller into a booklet (e.g., a pamphlet), thereby accomplishing the book-binding processing. The booklet produced by the saddle stitcher 4505 is discharged to a booklet tray 4506.

Furthermore, an inserter 4514 can directly deliver a sheet placed in an insert tray 4513 to a designated discharge tray (e.g., to the stack tray 4502 and sample tray 4501) without sending it into the printer. In other words, the inserter 4514 can insert a sheet placed in the insert tray 4513 between the sheets sent to the in-line finisher (i.e., the sheets printed in the printer section). Usually, the operator puts the sheets in a face-up condition in the insert tray 4513 of the inserter 4514. A pickup roller provided in the insert tray 4513 can feed an uppermost sheet of the sheets stacked in the insert tray 4513. Therefore, a sheet fed from the inserter 4514 is discharged in a face-down condition to the stack tray 4502 or to the sample tray 4501.

When a sheet is conveyed to the saddle stitcher 4505, the finisher control section 4516 can once deliver the sheet toward the puncher 4504 and then let the sheet switch a moving direction back to the saddle stitcher 4505, so that the face direction of the sheet can be adjusted as intended (i.e., a face-up condition or face-down condition). The finisher control section 4516 controls the inserter 4514 to execute the above-described sheet inserting processing based on an operator's instruction entered through the operation input section 4108.

A trimmer 4509 (i.e., sheet cutting machine) receives the booklet (i.e., a middle stitched output) from the saddle stitcher 4505. A roller of the trimmer 4509 feeds the received booklet by a predetermined length to cut the edges of respective pages of the booklet in a cutter section 4507. As a result, the booklet has pages having uniformly trimmed edges. Then, the trimmed booklet is stored in a booklet holding section 4508. The finisher control section 4516 controls the trimmer 4509 to execute the above-described sheet cutting processing based on an operator's instruction entered through the operation input section 4108.

Figure 46:
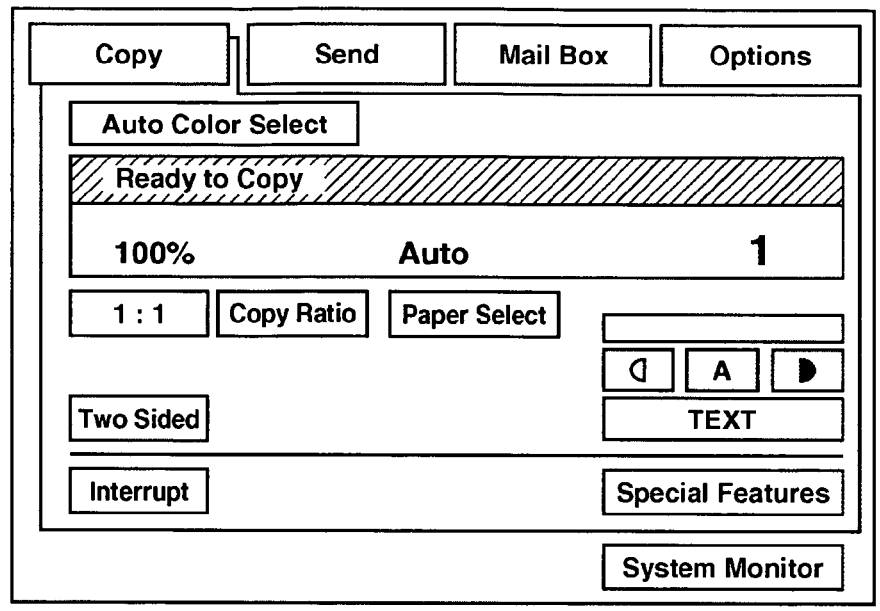
FIG. 46 is a diagram illustrating an exemplary initial screen of an operation input section in the image forming apparatus according to the third exemplary embodiment.
Figure 47:
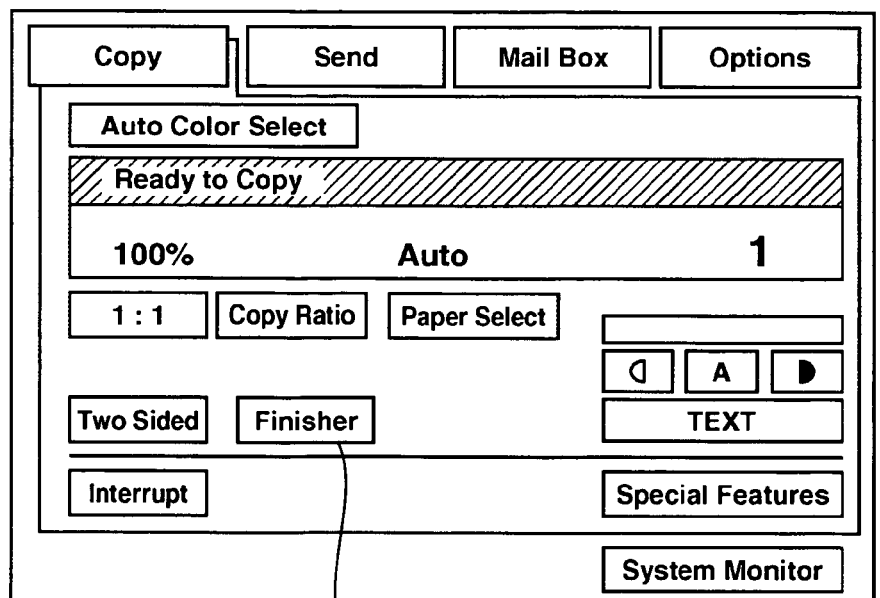
FIG. 47 is a diagram illustrating an exemplary screen displayed in the operation input section of the image forming apparatus, when a near-line finisher is connected to the network.

FIG. 46 is a diagram illustrating an exemplary initial screen of the operation input section 4108 in the image forming apparatus 4001 according to the present exemplary embodiment. FIG. 47 is a diagram illustrating an exemplary screen displayed in the operation input section 4108 of the image forming apparatus 4001, when a near-line finisher is connected to the network 4006. When the near-line finisher 4500 is connected to the network 4006, the job control section 4107 of the image forming apparatus 4001 controls the operation input section 4108 to display a finisher setting button 4701 on its display screen. When the finisher setting button 4701 is selected, the job control section 4107 displays a screen for performing various settings corresponding to the near-line finisher.

Figure 48:
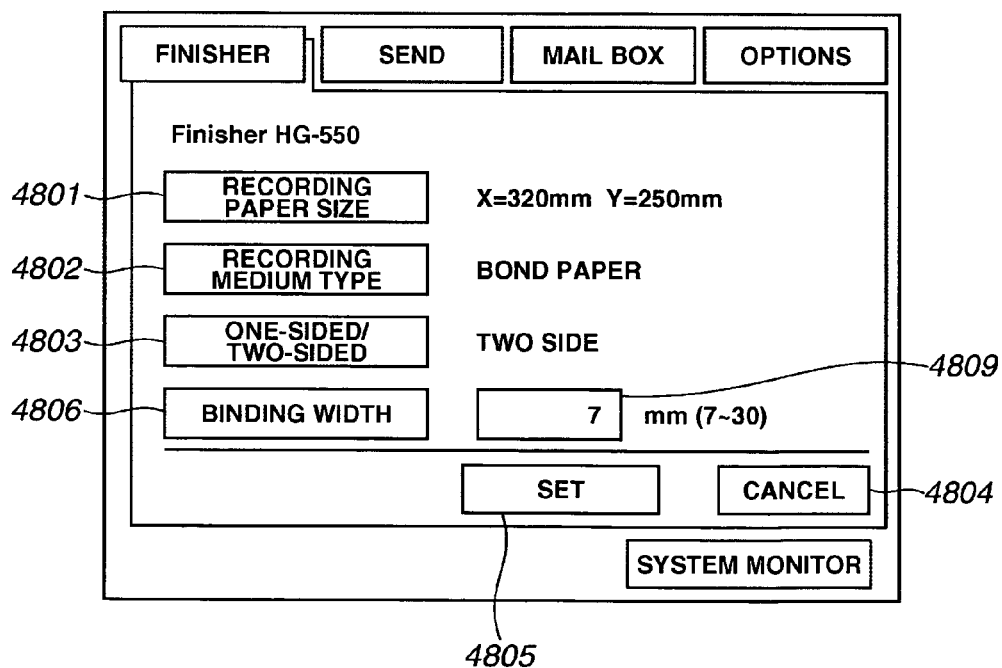
FIG. 48 is a diagram illustrating an exemplary finisher setting screen controlled by a job control section when a finisher setting button shown in FIG. 47 is depressed.

FIG. 48 is an exemplary diagram illustrating a finisher setting screen controlled by the job control section 4107 when the finisher setting button 4701 shown in FIG. 47 is depressed. The operator of the image forming apparatus 4001 can perform various settings of the near-line finisher by depressing function setting buttons 4801 (recording paper size), 4802 (recording medium type), 4803 (one-sided or two-sided), and 4806 (binding width) displayed on the screen. A cancel button 4804 is a button that enables the operator to cancel the setting contents. A setting completion button 4805 is a button that enables the operator to fix the setting contents.

FIG. 49 shows exemplary contents of a finisher profile describing the information relating to near-line finisher functions. The finisher profile, described according to the XML format, includes a tag 4901 showing finisher functions (including a saddle stitching function (Saddle-Stitch), a booklet function (Booklet), a stapling function (Staple), and a job shifting function (Job Shift)). A tag 4902 shows a finisher maker. A tag 4903 shows a finisher's product name. A region 4904 describes finisher capability (performance) corresponding to respective finisher functions. A region 4905 describes control commands for controlling the finisher.

FIG. 50 shows exemplary contents of a finisher connection management table 5001 used for managing a connection state of the finisher. The finisher connection management table 5001 stores the information of finishers connectable to the image forming apparatus 4001. The finisher connection management table 5001 includes, as registered items, a management number 5002 (variable type is Unsigned Short), a finisher name 5003 (variable type is String), a maker name 5004 (variable type is String), a corresponding profile's profile name 5005 (variable type is String), and a finisher's connection state 5006 (variable type is Boolean, "false" represents a disconnected state, and "true" represents a connected state)

According to the table, when the management number 5002 is #5, the finisher name 5003 is "Finisher-X", the maker name 5004 is "XYZ" corporation, the corresponding profile's profile name 5005 is "finisher-x-of-xyz.xml", and the finisher's connection state 5006 is "true (i.e., connected)" (see reference numeral 5007). Similarly, the information corresponding to each management number 5002 can be known from the finisher connection management table 5001. According to the example of FIG. 50, only the finisher having the management number #5 is connected to the image forming apparatus 4001 (i.e., in a connected state.

FIG. 51 is an exemplary finisher capability management table 5100 for managing the capability of each finisher registered in the finisher connection management table 5001 described in FIG. 50. To avoid any contradiction between the functions of the finisher and the functions of the image forming apparatus, the job control section 4107 of the image forming apparatus 4001 determines whether the image forming apparatus 4001 has the print output capability for executing the post-processing using the near-line finisher. If there is a finisher that can utilize the print output of the image forming apparatus 4001 without any contradiction (based on the judgment result), the job control section 4107 of the image forming apparatus 4001 registers the functions of this finisher to the finisher capability management table shown in FIG. 51.

The finisher connection management table 5100 includes a name field 5101 describing a character string showing a finisher name, a function field 5102 describing IDs or character strings showing finisher functions, and a layout field 5103 describing the number of pages to be disposed per recording paper sheet that is required when the finisher functions are used. For example, when the post-processing includes the saddle stitch, the image forming apparatus 4001 must perform printing in consideration of the page layout and the page order suitable for the saddle stitch.

Furthermore, the finisher connection management table 5100 includes a spec field 5104 showing the capability (performance) corresponding to the finisher functions, and a control command field 5105 showing control commands used in various settings of the finisher. To realize a remote control of the finisher, the job control section 4107 of the image forming apparatus 4001 can transmit the control commands to the finisher.

Figure 52:
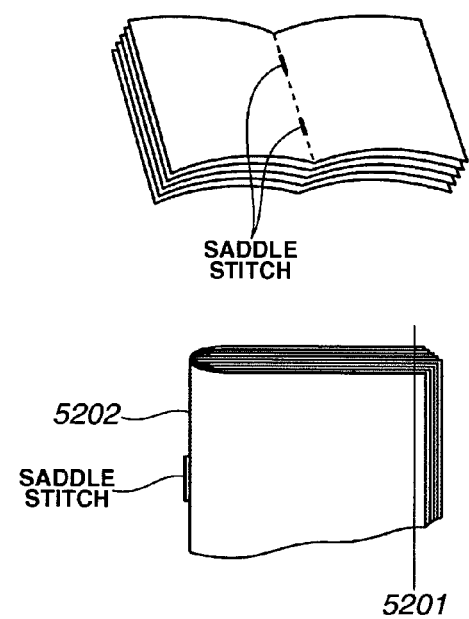
FIG. 52 is a schematic diagram illustrating the saddle stitching performed as an example of the post-processing.
Figure 53A:
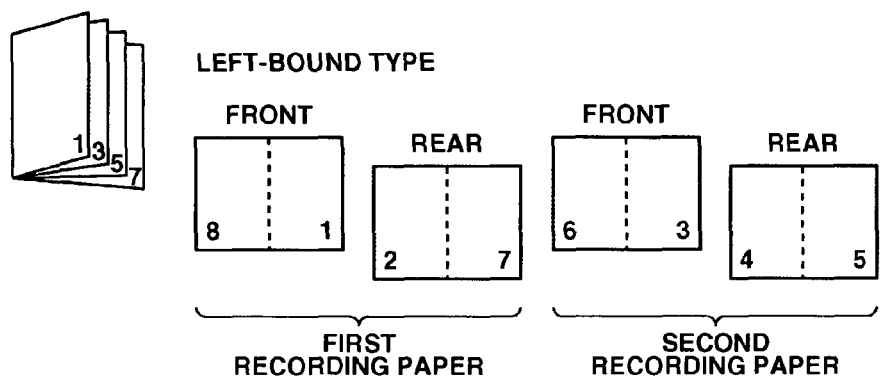
FIG. 53A illustrates an exemplary left-bound page layout.
Figure 53B:
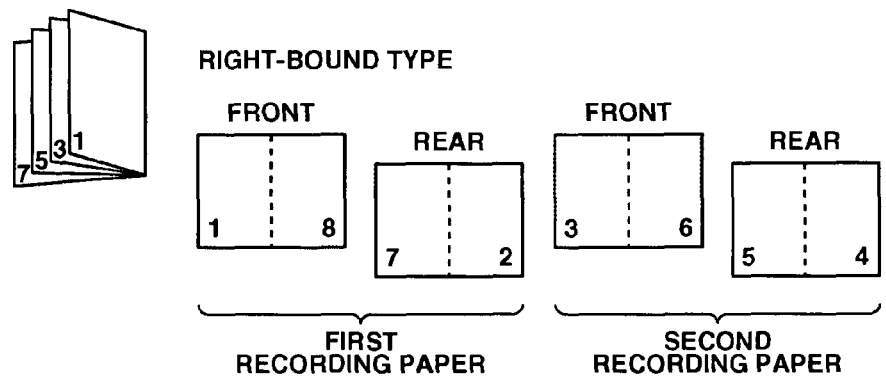
FIG. 53B illustrates an exemplary right-bound page layout.

FIG. 52 is a schematic diagram illustrating exemplary saddle stitching performed as an example of the post-processing, in which 5201 indicates a sheet cutting line along which the pages are cut and 5202 indicates the spine of a book where the pages are folded. FIGS. 53A and 53B are views illustrating the page layout and the output page order that the image forming apparatus must conform in the saddle stitching operation. FIG. 53A shows a left-bound page layout, while FIG. 53B shows a right-bound page layout. As shown in FIGS. 53A and 53B, two pages of data are disposed at the front and rear surfaces of each recording paper sheet. To perform the post-processing using the saddle stitching function, the image forming apparatus 4001 must have an image forming function for successively disposing two pages of image data on a front surface and a rear surface of each recording paper sheet according to a predetermined page order.

FIGS. 54 through 57 are flowcharts describing exemplary procedures, performed when the image forming apparatus establishes a connection with a near-line finisher newly connected to the network 4006, transmits the control commands to the near-line finisher, and executes the post-processing for the printed products.

The image forming apparatus 4001, controlling the post-processing apparatus (e.g., 4002 to 4005 in FIG. 40) connected to the network 4006 and having an image forming unit configured to perform the print output processing, includes an acquiring section, a judging section, and a display control section. The acquiring section can obtain function information (e.g., the finisher profile shown in FIG. 49) showing post-processing functions of the post-processing apparatus.

The judging section can determine, based on the obtained function information, whether the image forming unit can execute the print output enabling the post-processing using the post-processing apparatus. The display control section can control the operation input section 4108 to display a setting screen on its display section for performing an input operation for controlling post-processing functions to use the post-processing apparatus, when the judging section determines that the image forming unit can execute the print output.

Furthermore, the image forming apparatus 4001 includes a registering section that can register, into the finisher connection management table 5001 and to a finisher capability management table 5100, the information relating to a post-processing apparatus that can be designated as the post-processing apparatus, including functions obtained from the finisher profile, capability corresponding to the functions, and control commands for controlling the post-processing apparatus, when the judging section determines that the image forming unit can execute the print output.

The job control section 4107 of the image forming apparatus 4001 can function as the above-described acquiring section, the judging section, the display control section, and the registering section, and can execute the processing of these sections.

FIG. 54 is a flowchart describing a processing flow of the near-line finisher and the image forming apparatus 4001, performed when the near-line finisher is connected to the image forming system. First, in step S5401, when the near-line finisher is connected to the network 4006, the near-line finisher transmits to the image forming apparatus 4001 a connection signal showing that the near-line finisher is connected to the network 4006.

In step S5402, the job control section 4107 of the image forming apparatus 4001 determines whether the connection signal transmitted from the near-line finisher is received via the NIC section 803. When no connection signal is received (i.e., NO in step S5402), the job control section 4107 continues a standby condition to repeat the judgment of step S5402. When the connection signal is received (i.e., YES in step S5402), the processing flow proceeds to step S5403. In step S5403, the job control section 4107 of the image forming apparatus 4001 requests the near-line finisher to transmit the information specifying the functions (i.e., finisher profile).

In step S5404, in response to a request of the image forming apparatus 4001, the near-line finisher transmits the finisher profile under a control of the finisher control section 4516. In step S5405, the job control section 4107 determines whether the finisher profile of the near-line finisher is received. When no finisher profile is received (i.e., NO in step S5405), the processing flow proceeds to step S5411 to perform error processing.

On the other hand, when the finisher profile of the near-line finisher is received (i.e., YES in step S5405), the processing flow proceeds to step S5406. In step S5406, the job control section 4107 reads, from the received finisher profile, the finisher function 4901, the maker name 4902, the product name 4903, the capability (performance) 4904 corresponding to respective finisher functions, and the control command 4905 controlling the finisher.

In step S5407, the job control section 4107 determines whether the image forming apparatus 4001 has the print output capability for executing the post-processing using the near-line finisher. For example, when the near-line finisher having a saddle stitching function is used to perform the post-processing, the job control section 4107 must control the printing of two pages of image disposed on the front and rear pages of each recording paper sheet (refer to FIGS. 52, 53A and 53B). More specifically, when the image forming apparatus 4001 cannot print two pages of image disposed on the front and rear pages of each recording paper sheet in the predetermined page order, the newly connected near-line finisher cannot be used (i.e., NO in step S5407).

Thus, the job control section 4107 skips step S5408. In this case, the near-line finisher's functions unavailable by the image forming apparatus 4001 are not registered in the finisher capability management table (FIG. 51). On the other hand, when the newly connected near-line finisher can be used (i.e., YES in step S5407), the processing flow proceeds to step S5408. In step S5408, the job control section 4107 registers the functions of the near-line finisher as well as the control commands corresponding to the functions in the finisher capability management table (FIG. 51).

The job control section 4107, to obtain the print output processible in the post-processing apparatus, controls the display of the setting screen by adding the buttons (e.g., 4701 in FIG. 47, or 4801-4803, and 4806 in FIG. 48), or changing them. For example, the information relating to the unreadable region (for example, a 7 mm range from the binding portion) in the bookbinding operation may be set as the capability information designated in the finisher profile. In such a case, the job control section 4107 can reflect the detailed information relating to the near-line finisher functions (e.g., recording paper size, type, one-sided/two-sided, etc.) to the setting screen controlling the print output of the image forming apparatus.

In this case, if the information of the newly connected near-line finisher is different from the information already registered as the initial setting information or the setting values of other finisher, the job control section 4107 can control (or change) the display of the setting screen (i.e., user interface) controlling the print output of the image forming apparatus based on the information relating to the capability of the newly connected near-line finisher.

For example, the binding width "0" mm may be set as an initial setting value of the in-line finisher 4011. In this case, if the middle stitch bookbinding machine (i.e., near-line finisher) produces a print output with the initially set binding width, each page will have an unreadable region where no image can be read or seen. Thus, the setting values and the print output result contradict with each other. To avoid such contradiction, the job control section 4107 controls (changes) the display of the input field 4809 from the initial setting value "0" mm to an updated value "7" mm based on the capability information contained in the finisher profile.

Still referring to FIG. 54, in step S5409, the job control section 4107 determines whether the functions and the finisher capability and the control commands relating to the functions have been completely read out of the finisher profile. When there is a function, or related capability or control command (i.e., NO in step S5409), the processing flow returns to step S5406. The job control section 4107 reads the remaining finisher function as well as related finisher capability and control command(s), and determines whether the image forming apparatus 4001 has the print output capability for executing the post-processing using the near-line finisher. When the functions and the finisher capability and the control commands relating to the functions have been completely read out of the finisher profile (i.e., YES in step S5409), the processing flow proceeds to step S5410. In step S5410, the job control section 4107 registers the "finisher name", the "profile name", or the like of the newly connected near-line finisher in the finisher connection management table (FIG. 50).

In the processing of the flowchart shown in FIG. 54, the job control section 4107 can bring the image forming apparatus 4001 into a standby condition (refer to step S5402 in FIG. 54), i.e., a condition for waiting a connection of the near-line finisher, upon power supply to the image forming apparatus 4001, and can start the processing of step S5403 in response to the reception of a connection signal.

Figure 55:
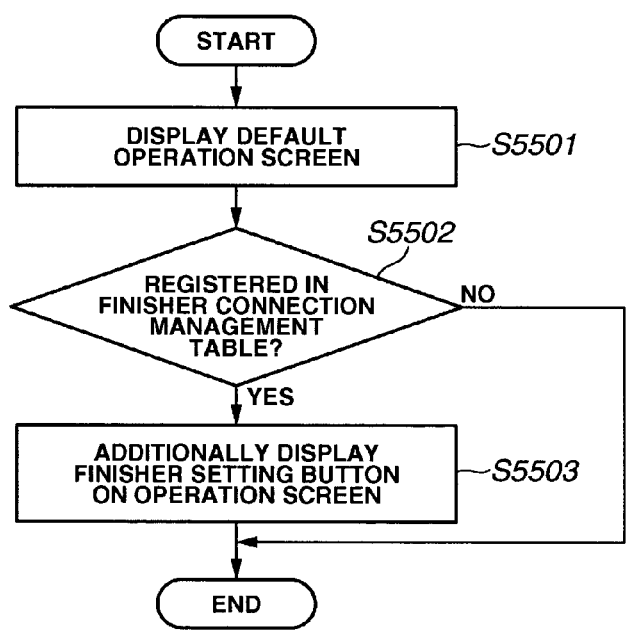
FIG. 55 is a flowchart describing an exemplary processing flow of the job control section that controls the display of the operation input section of the image forming apparatus.

FIG. 55 is a flowchart describing an exemplary processing flow of the job control section 4107 that controls the display of the operation input section 4108 of the image forming apparatus 4001. First, in step S5501, the job control section 4107 controls the touch panel section 4201 to display the screen shown in FIG. 46. Next, in step S5502, the job control section 4107 determines whether the finisher is registered in the finisher connection management table 5001. When the finisher is not registered (i.e., NO in step S5502), the job control section 4107 terminates this routine without changing the contents of the screen shown in FIG. 46.

On the other hand, when the finisher is registered in the finisher connection management table 5001 (i.e., YES in step S5502), the processing flow proceeds to step S5503. In step S5503, the job control section 4107 adds the finisher setting button 4701 on the screen as shown in FIG. 47 before terminating this routine.

Figure 56:
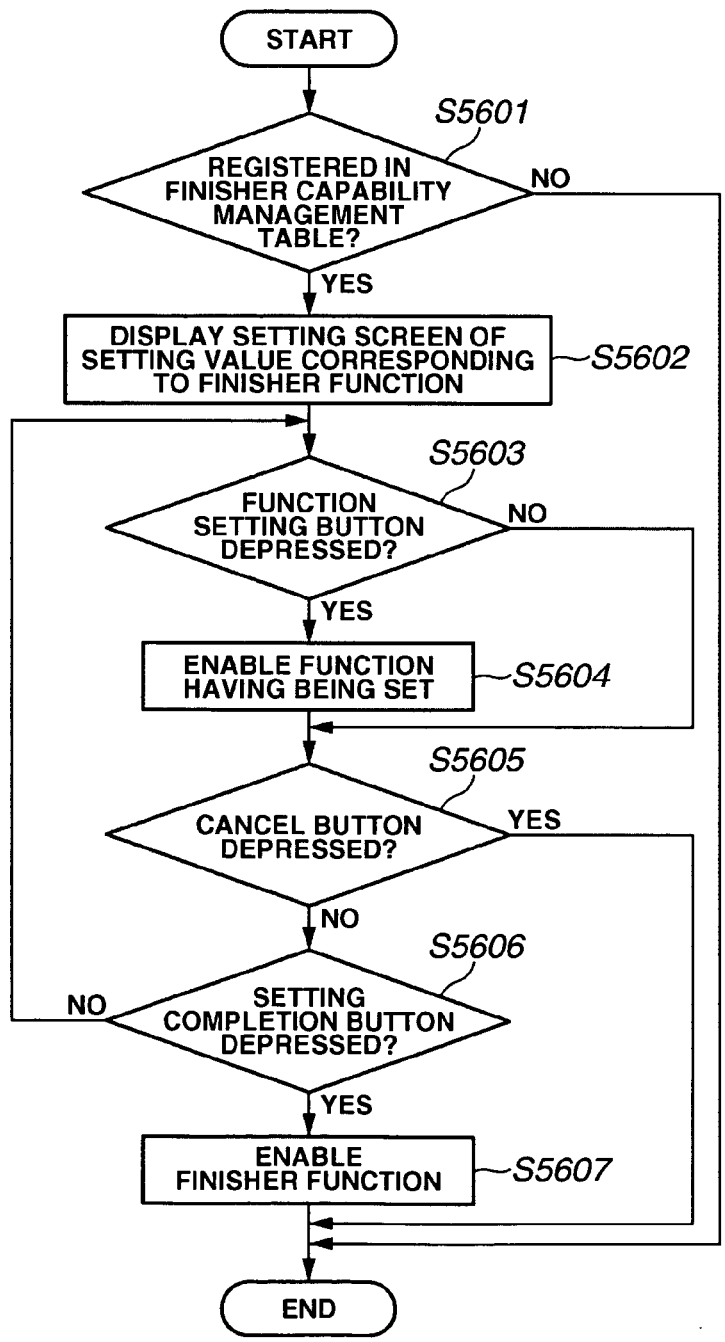
FIG. 56 is a flowchart describing an exemplary processing flow of the image forming apparatus, performed when an added finisher setting button is depressed.

FIG. 56 is a flowchart describing an exemplary processing flow of the image forming apparatus 4001, performed when the operator depresses the finisher setting button 4701 (refer to FIG. 47) which is added in the processing of the flowchart shown in FIG. 55.

First, in step S5601, the job control section 4107 determines whether the information relating to the finisher function (i.e., function information) is registered in the finisher capability management table 5100. When the finisher function information is not registered in the finisher capability management table 5100 (i.e., NO in step S5601), the job control section 4107 terminates this routine. On the other hand, when the finisher function information is registered in the finisher capability management table 5100 (i.e., YES in step S5601), the processing flow proceeds to step S5602.

In step S5602, the job control section 4107 controls the touch panel section 4201 to display the function setting buttons 4801 to 4803 (refer to FIG. 48) that enables the operator to input the setting values corresponding to the finisher functions. In step S5603, the job control section 4107 determines whether any function setting button is depressed. When there is a function setting button depressed (i.e., YES in step S5603), the processing flow proceeds to step S5604. In step S5604, the job control section 4107 enables the function(s) that the operator has set through the function setting button (refer to step S5604).

In step S5605, the job control section 4107 determines whether the cancel button 4804 shown in FIG. 48 is depressed. When the cancel button 4804 is depressed (i.e., YES in step S5605), the job control section 4107 terminates this routine. On the other hand, when the cancel button 4804 is not depressed (i.e., NO in step S5605), the processing flow proceeds to step S5606.

In step S5606, the job control section 4107 determines whether the setting completion button 4805 shown in FIG. 48 is depressed. When the setting completion button 4805 is not depressed (i.e., NO in step S5606), the function(s) enabled by the operator through the function setting button(s) (4801 to

4803) is (are) not yet fixed. Thus, the processing flow returns to step S5603. Then, the job control section 4107 executes the similar procedure. When the setting completion button 4805 is depressed (i.e., YES in step S5606), the finisher function is enabled (step S5607).

The image forming apparatus 4001 includes an analyzing section and a selecting section. The analyzing section can analyze whether the received print job includes any post-processing for the print output. According to the analysis of the analyzing section, the selecting section can select a post-processing apparatus that can execute the designated post-processing based on the information 5102 relating to the near-line finisher functions registered in the finisher capability management table 5100.

Further, the job control section 4107 of the image forming apparatus 4001 can function as the above-described analyzing section and the selecting section, and can execute the processing of these sections. The job control section 4107, having the capability of functioning as the display control section, can control the operation input section 4108 to display a setting screen (e.g., 4801-4803, and 4806 in FIG. 48) that enables the operator to control the print output to use the selected post-processing apparatus, based on the information relating to the capability registered in the finisher capability management table 5100 (e.g., the information 5103 relating to the layout, and the information 5104 relating to the spec).

Figure 57:
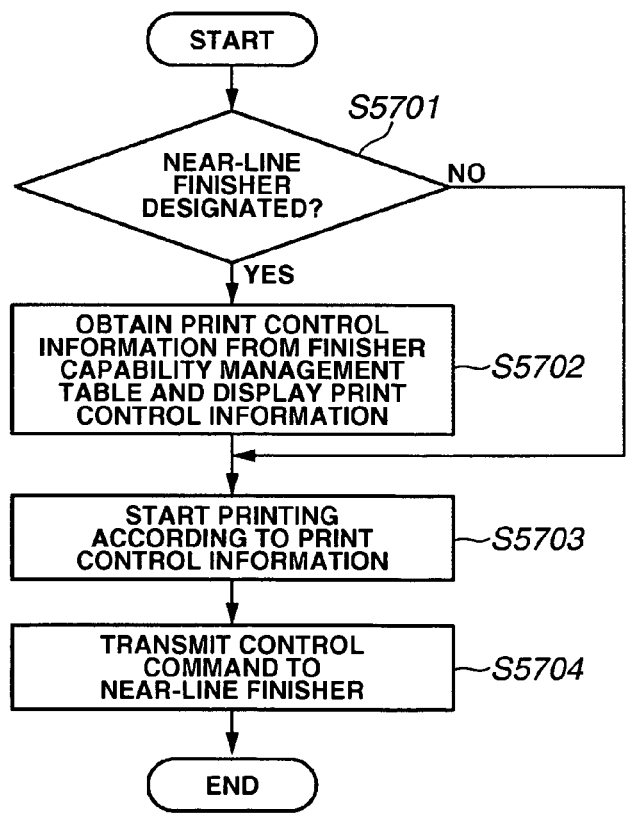
FIG. 57 is a flowchart describing an exemplary print processing flow of the image forming apparatus.

FIG. 57 is a flowchart describing a print processing flow of the image forming apparatus 4001. First, in step S5701, the job control section 4107 determines whether the post-processing using the near-line finisher is designated in the execution of the print. When the post-processing using the near-line finisher is designated (i.e., YES in step S5701), the processing flow proceeds to step S5702. In step S5702, the job control section 4107 selects a near-line finisher that can execute the designated post-processing from the finisher capability management table 5100.

Then, to use the selected post-processing apparatus, the job control section 4107 obtains the information for controlling the print output (e.g., the layout information 5103) from the finisher capability management table 5100, and displays the obtained information on the display screen (refer to FIG. 48). Then, the processing flow proceeds to step S5703. With this display, the operator can confirm the contents of the settings. On the other hand, when the post-processing using the near-line finisher is not designated (i.e., NO in step S5701), the processing flow proceeds to step S5703 without executing the processing of step S5702.

In step S5703, the job control section 4107 executes the print processing according to the layout information 5103 obtained in step S5702 (when the finisher is not used, the layout information is not reflected to the print processing). For example, when the settings of the near-line finisher include the saddle stitching in step S5701, the layout information "2" is obtained from the finisher capability management table 5100. Thus, the job control section 4107 disposes two pages of image on each recording paper sheet, and successively executes the print processing according to a predetermined page order.

After completing the processing of step S5703, the job control section 4107 obtains the control command information 5105 corresponding to the near-line finisher function(s) from the finisher capability management table 5100 and transmits the obtained control command(s) to the near-line finisher before terminating this routine (refer to step S5704). For example, when the settings of the near-line finisher include the saddle stitching, the job control section 4107 transmits "saddleStitch ON" to the near-line finisher, as a control command corresponding to the saddle stitching, from the finisher capability management table 5100. With the control command(s) being thus transmitted, the image forming apparatus 4001 can perform a remote control of the near-line finisher.

According to the above-described third exemplary embodiment, the processing shown in the flowchart of FIG. 54 is executed at the timing the near-line finisher is connected to the network. However, when this exemplary embodiment is applied to an off-line finisher, an operator using this system can download the finisher profile shown in FIG. 49, at arbitrary timing, from a host computer or other external device, to establish the finisher connection management table and the finisher capability management table shown in FIGS. 50 and 51.

According to the present exemplary embodiment, the image to be processed in the finisher can be preferably formed without requiring the operator to confirm the capability of the finisher.

Fourth Exemplary Embodiment

Next, a fourth exemplary embodiment of the present invention will be described below with reference to the drawings. Similar to the above-described first exemplary embodiment, an image forming system of the fourth exemplary embodiment includes an information processing apparatus (e.g., client PC), an image forming apparatus, and a near-line finisher.

[Exemplary GUI of Printer Driver]

The fourth exemplary embodiment discloses exemplary processing for establishing a GUI of the printer driver operating on the client PC according to the profile stored in the profile storing region 504.

In general, finishers attached to an office device are limited in the type. Therefore, the driver UI is usually designed based on the features or spec of the finisher(s) attached to the device. When a finisher is attached to the device, the information of this finisher can be obtained from a printer controller and a UI corresponding to the finisher can be displayed.

However, independent finishers (e.g., near-line finishers and off-line finishers) which are not connected to the image forming apparatus are not considered in designing the driver UI. Furthermore, finishers may have new functions unrecognized at the timing the printer driver is created, or finishers may be different in the type. If such finishers are connected to the image forming apparatus, it is impossible to realize an adaptive display of the driver UI.

In the present exemplary embodiment, the profiles of various finishers are obtained and utilized. Furthermore, the information relating to the UI included in the finisher profile can be described according to the format that the printer driver of the host computer can analyze, so that the printer driver can adaptively constitute and display the UI.

Figure 59:
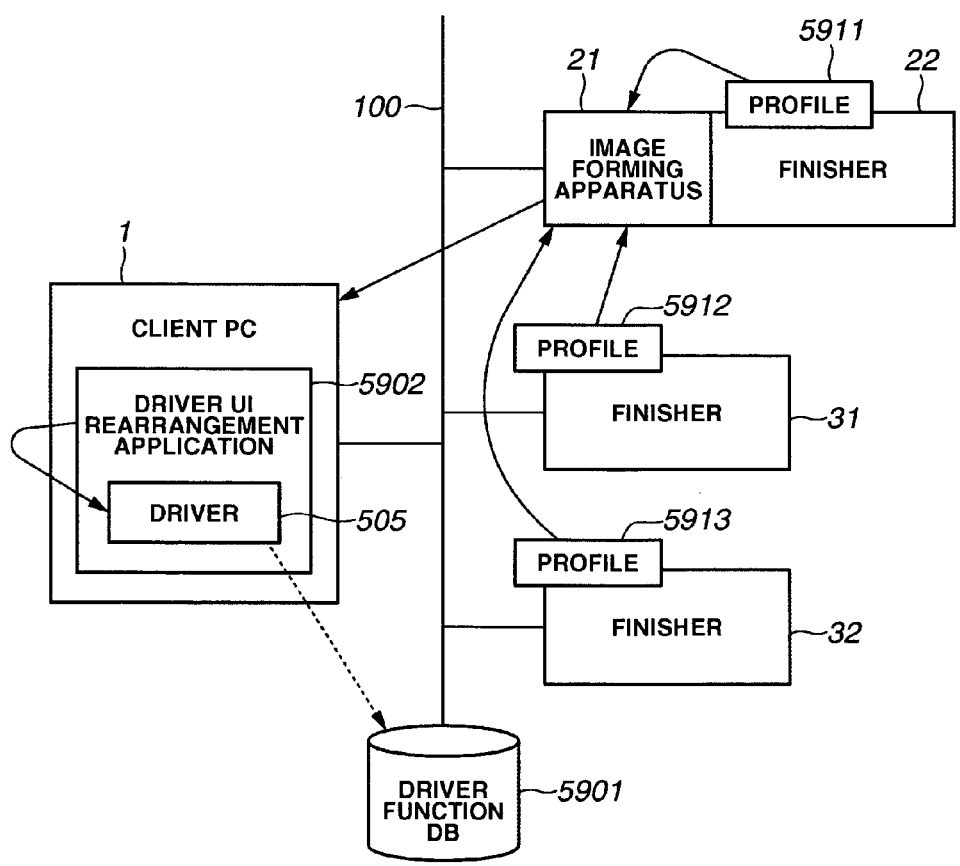
FIG. 59 is a diagram illustrating an exemplary finisher profile flow for changing the driver UI in accordance with a fourth exemplary embodiment.

For the purpose of simplifying the description, FIG. 59 shows an exemplary flow of finisher profiles among the client PC 1, the image forming apparatus 21, and the near-line finishers 31 and 32. In FIG. 59, respective finishers have storage devices storing the profiles 5911, 5912, and 5913 describing the performance or properties of the finishers. Furthermore, a driver function DB 5901 stores all kinds of finisher functions that can be added, changed, or deleted. The driver function DB is provided as a server, or can be provided in the client PC. A driver UI rearrange application 5902 installed and operating on the client PC 1 can rearrange the GUI of the printer driver.

The processing for updating the GUI of the above-described printer driver will be described below. The controller (i.e., job control section 800) of the image forming apparatus 21 detects the finisher 22 directly connected to the image forming apparatus 21 and the finishers 31 and 32 connected to the network 100, as already described. The controller (i.e., job control section 800) obtains the finisher profiles 5911, 5912, and 5913 and stores the obtained profiles in the common DB section 808.

Next, the client PC 1 communicates with the controller of the image forming apparatus 21, obtains all of valid profiles, and stores the obtained profiles in the profile storing region 504. The driver UI rearrangement application 5902 of the client PC rearranges the driver UI based on the profile information stored in the profile storing region 504. In this case, when the profile includes the function(s) which are not present in the driver, the driver UI rearrangement application 5902 communicates with the driver function DB 5901 to obtain the information. Details of each processing will be described later.

First, the GUI configuration of the printer driver 505 in accordance with an exemplary embodiment will be described. Similar to the finisher profile, the information relating to the GUI of the printer driver 505 is described for each function according to the tag format.

Figure 60:
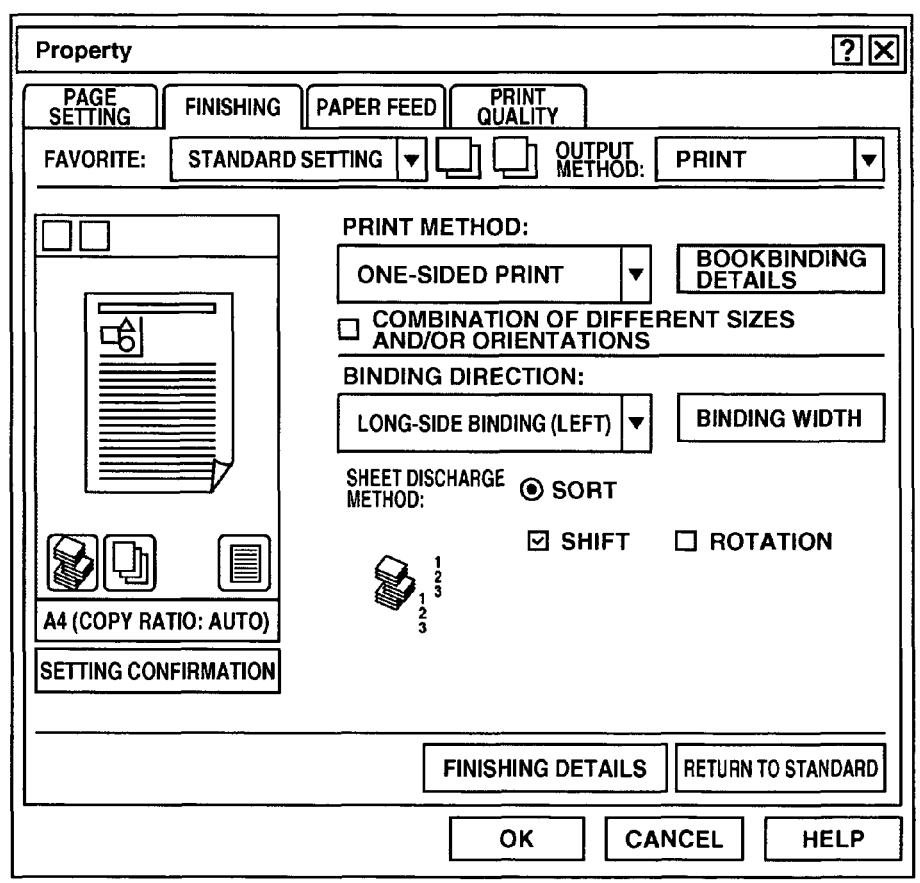
FIG. 60 is a diagram illustrating an exemplary driver UI displayed when the finisher is not connected.

FIG. 60 is a diagram illustrating an exemplary fundamental driver UI displayed when the finisher is not connected. The fundamental driver UI includes "page setting", "finishing", "paper feed", and "print quality" tabs that are selectively switched when the operator clicks on a corresponding tab. The hierarchy can be constituted based on these tabs.

Figure 61:
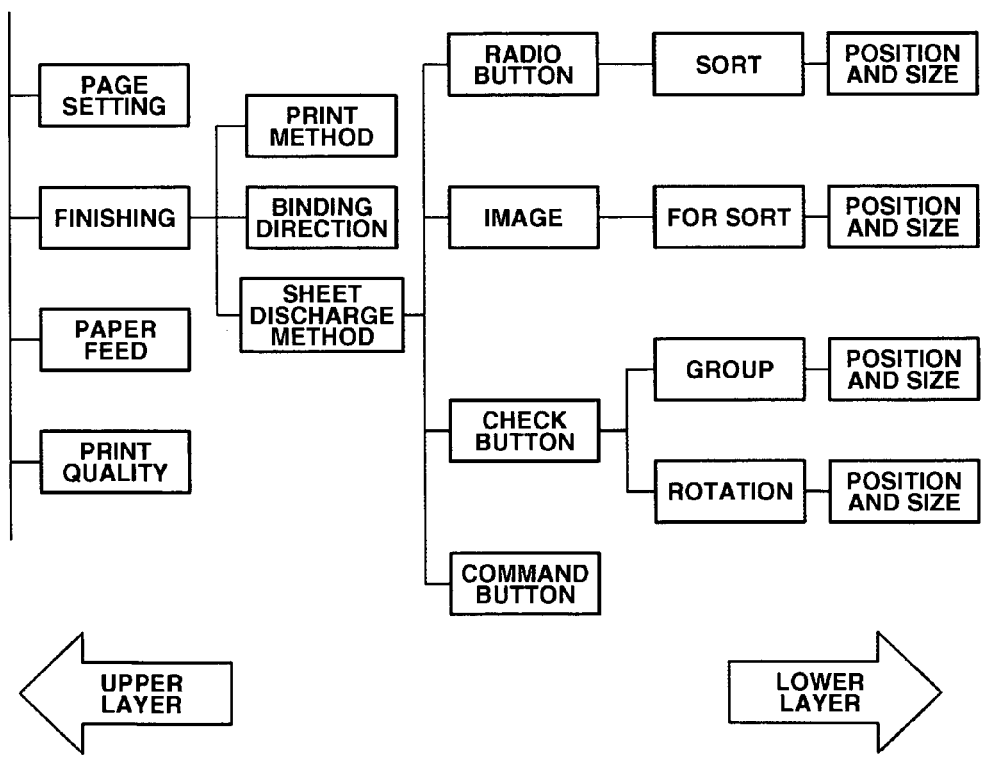
FIG. 61 is a diagram illustrating an exemplary hierarchical configuration of a driver UI to which no finisher is connected.

FIG. 61 is a diagram illustrating an exemplary hierarchical configuration of the driver UI based on the contents shown in FIG. 60. The "finishing" screen of FIG. 60 is roughly separated into three items of "print method", "binding direction", and "sheet discharge method." FIG. 61 shows a tree structure of the hierarchical configuration based on the finishing tab. Furthermore, there are images, such as an option button describing a "sort" item and check buttons, such as "shift" and "rotation", displayed below the "sheet discharge method."

Accordingly, as shown in FIG. 61, the hierarchical configuration can be described according to the hierarchical language, such as XML. In particular, small items such as "sort", "group", and "rotation" are directly related to the update of the driver UI and accordingly are accompanied by tags relating to the position and the occupied area on the driver UI. If the function is inherent to the finisher, a tag showing the finisher relating to this item is accompanied. This will be described later in more detail.

On the other hand, the finisher's profile information includes a "Driver_UI" tag in addition to the above-described profile information. For example, according to the exemplary hierarchical configuration of the profile of a bookbinding machine shown in FIG. 62, the Driver_UI tag is added to the "Booklet", "Medium", and "StapleSpaceInternal" tags which are inherently included in the profile of the bookbinding machine.

The bookbinding machine includes a "staple" function, and accordingly the "sheet discharge method" in the "finishing" tab should be reflected in the driver UI. The "finishing" and "sheet discharge method" tags are described in the profile. Furthermore, in adding the stapling function, a radio button of "staple", a staple image, and a command button designating the stapling position are added on the driver UI screen. Thus, the hierarchical configuration shown in FIG. 62 can be obtained.

The radio button, the image, and the command button represent the functions inherent to the finisher, and accordingly the information discriminating the finisher is added to the information relating to the position and the size. Furthermore, when the operator clicks on a command button "stapling position designation", another UI (i.e., another window) opens to enable the operator to execute detailed settings. In such a case, the information relating to the related UI is described after the information of "stapling position designation."

Figure 63:
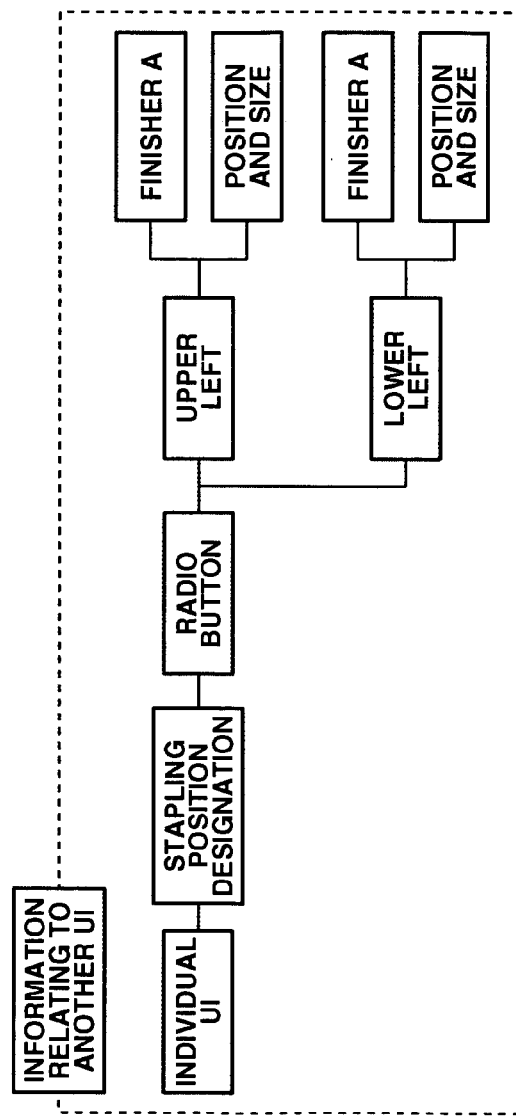
FIG. 63 is a diagram illustrating an exemplary configuration of the profile of a bookbinding machine, describing the information relating to another UI.

FIG. 63 shows an exemplary configuration of the profile of a bookbinding machine, describing the information relating to another UI. According to the example of FIG. 63, a radio button for selecting either "upper left" or "lower left" is used to designate the stapling position. Accordingly, as shown in FIG. 63, the profile describes a tag showing an individual UI, an item of "stapling position designation", type of radio buttons such as "upper left" and "lower left", position and size of each radio button, and information showing a related finisher function.

Figure 64:
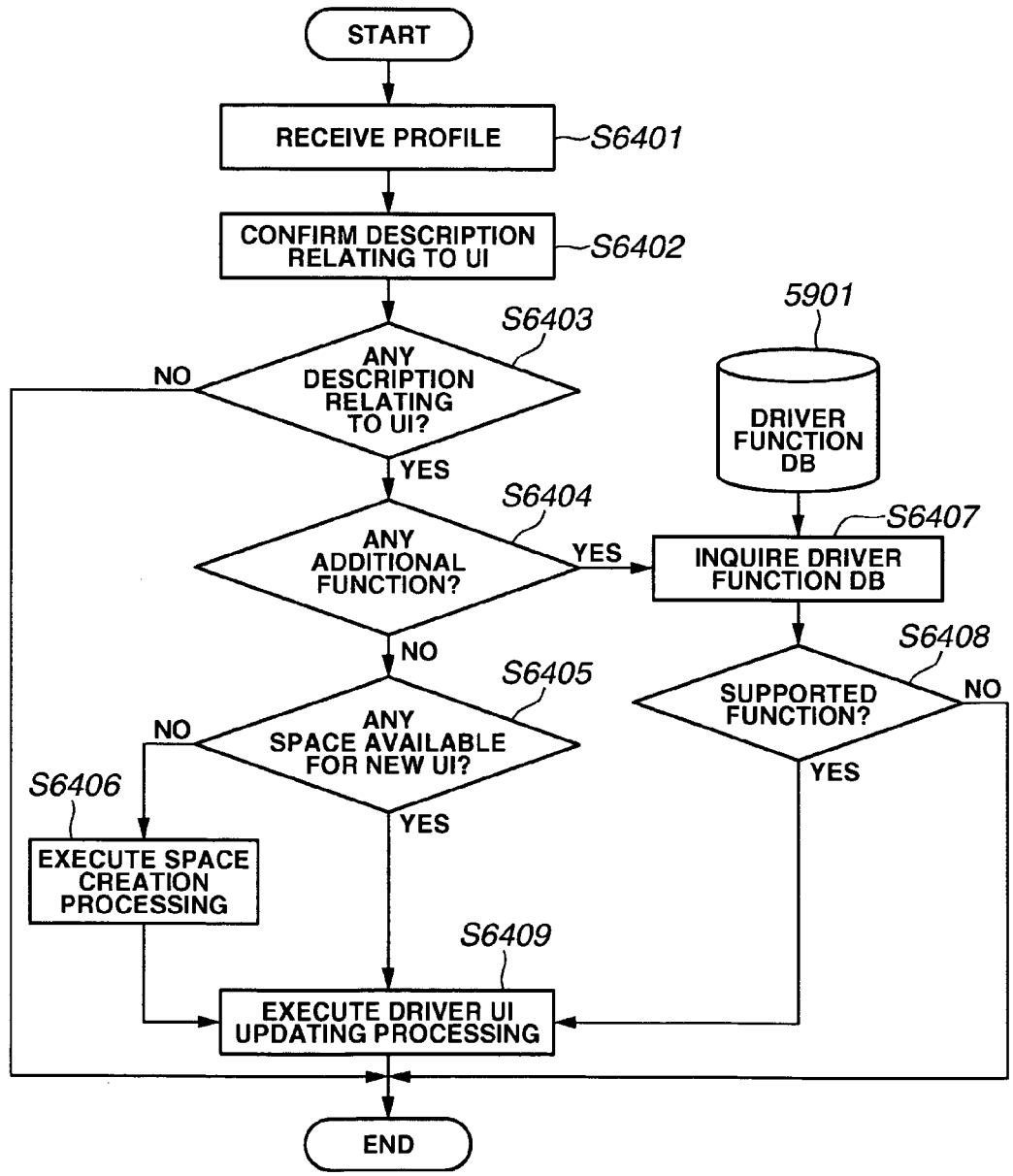
FIG. 64 is a flowchart describing an exemplary driver UI updating processing procedure.

As described above, the driver UI can be updated based on the fundamental driver UI having a hierarchical configuration and the finisher profile describing the information relating to the driver UI. FIG. 64 is a flowchart describing an exemplary driver UI updating processing procedure of the driver UI rearrangement application 5902 in accordance with an exemplary embodiment. The driver UI rearrangement application 5902 can be executed in response to activation of the printer driver, or when the printer is changed by the operator on the GUI shown in FIG. 2.

Referring to FIG. 64, first, the printer driver 505 of the client PC 1 receives the profile information including the finisher profile and the device profile from the controller of the image forming apparatus 21, and stores the received profile information in the profile storing region 504 (refer to step S6401). Next, the printer driver 505 of the client PC 1 confirms the description relating to the UI included in the stored profile information (refer to step S6402), and determines whether there is the description relating to the UI (refer to step S6403). More specifically, in the example of the profile shown in FIG. 62, it is determined whether there is the "Driver_UI."

When there is no description relating to the driver UI (i.e., NO in step S6403), the driver UI needs not be updated and accordingly the printer driver 505 terminates this routine. On the other hand, when there is the description relating to the UI in the profile (i.e., YES in Step S6403), the printer driver 505 determines whether any new function unrecognized by the driver UI rearrangement application is added (refer to step S6404). More specifically, when there is a tag other than the "page setting", "finishing", "paper feed", and "print quality" tags shown in FIG. 61, the printer driver 505 decides that an unrecognized function is added. When there is an unrecognized function is added, the printer driver 505 notifies the driver function DB 5901 of the presence of this tag (refer to step S6407).

The driver function DB 5901 determines whether there is any supported function (refer to step S6408). When there is a supported function (i.e., YES in step S6408), the printer driver 505 obtains the information of the driver function DB 5901 and executes driver UI updating processing (refer to step S6409). When there is no supported function (i.e., NO in step S6408), the printer driver 505 terminates this routine without updating the driver UI.

The above-described processing of steps S6407 and S6408 is required to respond to a new finisher unrecognized by the driver UI rearrangement application. Therefore, if there is a new finisher introduced in the market later than the image forming apparatus 21 and its printer driver, the function(s) of the new finisher can be created as a profile compatible with the UI of the exemplary embodiment and the created profile can be registered in the driver function DB 5901. In this respect, it is desirable to provide the driver function DB 5901 in a FTP server accessible via the Internet.

Furthermore, when no unrecognized function is added (i.e., NO in step S6404), the processing flow proceeds to step S6405. In step S6405, the printer driver 505 determines whether there is any space available for a new UI on the GUI corresponding to this tag. When there is no available space (i.e., YES in step S6405), the processing flow proceeds to step S6406 to execute space creation processing and then proceeds to step S6409 to execute the driver UI updating processing. When there in an available space (i.e., YES in step S6405), the processing flow proceeds to the S6409 to update the driver UI. Details of each processing will be described later.

Figure 62:
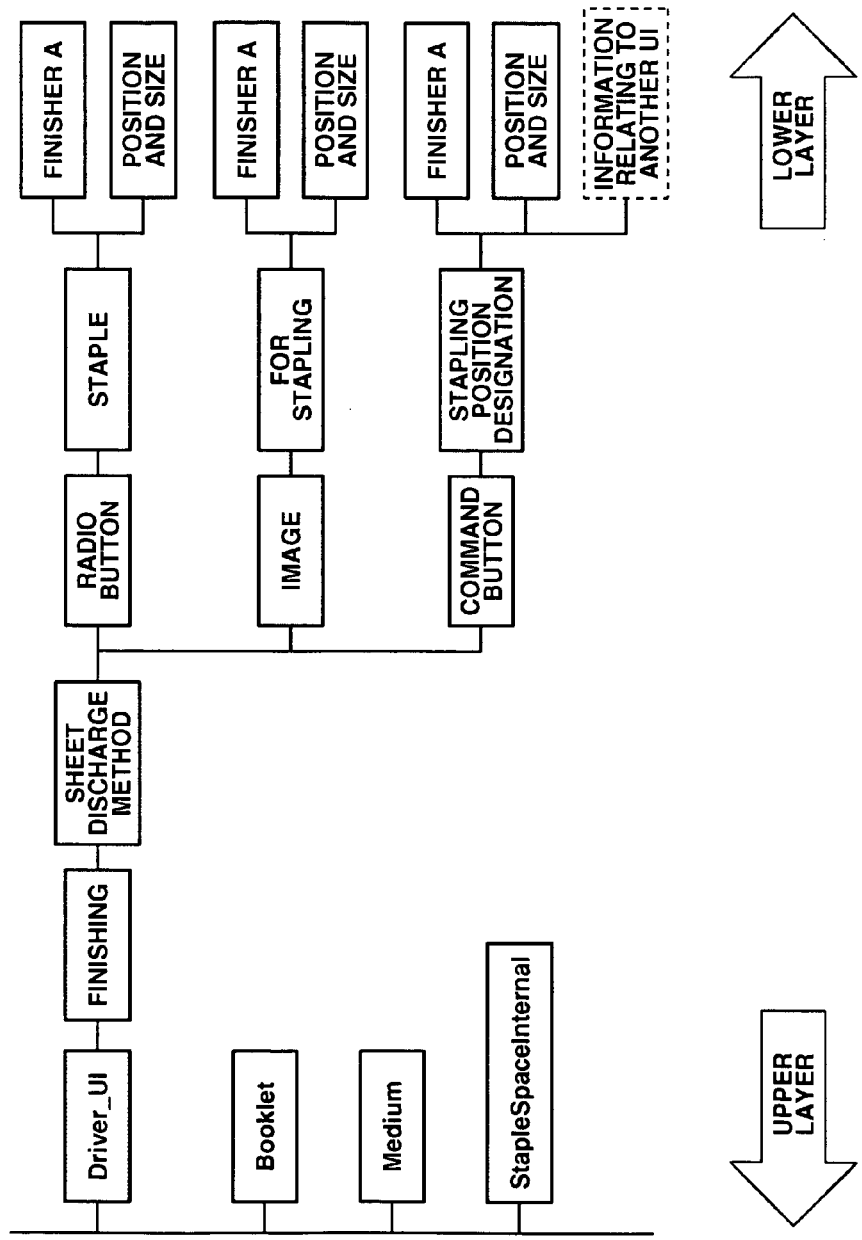
FIG. 62 is a diagram illustrating an exemplary hierarchical configuration of the profile of a bookbinding machine.
Figure 65:
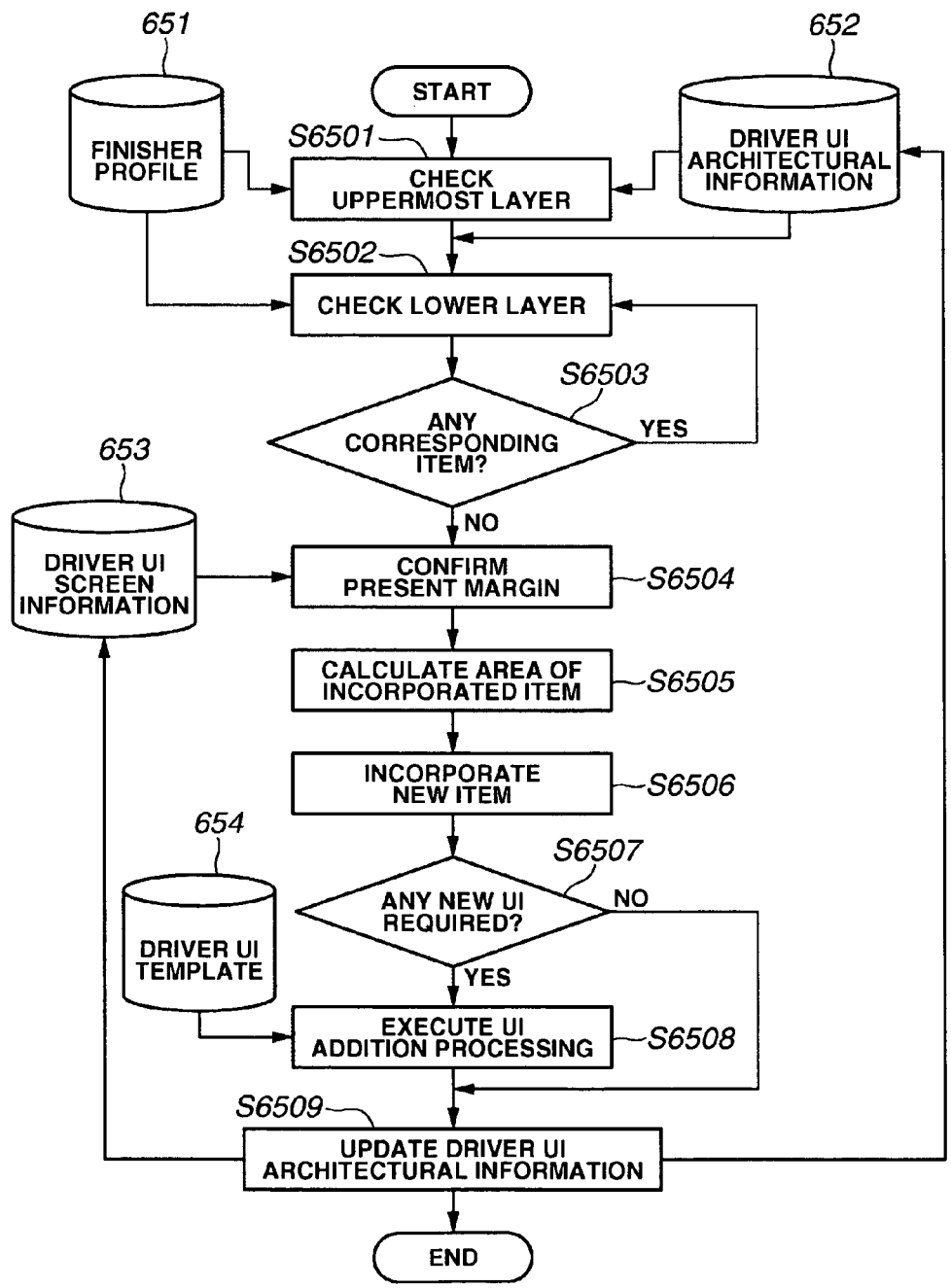
FIG. 65 is a flowchart describing an exemplary driver UI updating processing procedure, performed when there is a space available for a new UI without addition of unexpected function(s).

FIG. 65 is a flowchart describing exemplary driver UI updating processing, performed when there is a space available for a new UI without addition of unexpected function(s). In FIG. 65, a finisher profile 651 is stored in the profile storing region 504. Furthermore, a driver UI architectural information 652, a driver UI screen information 653, and a driver UI template 654 are stored beforehand in the hard disk 7604 (refer to FIG. 76). FIG. 62 shows the format of the finisher profile 651. FIG. 61 shows the format of the driver UI architectural information 652.

Still referring to FIG. 65, first, in step S6501, a tag beneath the "Driver_UI" in the finisher profile 651 and an uppermost layer of the driver UI architectural information 652 are checked. Then, the corresponding tags are obtained from the driver UI architectural information. Next, in step S6502, the finisher profile 651 and the lower layer of the driver UI architectural information are checked. In step S6503, it is it is determined whether there is a corresponding item (i.e., same item). If there in the same item (i.e., YES in step S6503), the processing flow returns to step S6502 to further check the lower layer. When there is no corresponding item (i.e., NO in step S6503), the item(s) of the finisher profile and the item(s) of the lower layer are added to the driver UI architectural information 652 in the following manner.

The screen information of the driver UI is stored as the driver UI screen information 653 in the DB. The margin on the present UI can be confirmed based on the information stored in the DB. Thus, in step S6504, the present margin is confirmed from the driver UI screen information 653. On the other hand, an area necessary for an incorporated item is calculated based on the information of the finisher profile 651 (refer to step S6505). Then, based on the calculation result, the new item is incorporated into the margin (refer to step S6506). Then, it is determined whether a new UI is required by confirming whether any information relating to another UI is present in the profile (refer to step S6507). 144

If a new UI is required (i.e., YES in step S6507), the information of the lower layer is combined with the driver UI template 654 to execute the UI addition processing (refer to step S6508). In this case, the driver UI template 654 is a driver UI screen that includes the definition of a screen size or the like and includes no functions. When no new UI is required (i.e., NO in step S6507), the processing flow proceeds to step S6509 to update the driver UI screen information 653 and the driver UI architectural information 652.

An example will be described with reference to the driver UI shown in FIG. 60 which is displayed when no finisher is connected. It is now assumed that a finisher having the profile shown in FIG. 62 newly establishes a communication with the image forming apparatus 21, and the printer driver obtains the finisher profile from the image forming apparatus 21.

The driver UI rearrangement application 5902 of the client PC 11 (and the client PC 22) successively retrieves the tags included in the profile from the beginning. First, the driver UI rearrangement application 5902 confirms that the "Driver_UI" tag is included in the profile. Then, the driver UI rearrangement application 5902 continuously retrieves to find the "finishing" tag and determines whether the "finishing" tag is present in the upper layer (i.e., the description corresponding to the "page setting" tab or the like on the UI) of the hierarchical configuration of the driver UI shown in FIG. 61.

Subsequently, lower layers are checked similarly. Regarding the "sheet discharge method" positioned in a lower layer of the "finishing" in the profile, the layer of FIG. 61 positioned immediately below the "finishing" is checked. After the presence of "sheet discharge method" is confirmed, the next layer is checked. Then, if a non-existing tag appears (e.g., "staple" in a lower layer of the "radio button" according to the example of FIG. 62), the "staple" and its lower layer's information are added to FIG. 61. Similarly, information is added to lower layers of the "image" and "command button" tags. Then, the present margin is calculated based on the driver UI screen information.

The area required for the incorporated items, such as "option button", "image", and "command button", is calculated to execute incorporation of these items. The command button includes the information relating to another UI, and accordingly the UI screen of "stapling position designation" is added based on this information. Finally, the driver UI information (e.g., the driver UI screen information and the driver UI architectural information) is updated in accordance with the updated driver UI, before terminating the processing.

Figure 66:
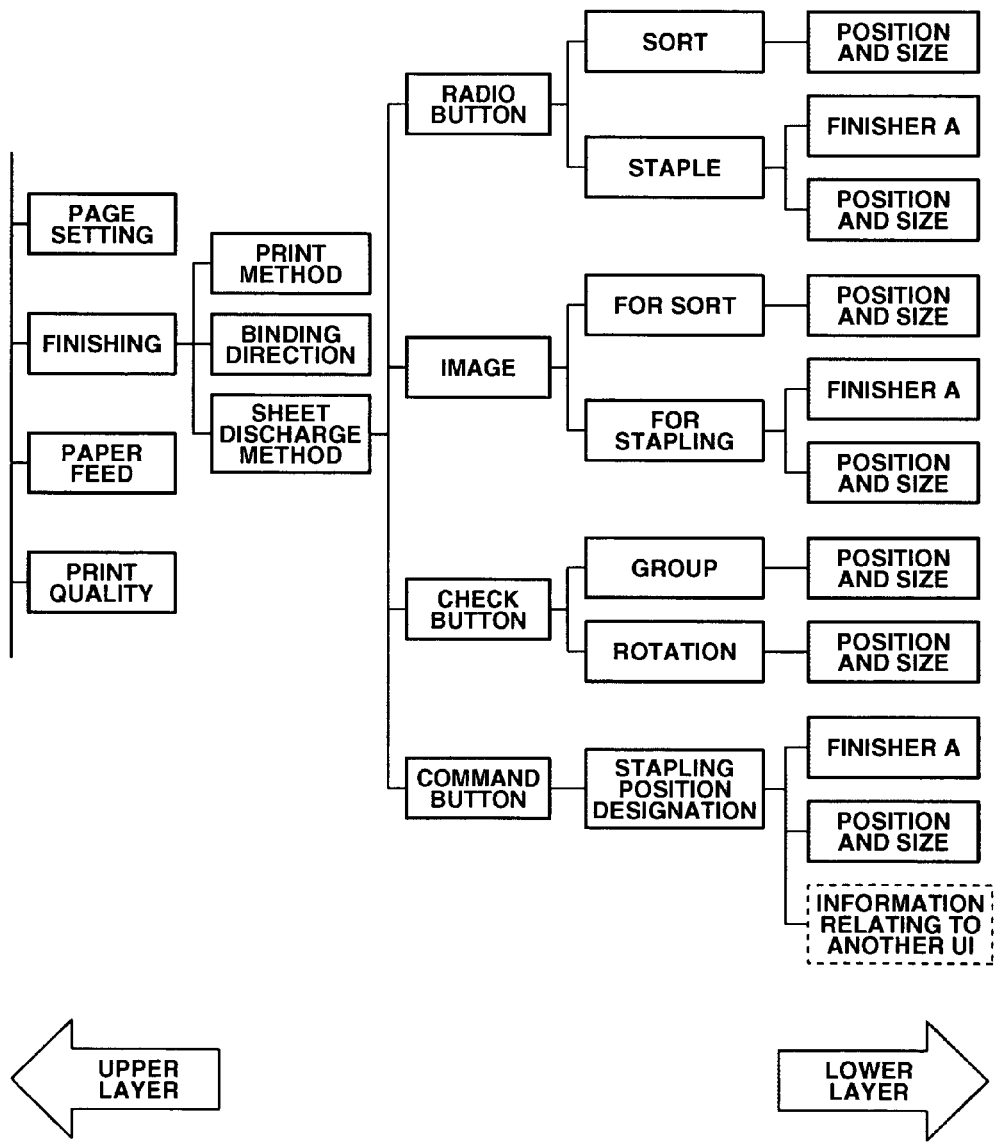
FIG. 66 is a diagram illustrating an exemplary hierarchical configuration of the driver UI after adding a finisher.
Figure 67:
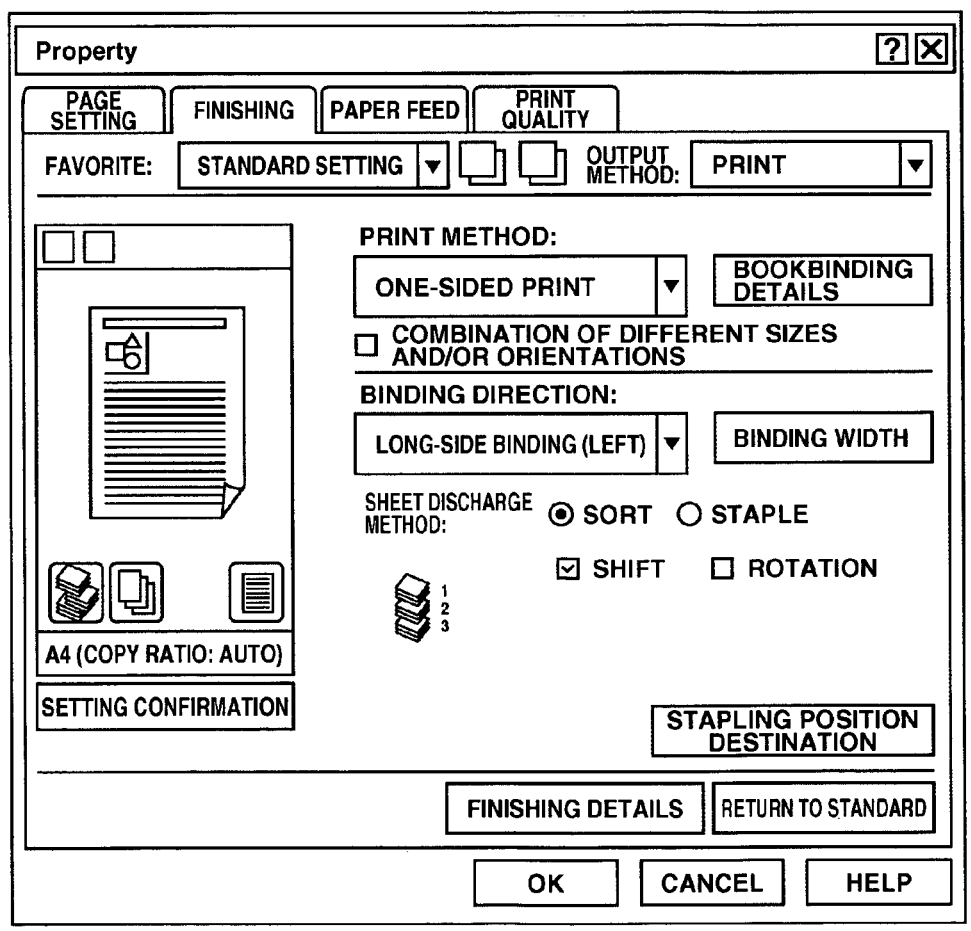
FIG. 67 is a diagram illustrating an exemplary driver UI displayed after adding a finisher.
Figure 68:
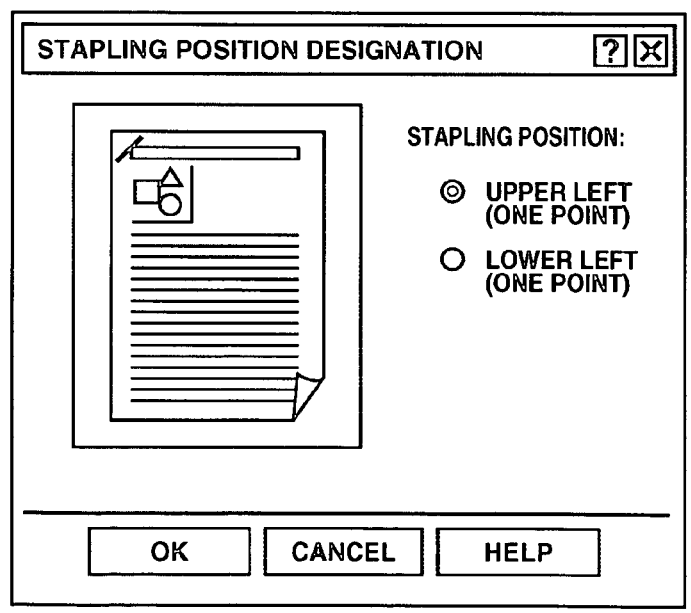
FIG. 68 is a diagram illustrating another exemplary UI independent of the driver UI.

FIG. 66 shows an exemplary architectural configuration of the driver UI reflecting the above-described addition processing. FIG. 67 shows a driver UI displayed based on the architectural information of the driver UI shown in FIG. 66. As shown in FIG. 67, the information relating to the stapling is added to the initial condition of the driver UI shown in FIG. 60. Furthermore, a "stapling position designation" button is displayed in a gray-out mode when the "sort" is selected, because the attribute information of the "finisher" is attached. Furthermore, when the staple is in an ON state, the "stapling position designation" button is enabled. When the operator clicks on this button, a new UI shown in FIG. 68 can be displayed. As shown in the drawing, the new UI includes two radio buttons, i.e., an upper left radio button and a lower left radio button, which are added based on the profile information.

The space creation processing (refer to step S6406 of FIG. 64) will be described below. This processing is performed when the fundamental UI has no space for incorporating a new UI. When there is no space available for the new UI, an appropriate space must be added. However, the driver UI having a fixed screen size cannot easily expand the space. Furthermore, even if the driver UI has an expandable area, a setting operation exceeding the maximum screen size of the client PC will not be accepted. Therefore, the exemplary embodiment secures the required space by adding a new tab.

Figure 69:
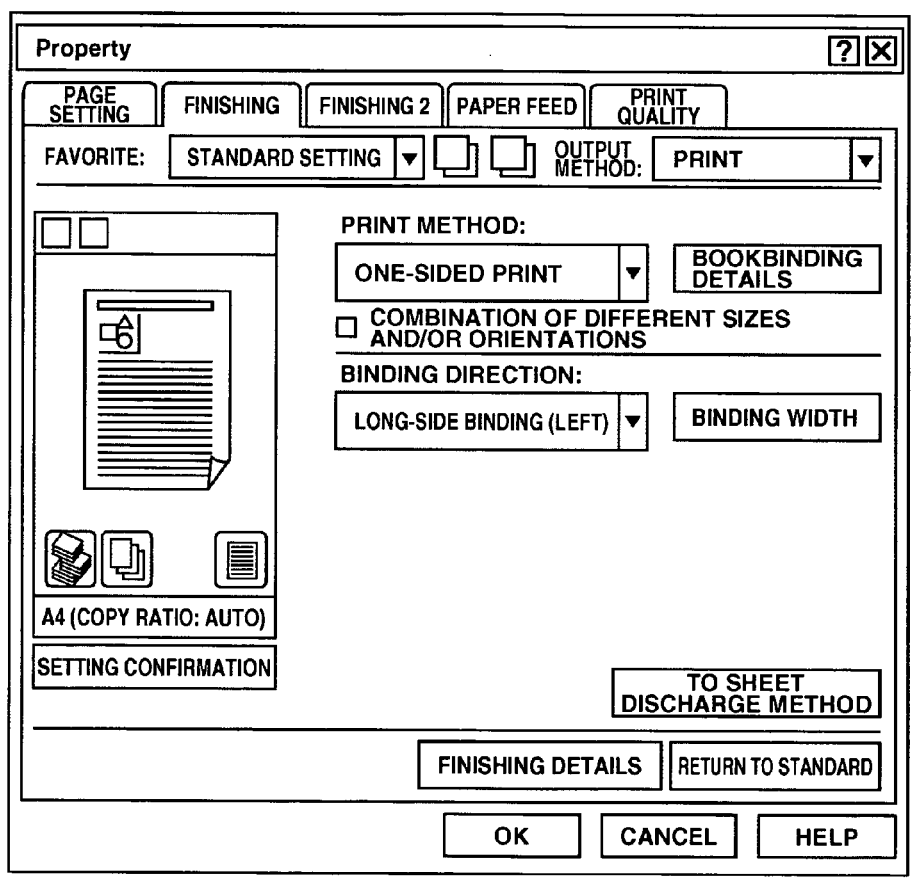
FIG. 69 is a diagram illustrating an exemplary driver UI displayed when a finisher is added in a condition that the driver has no space available for a new UI.
Figure 70:
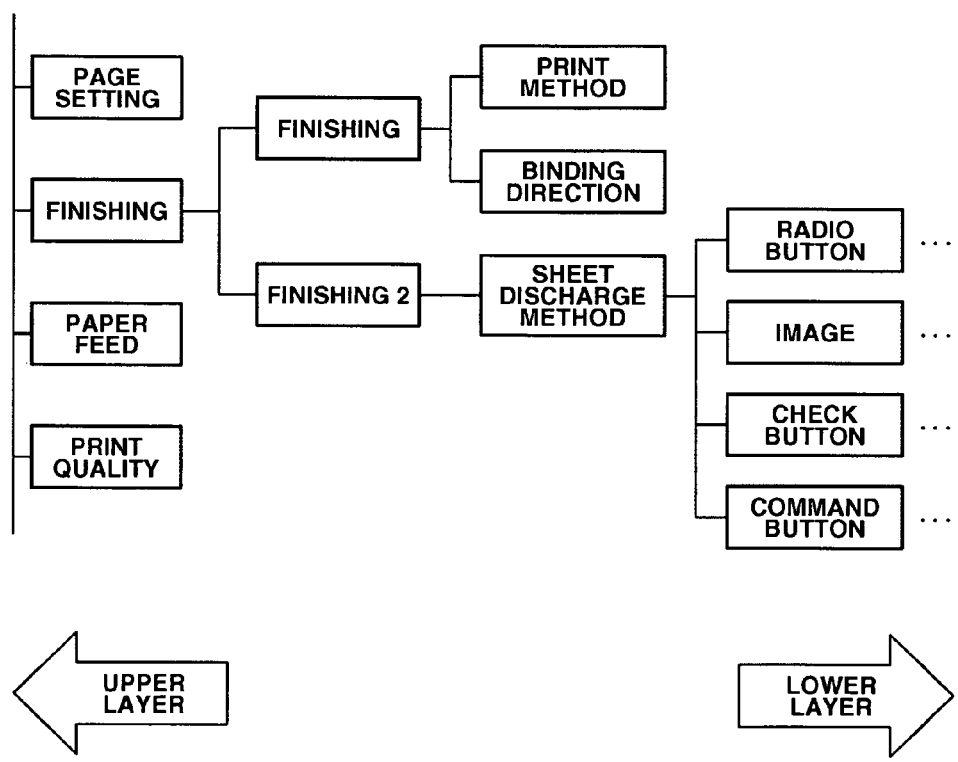
FIG. 70 is a diagram illustrating an exemplary hierarchical configuration of the driver UI displayed when a finisher is added in a condition that the driver has no space available for a new UI.

FIG. 69 shows a practical example. According to the example, the finisher functions shown in the profile of FIG. 62 are added to the driver UI of FIG. 60. Furthermore, a near-line finisher is connected to the network. When used in the driver UI, the UI relating to the staple is added to the sheet discharge method. It is now assumed that an added button is large and is not accommodated in the space of the present UI. Hence, to secure a space for accommodating the functions relating to the added staple, the example of FIG. 69 includes a new "finishing 2" tab to which the sheet discharge method is entirely shifted. Furthermore, the hierarchical configuration changes so as to include two types of finishing items as shown in FIG. 70. The "finishing" and "finishing 2" items are disposed under the "finishing" of the uppermost layer.

When a next finisher is added with increased functions, the processing of step S6501 or the like can be changed so as to check not only the uppermost layer but also the "finishing" and "finishing 2" items of the lower layer. However, the space addition processing is not limited to the above-described one. Any other format can be used.

Next, the processing performed when a non-recognized function is added will be described with reference to the flowcharts of FIGS. 64 and 65. When a non-recognized function is added, the driver UI rearrangement application 5902 asks the driver function DB about this function. If there is a supported function, a new tab is added.

Figure 71:
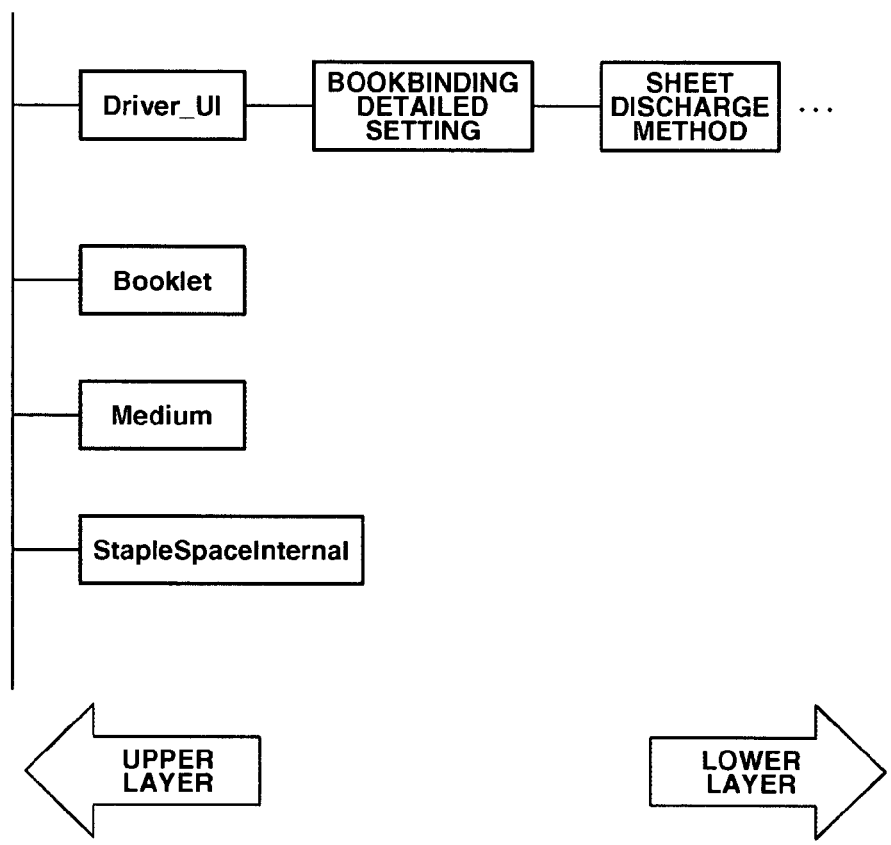
FIG. 71 is a diagram illustrating an exemplary profile configuration of a finisher having a function not expected by the host.

As an example, it is now assumed that a finisher having the finisher profile of FIG. 71 is connected to the driver UI of FIG. 59. In this case, the "bookbinding details setting" (i.e., a lower layer of "Driver_UI" in the finisher profile) is not included in the upper layer showing tab information of the driver architectural configuration. The driver UI rearrangement application asks the driver function DB 5901 about the presence of "bookbinding details setting."

Figure 72:
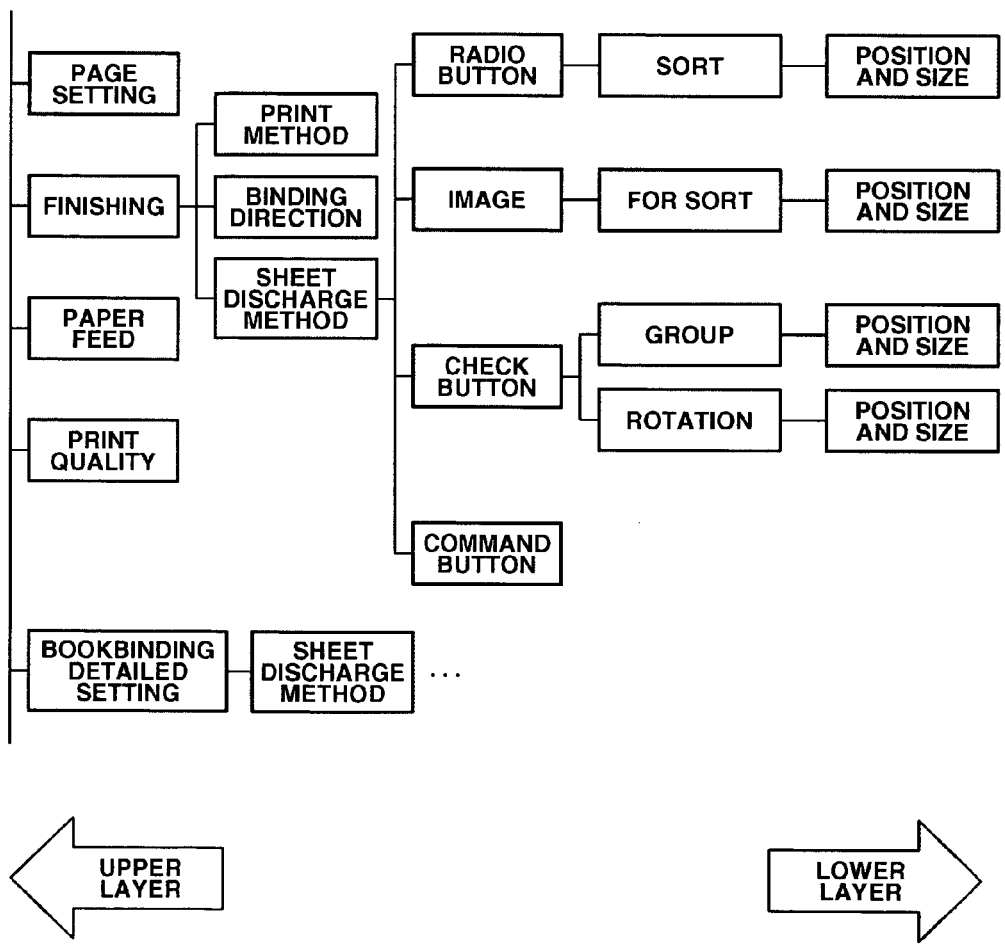
FIG. 72 is a diagram illustrating an exemplary hierarchical configuration of the driver UI displayed when an added finisher has an unexpected function.
Figure 73:
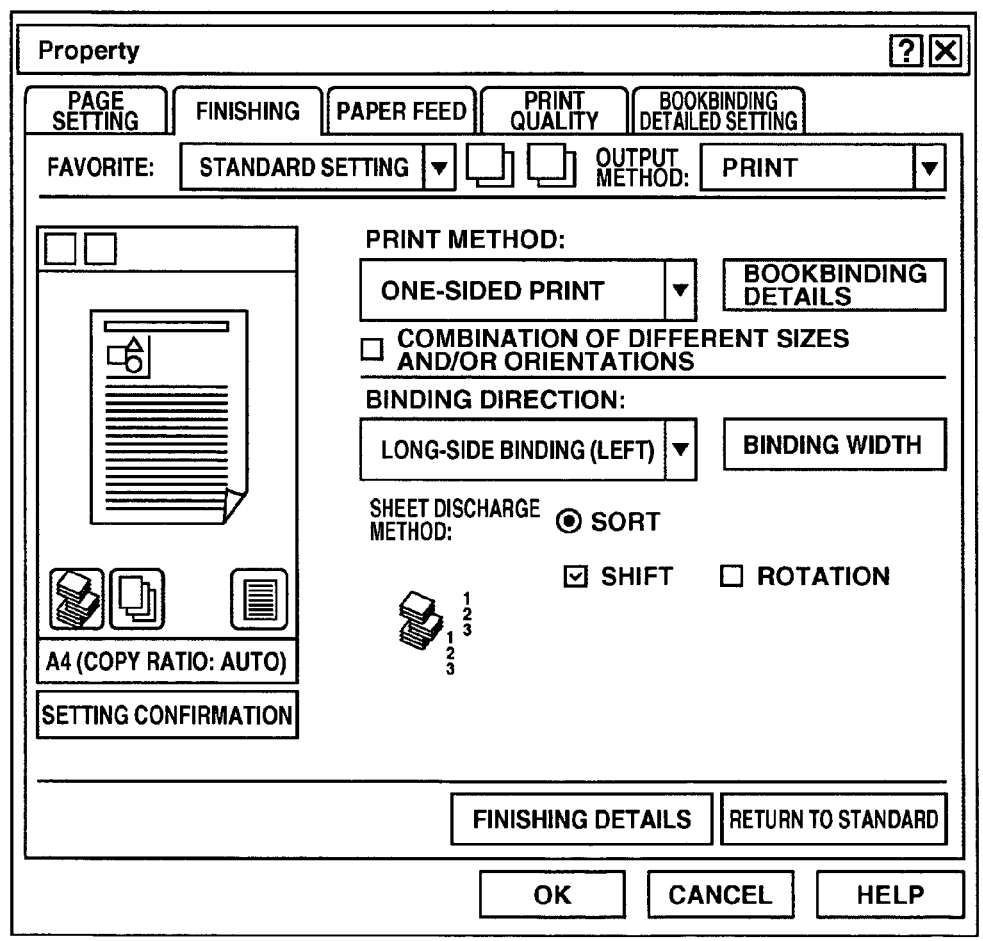
FIG. 73 is a diagram illustrating an exemplary driver UI displayed when the added finisher has an unexpected function.

When there is the information relating to the "bookbinding details setting" in the driver function DB 5901, a new "bookbinding details setting" tab is added based on this information. As a result, the driver UI architectural configuration shown in FIG. 72 can be obtained, and the resultant UI can be displayed as shown in FIG. 73. As shown in FIG. 72, the driver UI architectural configuration includes a "bookbinding details setting" item newly added. Furthermore, as shown in FIG. 73, the driver UI includes a "bookbinding details setting" tab newly added.

In the above-described exemplary embodiment, the post-processing to be executed in a near-line finisher (e.g., the casing-in bookbinding) may be designated as the post-processing applied to the printed products. In such a case, a print job including the contents of the post-processing to be executed in the near-line finisher and job control information describing a near-line finisher ID can be transmitted to the image forming apparatus. More specifically, when the received print job includes the post-processing to be performed in a near-line finisher, the image forming apparatus transmit the contents of the post-processing to the near-line finisher identified by the near-line finisher ID.

First, the client PC obtains the IP address of the near-line finisher by performing the processing similar to that of the image forming apparatus described in the exemplary embodiment. This processing can be constituted as a module of the printer driver, or can be constituted as an independent program. Then, the printer driver produces a "job ticket" describing post-processing contents and a job ID (i.e., identifier) and directly transmits the produced job ticket to the near-line finisher. In this case, a print job transmitted to the image forming apparatus needs not include the contents of post-processing relating to the near-line finisher or the job control information of this near-line finisher.

Fifth Exemplary Embodiment

In a fifth exemplary embodiment, there are plural finishers having functions overlapped with each other. For example, when there are plural finishers each having a "stapling" function, the finishers may be differentiated in detailed functions, e.g., in the number of stapled paper sheets or in the stapling position.

Figure 74:
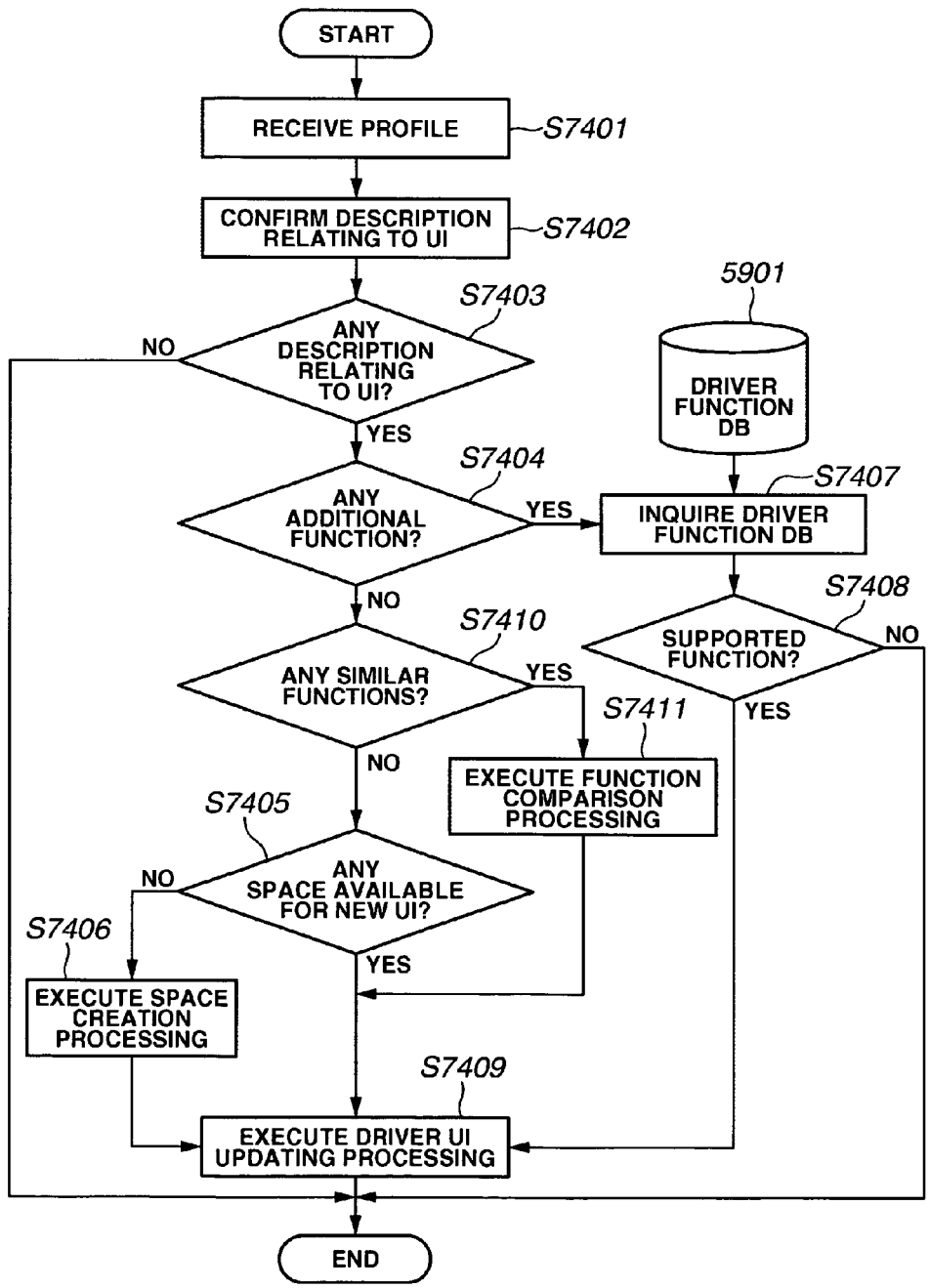
FIG. 74 is a flowchart describing an exemplary driver UI updating processing procedure in accordance with a fifth exemplary embodiment performed when plural finishers have functions overlapped with each other.

FIG. 74 is a flowchart describing an exemplary processing procedure of the driver UI rearrangement application 5902, performed when plural finishers have functions overlapped with each other. The processing of steps S7401 through S7409 of FIG. 74 are similar with the processing of steps S6401 through S6408 of FIG. 64 and therefore will not be described.

The processing of step S7410 is executed when no unrecognized function is added (i.e., NO in step S7404). In step S7410, it is determined whether there is any similarity (i.e., overlap) of the functions. In this case, the similarity (i.e., overlap) of the functions is recognized if newly added functions of a finisher are already incorporated as the functions of another finisher. When there is no similarity (i.e., overlap) of the functions (i.e., NO in step S7410), the processing flow proceeds to step S7405 to determine whether there is any space available for the new UI.

When the similarity (i.e., overlap) of the functions is recognized (i.e., YES in step S7410), the processing flow proceeds to step S7411 to execute function comparison processing and then proceeds to step S7409 to execute the driver UI updating processing. For example, the similarity (i.e., overlap) of the functions will be recognized if a new stapler (i.e., a finisher having a stapling function) is newly connected in the condition that a "stapling" function is already incorporated.

Regarding the function comparison processing executed in step S7409, there are two practical methods. One method is selecting a finisher having highest performance among plural finishers. The other method is comparing plural finisher functions and displaying them according to the comparison. As an example, it is now assumed that two finishers can communicate with the image forming apparatus having the driver UI of FIG. 60.

For example, according to the former method, the capabilities of finishers can be compared based on their profiles because the profiles include the information relating to the performance, such as a maximum copy number. Therefore, it is possible to select a finisher having higher performance. In this case, the information identifying the selected finisher needs not be specified, because the operator can perform the settings without considering the performance or properties of the selected finisher. As described above, the operators having no specialized knowledge about the finishers will be confused if they are asked to determine an apparatus necessary to obtain the final printed products they want. Therefore, only the functions are intentionally displayed to avoid any confusion.

Figure 75:
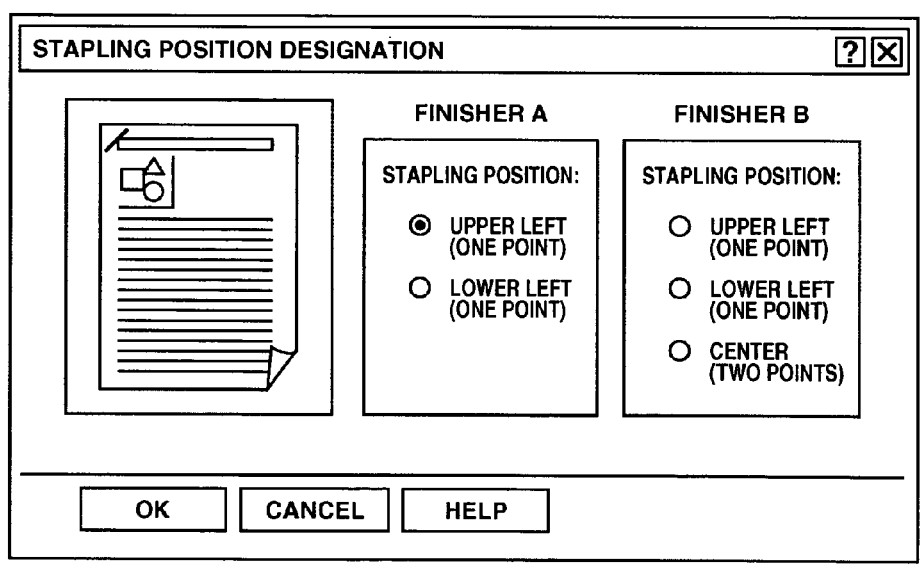
FIG. 75 is a diagram illustrating a driver UI in accordance with the fifth exemplary embodiment displayed when plural finishers have functions overlapped with each other.

On the other hand, according to the latter method, it is necessary to specify each of the plural finishers and explicitly display their functions in the form of a list describing the finisher name and related functions. FIG. 75 shows one example of the list. According to the example of FIG. 75, one finisher A has a stapling function performable at two positions (i.e., upper left and lower left) while another finisher B has a stapling function performable at three positions (i.e., upper left, lower left, and center). The operator can compare the finisher functions to select an optimum finisher.

It is further noted that comparison of similar (overlapped) functions and the related processing are not limited to the above-described ones. Also, as described above, according to the present exemplary embodiment, the UI architectural information of the printer driver used on the client PC is described according to the general-purpose description language, such as XML format. Meanwhile, the profile showing finisher functions is described in a similar fashion so as to be conformable to the UI architectural information of the printer driver. As a result, a user can obtain the profile of an intended finisher and a GUI of the printer driver can be constituted appropriately in compliance with the environment in which the printer driver is used.

Other Exemplary Embodiments

According to the present invention, the software program(s) realizing the above-described functions of the present exemplary embodiments can be supplied, by using a recording medium, to a system or an apparatus. The system or the apparatus (e.g., CPU or MPU) can read the supplied program codes from the recording medium and can execute the program(s) to realize the functions of the present exemplary embodiments.

In this case, the program codes read out of the recording medium can realize the functions of the above-described exemplary embodiments. The recording medium storing the program codes can constitute the present invention. Furthermore, realizing the functions of the above-described exemplary embodiments is not limited to executing the program codes read by the computer. The operating system (OS) running on the computer can execute part of all of the actual processing based on an instruction of the program codes, to realize the functions of the above-described exemplary embodiments.

Furthermore, the program read out of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions of the above-described exemplary embodiments can be realized.

As understood from the above-described exemplary embodiments, the present invention can be embodied as a system, an apparatus, a method, a program, or a recording medium. More specifically, the present invention can be applied to an integrated system including plural devices or can be applied to a single device.

Furthermore, software programs realizing the functions of the above-described exemplary embodiments (i.e., the programs corresponding to the flowcharts shown in the drawing of the exemplary embodiments) can be directly or remotely supplied to the system or to the apparatus, so that a computer of the system or the apparatus can read and execute supplied program codes to realize the present invention. Therefore, the present invention encompasses the computer codes installed in a computer that can realize the functions or processes of the present invention or any recording medium that can store the program(s). In this case, the type of program(s) can be selected from any one of object codes, interpreter programs, and OS script data.

A recording medium supplying the program(s) can be selected from any one of floppy disk (registered trademark), hard disk, optical disk, magneto-optical disk, MO, CD-ROM, CD-R, CD-RW, magnetic tape, nonvolatile memory card, ROM, and DVD (DVD-ROM, DVD-R).

The method for supplying the program(s) includes accessing a home page on the Internet using the browsing function of a host computer, when the home page allows each user to download the computer programs of the present invention, or compressed files of the programs having automatic installing functions, to a hard disk or other recording medium of the user. Furthermore, the program codes constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers.

When the computer reads and executes the installed programs, the functions of the above-described exemplary embodiments can be realized. Furthermore, based on an instruction of the program, the operating system running on the computer may execute part or all of the processing so that the functions of the above-described exemplary embodiments can be realized.

Furthermore, the program read out of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions of the above-described exemplary embodiments can be realized.

According to the above-described exemplary embodiments, an operator (or user) can easily perform the settings of a finisher without knowing or confirming the connection state and the restricted functions of the finisher. The images processed in a finisher can be preferably formed even if an operator does not know or confirm the finisher's capability.

According to the above-described exemplary embodiments, the configuration language describing the fundamental display information required to constitute fundamental print setting display screens can be commonly used to describe the function information of a print post-processing apparatus. Thus, a print setting screen for setting printing and bookbinding conditions can be easily displayed by combining them.

Therefore, the user can execute seamless settings relating to the printing and bookbinding conditions. In particular, the above-described exemplary embodiments enable the printer driver of a printing apparatus to control a print post-processing apparatus that is connected to the network but was conventionally difficult to automatically control its printed products.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-128617 filed Apr. 26, 2005 and Japanese Patent Application No. 2005-128620 filed Apr. 26, 2005, which are hereby incorporated by reference herein in their entirety.

What is claimed is:

1. An information processing apparatus configured to be in communication over a network with an image forming apparatus and to set print setting information for a print processing performed by the image forming apparatus, the information processing apparatus comprising:

a selecting unit configured to select, as a post-processing apparatus to perform post-processing for a printing product, one of a first post-processing apparatus that is not connected with a paper conveyance path of the image forming apparatus and is configured to be in communication with other apparatuses and a second post-processing apparatus that is connected with the paper conveyance path of the image forming apparatus and is configured to be in communication with other apparatuses;

a display control unit configured to display a setting screen to set setting information on the post-processing to be performed for the printing product;

a receiving unit configured to receive print instruction from a user; and a switching unit configured to switch transmitting processing by a type of the post-processing apparatus, wherein, in response to the first post-processing apparatus being selected by the selecting unit, the switching unit performs distributed transmitting processing for the image forming apparatus and the first post-processing apparatus in response to the print instruction such that, out of (i) print data generated based on the print setting information and (ii) post-processing data generated based on (a) the setting information set via the setting screen and (b) identification information of the print data, (i) the print data is transmitted over the network to the image forming apparatus and (ii) the post-processing data is transmitted over the network to the first post-processing apparatus, and wherein, in response to the second post-processing apparatus being selected by the selecting unit, the switching unit performs transmitting processing for the image forming apparatus in response to the print instruction such that both (i) the print data and (ii) the post-processing data are transmitted over the network to the image forming apparatus, wherein the first post-processing apparatus reads the post-processing data transmitted with the identification information in response to the identification information being input in the first post-processing apparatus.

2. The information processing apparatus according to claim 1, wherein the display control unit displays a setting range of binding width of the post-processing apparatus.

3. The information processing apparatus according to claim 1, wherein the display control unit controls a display unit to display a selection screen enabling an operator to select one of a plurality of post-processing apparatuses connected via a network.

4. The information processing apparatus according to claim 1, wherein the post-processing data includes only instructions on post-processing processed by the post-processing apparatus.

5. The information processing apparatus according to claim 1, further comprising:

a determining unit configured to determine, based on a response received from the image forming apparatus, whether a post-processing apparatus profile of a new post-processing apparatus is of a post-processing apparatus that is not connected with a paper conveyance path of the image forming apparatus, wherein, in response to the determining unit determining, based on a response received from the image forming apparatus, that the post-processing apparatus profile of the new post-processing apparatus is of a post-processing apparatus that is not connected with a paper conveyance path of the image forming apparatus, a type of the new post-processing apparatus is assigned to be the first post-processing apparatus.

6. The information processing apparatus according to claim 1, further comprising:

a determining unit configured to determine whether a new post-processing apparatus to perform post-processing for a printing product is in a connected state or a disconnected state, wherein, in the connected state, the post-processing apparatus can communicate with other apparatuses and, in the disconnected state, the post-processing apparatus cannot communicate with other apparatuses, wherein, in response to the determining unit determining that the new post-processing apparatus is in a disconnected state and the selecting unit selecting the new post-processing apparatus to perform post-processing for a printing product, contents of job control information are converted into a format that an operator can read and input into the new post-processing apparatus and a print job including the converted job control information is transmitted to the image forming apparatus.

7. The information processing apparatus according to claim 1, wherein in response to the first post-processing apparatus being selected by the selecting unit, a transmission destination address for the first post-processing apparatus is an IP address stored in relation to a post-processing apparatus profile of the first post-processing apparatus, wherein the IP address is configured to be utilized by the image processing apparatus to determine the type of the post-processing apparatus selected by the selecting unit.

8. The information processing apparatus according to claim 1, further comprising:

an acquiring unit configured to acquire, from the image forming apparatus, a property information file that specifies restricting information that restricts functions a new post-processing apparatus that is connected with the image forming apparatus as a first post-processing apparatus;

a printer driver containing default setting information of another post-processing apparatus as default conditions, and wherein the new post-processing apparatus is connected with the image forming apparatus after the default setting information is contained within the printer driver;

a determining unit configured to determine whether the restricting information of the new post-processing apparatus agrees with the default setting information of the printer driver, wherein, in response to the determining unit determining that the restricting information of the new post-processing apparatus agrees with the default setting information of the printer driver, then the display control unit controls to display a setting screen to set setting information on the post-processing to be performed for the printing product based on the default setting information of the printer driver, and wherein, in response to the determining unit determining that the restricting information of the new post-processing apparatus disagrees with the default setting information of the printer driver, then the display control unit controls to display a setting screen to set setting information on the post-processing to be performed for the printing product based on the restricting information of the new post-processing apparatus received by the acquiring unit.

9. The information processing apparatus according to claim 1, wherein the selecting unit automatically selects the post-processing apparatus to perform post-processing for a printing product based on a predetermined priority, wherein the predetermined priority is at least one of processing capability, work region, and frequency of use.

10. An information processing method for an information processing apparatus for communicating over a network with an image forming apparatus and for setting print setting information for a print processing performed by the image forming apparatus, the information processing method comprising:
selecting, via a selecting unit in the information processing apparatus and as a post-processing apparatus to perform post-processing for a printing product, one of a first post-processing apparatus that is not connected with a paper conveyance path of the image forming apparatus and is configured to be in communication with other apparatuses and a second post-processing apparatus that is connected with the paper conveyance path of the image forming apparatus and is configured to be in communication with other apparatuses;
displaying, via a display control unit in the information processing apparatus, a setting screen to set setting information on the post-processing to be performed for the printing product;
receiving print instruction from a user; and
switching transmitting processing by a type of the post-processing apparatus, wherein, in response to the first post-processing apparatus being selected by the selecting unit, switching includes performing distributed transmitting processing for the image forming apparatus and the first post-processing apparatus in response to the print instruction such that, out of (i) print data generated based on the print setting information and (ii) post-processing data generated based on (a) the setting information set via the setting screen and (b) identification information of the print data, (i) the print data is transmitted over the network to the image forming apparatus and (ii) the post-processing data is transmitted over the network to the first post-processing apparatus, and wherein, in response to the second post-processing apparatus being selected by the selecting unit, switching includes performing transmitting processing for the image forming apparatus in response to the print instruction such that both (i) the print data and (ii) the post-processing data are transmitted over the network to the image forming apparatus,
wherein the first post-processing apparatus reads the post-processing data transmitted with the identification information in response to the identification information being input in the first post-processing apparatus.

11. A non-transitory computer readable storage medium storing a program that causes an information processing apparatus to perform the method according to claim 10.

12. The non-transitory computer readable storage medium according to claim 11, wherein the display control unit displays a setting range of binding width of the post-processing apparatus.

13. The non-transitory computer readable storage medium according to claim 11, further including computer-executable instructions that display a selection screen enabling an operator to select one of a plurality of post-processing apparatuses connected via a network.

14. The non-transitory computer readable storage medium according to claim 11, wherein the post-processing data includes only instructions on post-processing processed by the post-processing apparatus.

15. The information processing method according to claim 10, wherein the display control unit displays a setting range of binding width of the post-processing apparatus.

16. The information processing method according to claim 10, further including displaying a selection screen enabling an operator to select one of a plurality of post-processing apparatuses connected via a network.

17. The information processing method according to claim 10, wherein the post-processing data includes only instructions on post-processing processed by the post-processing apparatus.

* * * * *